US011422332B2

(12) United States Patent
Ho et al.

(10) Patent No.: US 11,422,332 B2
(45) Date of Patent: Aug. 23, 2022

(54) DRIVING MECHANISM

(71) Applicant: TDK TAIWAN CORP., Taoyuan (TW)

(72) Inventors: Liang-Ting Ho, Taoyuan (TW);
Chao-Chang Hu, Taoyuan (TW);
Yung-Hsien Yeh, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 265 days.

(21) Appl. No.: 16/778,652

(22) Filed: Jan. 31, 2020

(65) Prior Publication Data

US 2020/0249424 A1 Aug. 6, 2020

Related U.S. Application Data

(60) Provisional application No. 62/879,190, filed on Jul. 26, 2019, provisional application No. 62/849,317, filed on May 17, 2019, provisional application No. 62/825,538, filed on Mar. 28, 2019, provisional application No. 62/809,891, filed on Feb. 25, 2019, provisional application No. 62/799,886, filed on Feb. 1, 2019.

(51) Int. Cl.
*G02B 7/09* (2021.01)
*H02K 41/035* (2006.01)
*G02B 27/64* (2006.01)
*G01L 1/22* (2006.01)
*G03B 13/36* (2021.01)

(52) U.S. Cl.
CPC .............. *G02B 7/09* (2013.01); *G01L 1/2287* (2013.01); *G02B 27/646* (2013.01); *G03B 13/36* (2013.01); *H02K 41/0354* (2013.01); *H02K 41/0356* (2013.01)

(58) Field of Classification Search
CPC ........ G02B 7/09; G02B 27/646; G03B 13/36; H02K 41/0354; H02K 41/0356; G01L 1/2287
See application file for complete search history.

(56) References Cited

U.S. PATENT DOCUMENTS

| | | | |
|---|---|---|---|
| 8,941,951 B2 * | 1/2015 | Bennin | G11B 5/486 360/244.1 |
| 10,670,429 B2 * | 6/2020 | Madden | G01B 7/22 |
| 2014/0091204 A1 * | 4/2014 | Ezawa | G03B 5/00 250/208.1 |
| 2016/0363491 A1 * | 12/2016 | Iwase | G01L 1/2287 |
| 2017/0242216 A1 * | 8/2017 | Izumi | G02B 7/09 |
| 2018/0059839 A1 * | 3/2018 | Kim | H01L 51/5284 |
| 2018/0171991 A1 * | 6/2018 | Miller | F16F 15/06 |

* cited by examiner

*Primary Examiner* — Cara E Rakowski
(74) *Attorney, Agent, or Firm* — Muncy, Geissler, Olds & Lowe, P.C.

(57) ABSTRACT

A driving mechanism for moving an optical element is provided, including a fixed part, a movable part, a driving assembly, and a flexible element. The movable part is connected to the optical element. The driving assembly drives the movable part to move relative to the fixed part. The flexible element is connected to the fixed part and the movable part. When the movable part moves relative to the fixed part, the flexible element deforms so that the position of the movable part relative to the fixed part can be detected.

16 Claims, 53 Drawing Sheets

DRIVING MECHANISM

CROSS REFERENCE TO RELATED APPLICATIONS

This Application claims priority of provisional U.S. Patent Application Ser. No. 62/799,886, filed on Feb. 1, 2019, provisional U.S. Patent Application Ser. No. 62/809,891, filed on Feb. 25, 2019, provisional U.S. Patent Application Ser. No. 62/825,538, filed on Mar. 28, 2019, provisional U.S. Patent Application Ser. No. 62/849,317, filed on May 17, 2019, and provisional U.S. Patent Application Ser. No. 62/879,190, filed on Jul. 26, 2019, the entirety of which are incorporated by reference herein.

BACKGROUND OF THE INVENTION

Field of the Invention

The application relates in general to a driving mechanism, and in particular, to a driving mechanism for moving an optical element.

Description of the Related Art

As technology has progressed, many kinds of electronic devices such as smartphones have begun to include the functionality of digital photography or video recording. A user can operate the electronic device to capture various images with a camera module that is included in the electronic device.

Today's design of electronic devices continues to follow the trend of miniaturization, meaning that the various components of the camera module or its structure must also be continuously reduced so as to achieve miniaturization. In general, a driving mechanism of a camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

BRIEF SUMMARY OF INVENTION

In view of the aforementioned problems, the object of the invention is to provide a driving mechanism for moving an optical element that includes a fixed part, a movable part, a driving assembly, and a flexible element. The movable part is connected to the optical element and movable relative to the fixed part. The driving assembly drives the movable part to move relative to the fixed part. The flexible element is connected to the fixed part and the movable part, wherein when the movable part moves relative to the fixed part, the flexible element deforms so that the position of the movable part relative to the fixed part is detected.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

First Group of Embodiments

Figure 1:
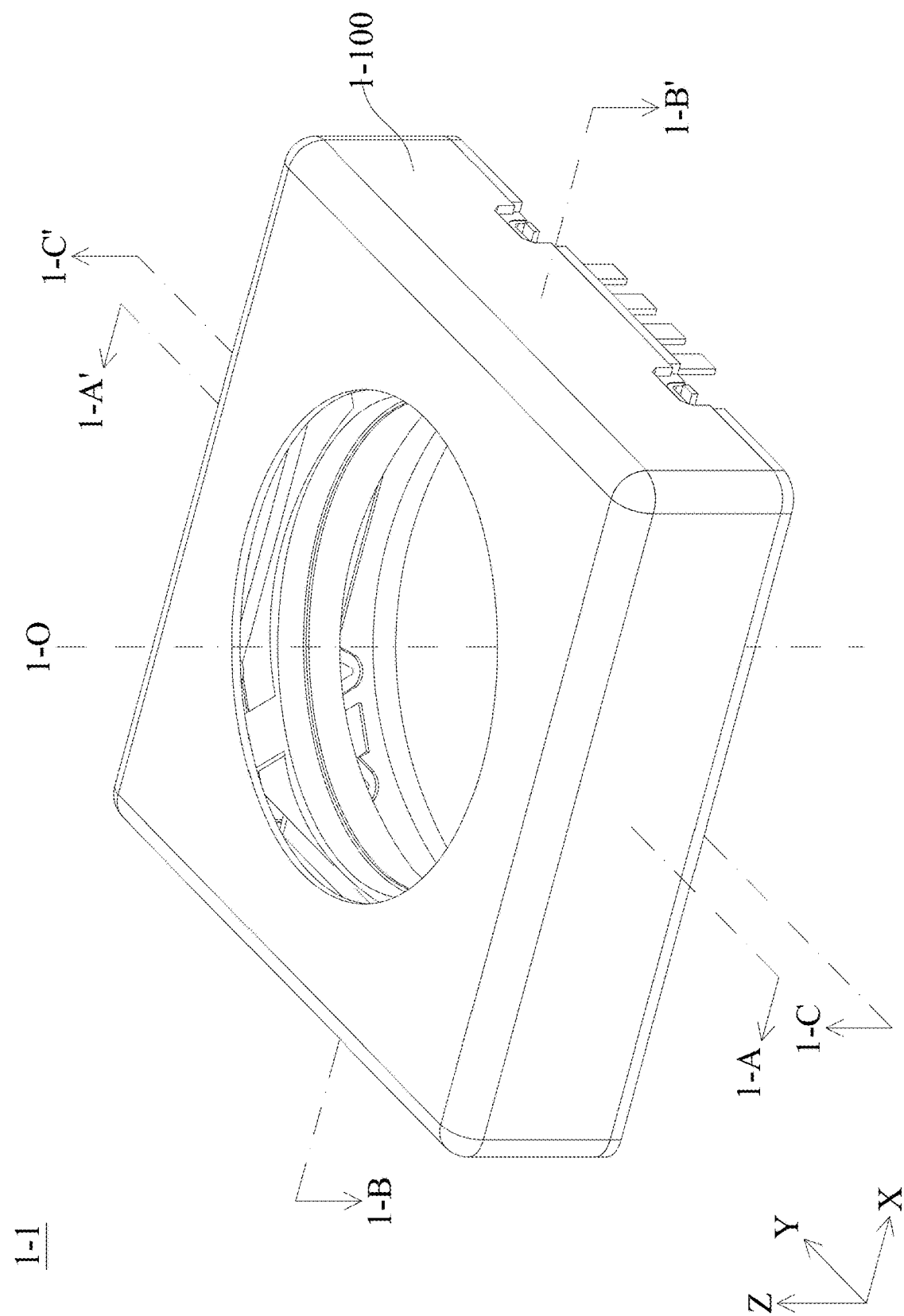
FIG. 1 shows a perspective view of an optical element driving mechanism in accordance with an embodiment of this disclosure.
Figure 2:
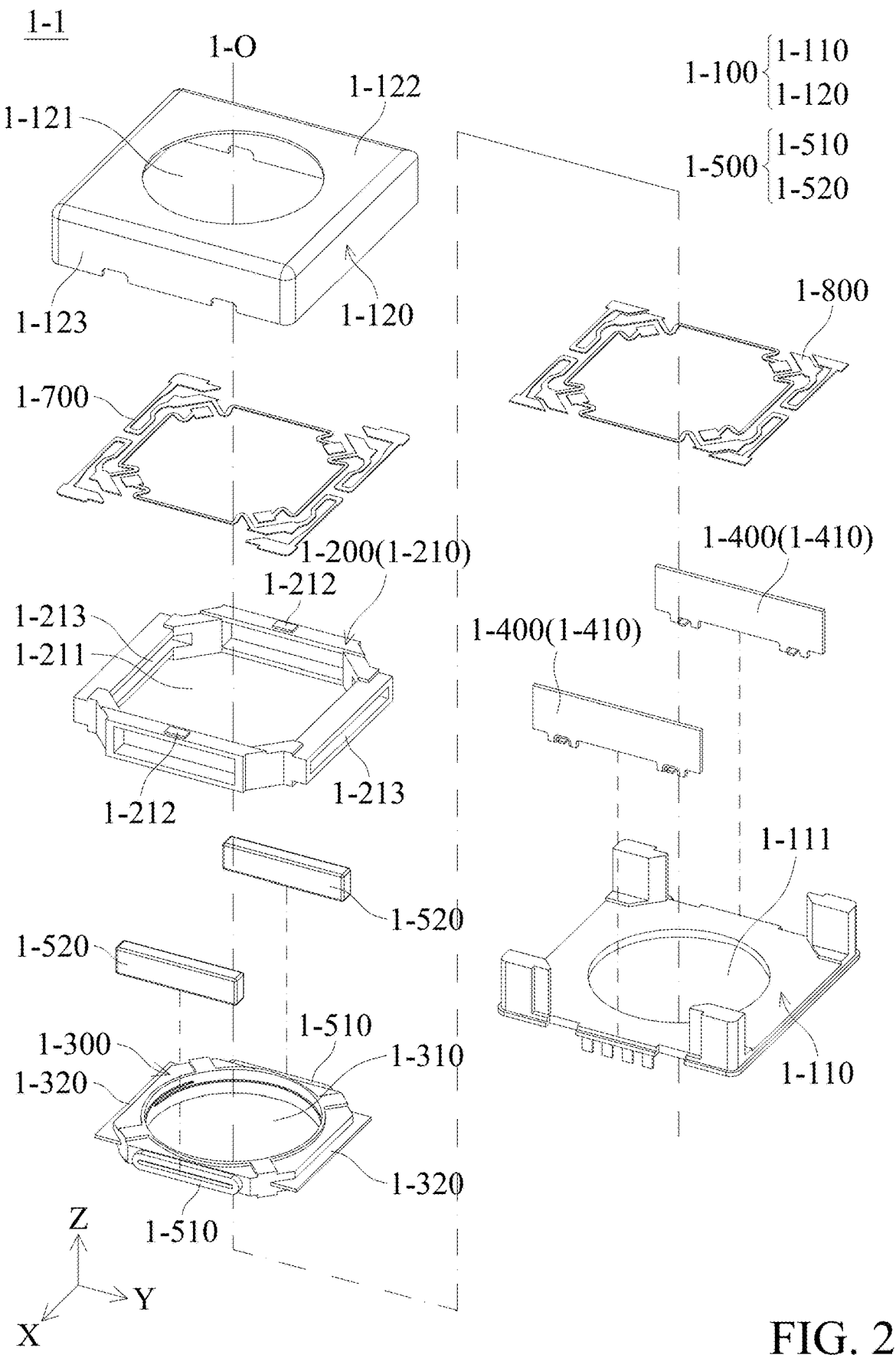
FIG. 2 shows an exploded view of an optical element driving mechanism in accordance with an embodiment of this disclosure.

Refer to FIG. 1 to FIG. 2. FIG. 1 shows a perspective view of an optical element driving mechanism 1-1 in accordance with an embodiment of this disclosure, and FIG. 2 shows an exploded view of the optical element driving mechanism 1-1 in accordance with an embodiment of FIG. 1 of this disclosure. As shown in FIGS. 1 and FIG. 2, in the present embodiment, the optical element driving mechanism 1-1 includes a fixed portion 1-100, a movable portion 1-200, a moving portion 1-300, two first driving assembly 1-400, a second driving assembly 1-500, four first elastic assemblies 1-700, and four second elastic assemblies 1-800.

As shown in FIG. 2, the fixed portion 1-100 includes a base 1-110 and a case 1-120. The base 1-110 has a base opening 1-111. The case 1-120 has a case opening 1-121, a top wall 1-122, and four side walls 1-123 extending from edges of the top wall 1-122 along an optical axis 1-O. The case 1-120 and the base 1-110 may be combined to form a housing of the optical element driving mechanism 1-1. It should be understood that the center of the case opening 1-121 corresponds to the optical axis 1-O of an optical element (not shown), and the base opening 1-111 corresponds to an image-sensing element (not shown in the figures) disposed outside the optical element driving mechanism 1-1. External light may enter the case 1-120 through the case opening 1-121, and is received by the image-sensing element after passing through the optical element and the base opening 1-111, so as to generate a digital image signal.

The movable portion 1-200 is movable relative to the fixed portion 1-100, and includes a frame 1-210. The frame 1-210 has a frame opening 1-211, four limiting portions 212, and two slots 1-213. Two of the four limiting portions 212 are disposed on an upper surface of the frame 1-210. The other two limiting portions 212 are disposed on a lower surface of the frame 1-210. Two slots 1-213 are disposed opposite to each other, and the slots 1-213 traverse the movable portion 1-200 in a direction that is perpendicular to the optical axis 1-O.

The moving portion 1-300 connects to an optical element (not shown), and moves relative to the movable portion 1-200. For example, the moving portion 1-300 may be a holder which holds a lens. The moving portion 1-300 has a through hole 1-310 and two limiting portions 1-320. The two limiting portions 1-320 are disposed opposite to each other.

The limiting portion 1-320 can be an iron piece, which is inserted into the moving portion 1-300 through the slot 1-213. However, the material of the limiting portion 1-320 is not limited to iron, plastic or other suitable materials may also be used.

Figure 3:
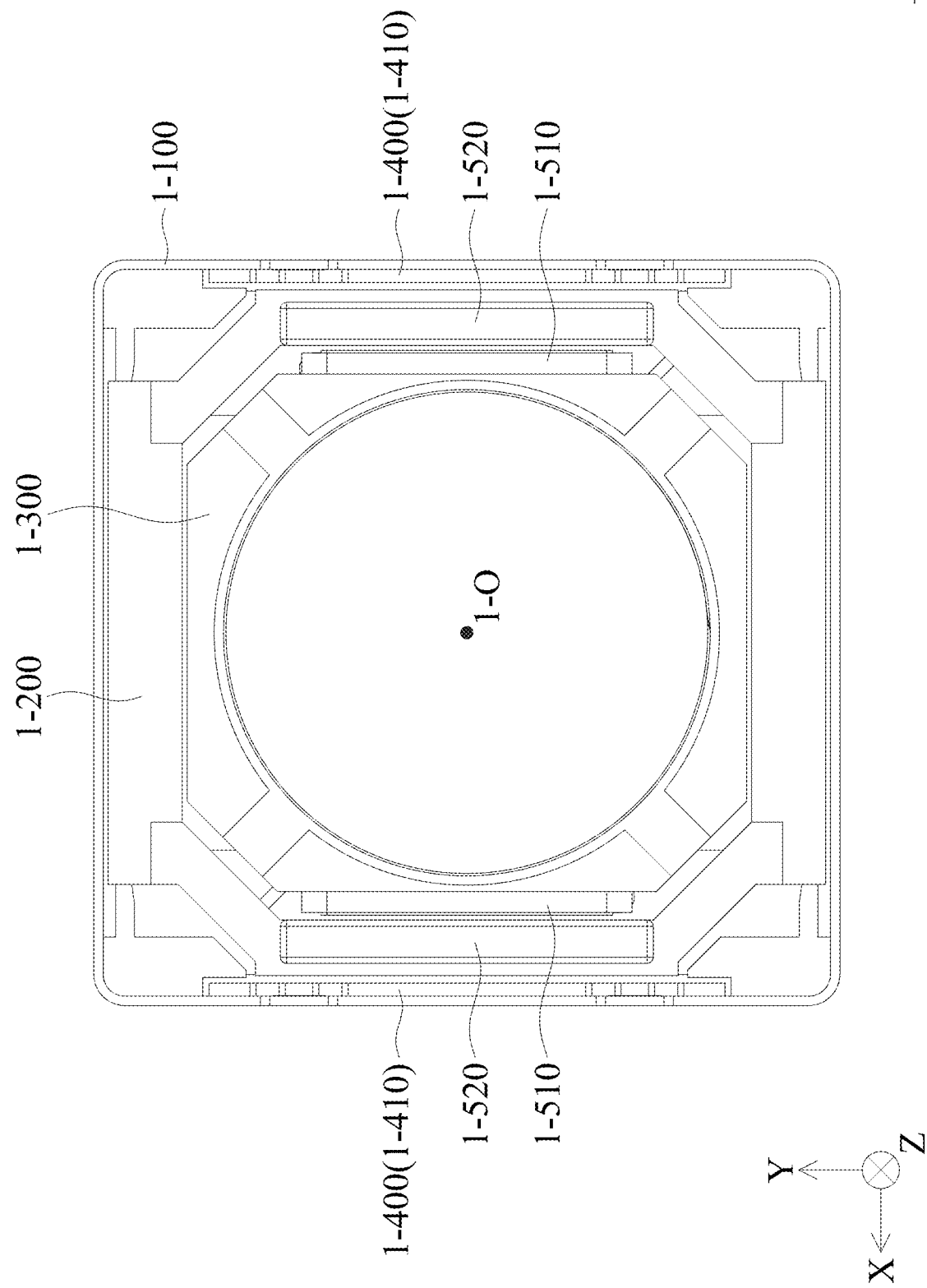
FIG. 3 shows a cross-sectional view of an optical element driving mechanism along a line 1-A to 1-A' in FIG. 1.

Refer to FIG. 3. FIG. 3 shows a cross-sectional view of an optical element driving mechanism along a line 1-A to 1-A' in FIG. 1. The first driving assembly 1-400 drives the movable portion 1-200 to move relative to the fixed portion 1-100. The first driving assembly 1-400 includes two first driving coils 1-410. The second driving assembly 1-500 drives the moving portion 1-300 to move relative to the movable portion 1-200. The second driving assembly 1-500 includes two second driving coils 1-510 and two driving magnetic elements 1-520. As shown in FIG. 3, the first driving coil 1-410, the second driving coil 1-510, and the driving magnetic element 1-520 are disposed in a direction that is perpendicular to the optical axis 1-O, and the driving magnetic element 1-520 is located between the first driving coil 1-410 and the second driving coil 1-510. When viewed in a direction that is perpendicular to the optical axis 1-O, the first driving assembly 1-400 partially overlaps the second driving assembly 1-500.

The first driving coil 1-410 is disposed on the fixed portion 1-100. The first driving coil 1-410 may be, for example, a printed circuit board, and a driving coil is disposed inside. The first driving coil 1-410 correspond to the position of the driving magnetic element 1-520, and the first driving coil 1-410 may be fixed on the base 1-110 by an adhesive method.

The second driving coil 1-510 is disposed on the moving portion 1-300. In this embodiment, the second driving coil 1-510 is disposed on a side of the moving portion 1-300, more specifically, two second driving coils 1-510 are disposed on two sides of the moving portion 1-300 and opposite to each other. The two sides are the sides without the limiting portions 1-320.

The driving magnetic element 1-520 is disposed on the movable portion 1-200. In this embodiment, the driving magnetic element 1-520 is disposed on a side of the movable portion 1-200. More specifically, two driving magnetic elements 1-520 may be two rectangular magnets, which are disposed on two sides of the frame 1-210 and opposite to each other. The two sides are the sides without the slots 1-213.

Figure 4:
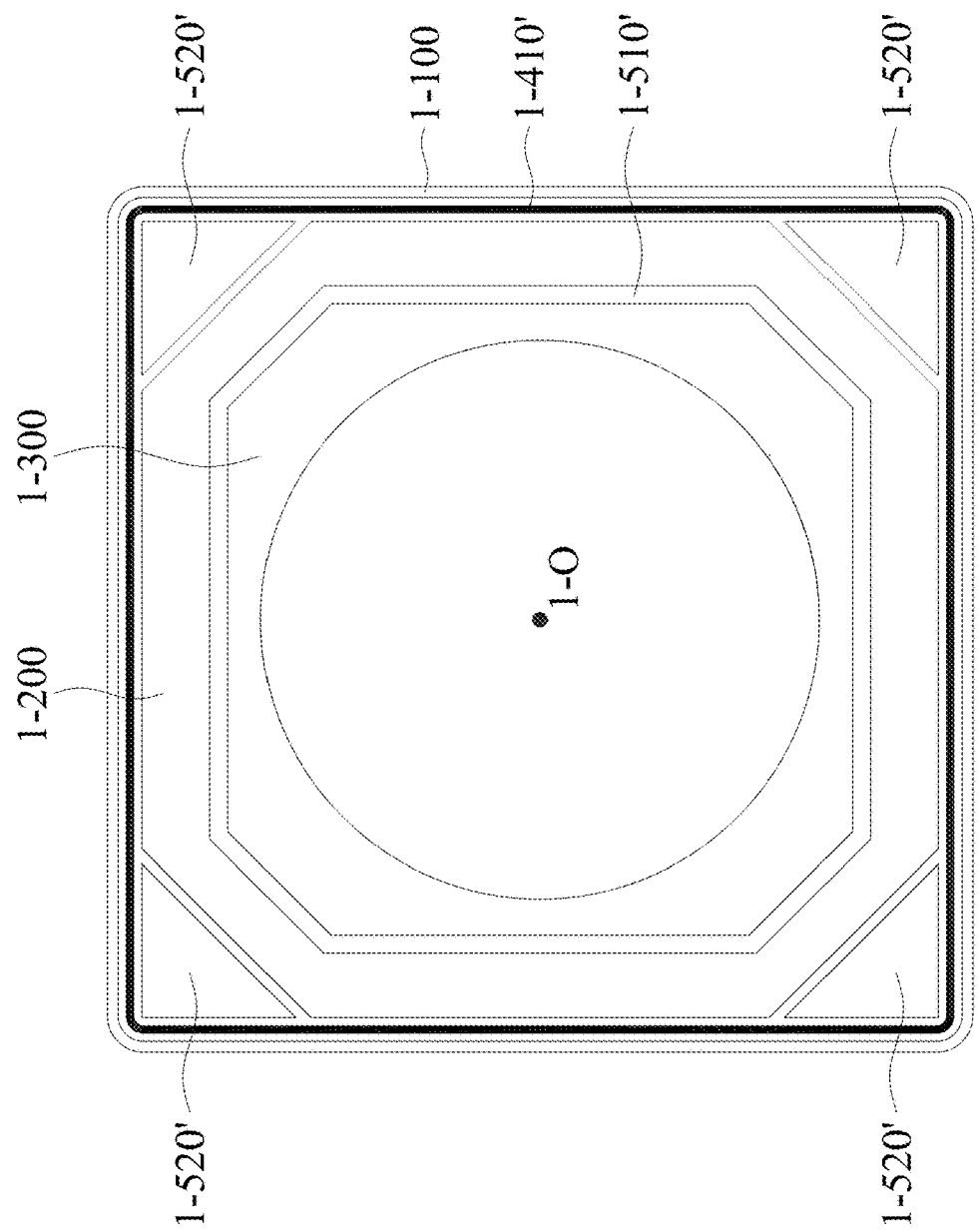
FIG. 4 shows a partial structure diagram of an optical element driving mechanism in accordance with an embodiment of this disclosure.

However, the shape, size, and arrangement of the driving magnetic element 1-520, the first driving coil 1-410, and the second driving coil 1-510 are not limited to those embodiments mentioned above. Refer to FIG. 4. FIG. 4 shows a partial structure diagram of an optical element driving mechanism in accordance with an embodiment of this disclosure. In this embodiment, a first driving coil 1-410' is disposed on the outside of the movable portion 1-200 and the driving magnetic element 1-520'. The second driving coil 1-510' is ring-shaped and is disposed on the outer peripheral surface of the moving portion 1-300. In other words, the second driving coil 1-510' is wound on the outer peripheral surface of the moving portion 1-300, and the driving magnetic element 1-520' is disposed at a corner of the movable portion 1-200.

Figure 5:
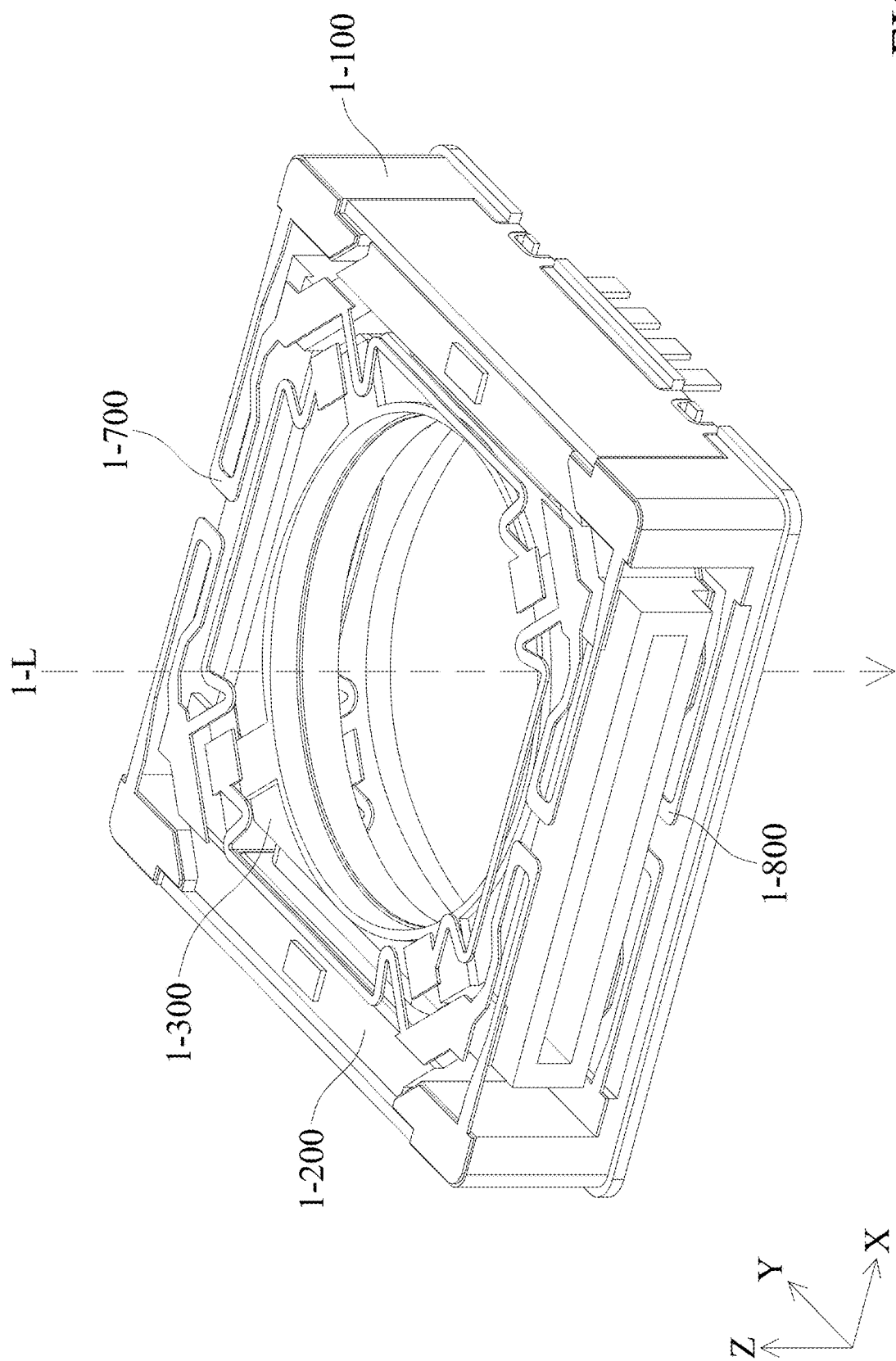
FIG. 5 shows a partial structure diagram of an optical element driving mechanism in accordance with an embodiment of this disclosure.
Figure 6:
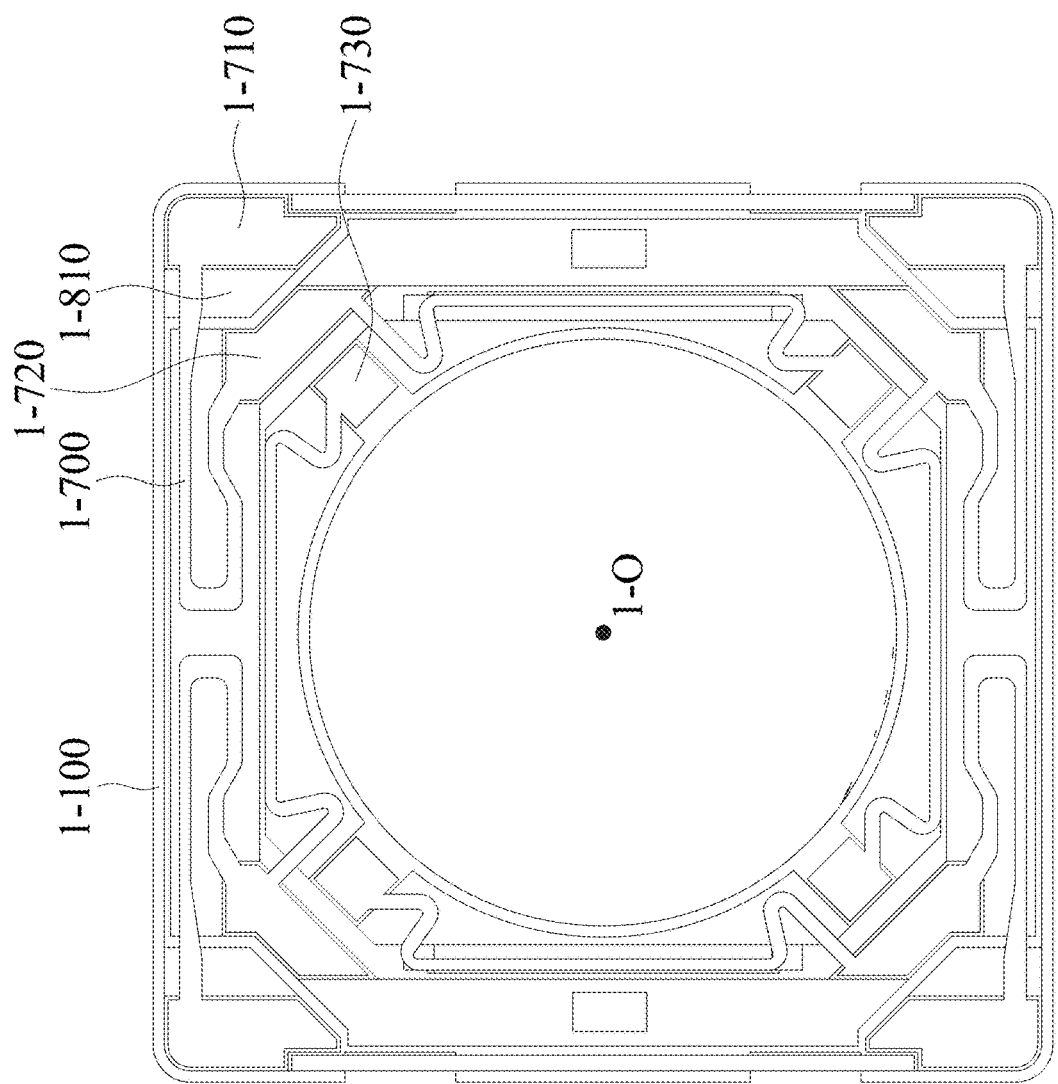
FIG. 6 shows a top view of a partial structure of an optical element driving mechanism of FIG. 1.
Figure 7:
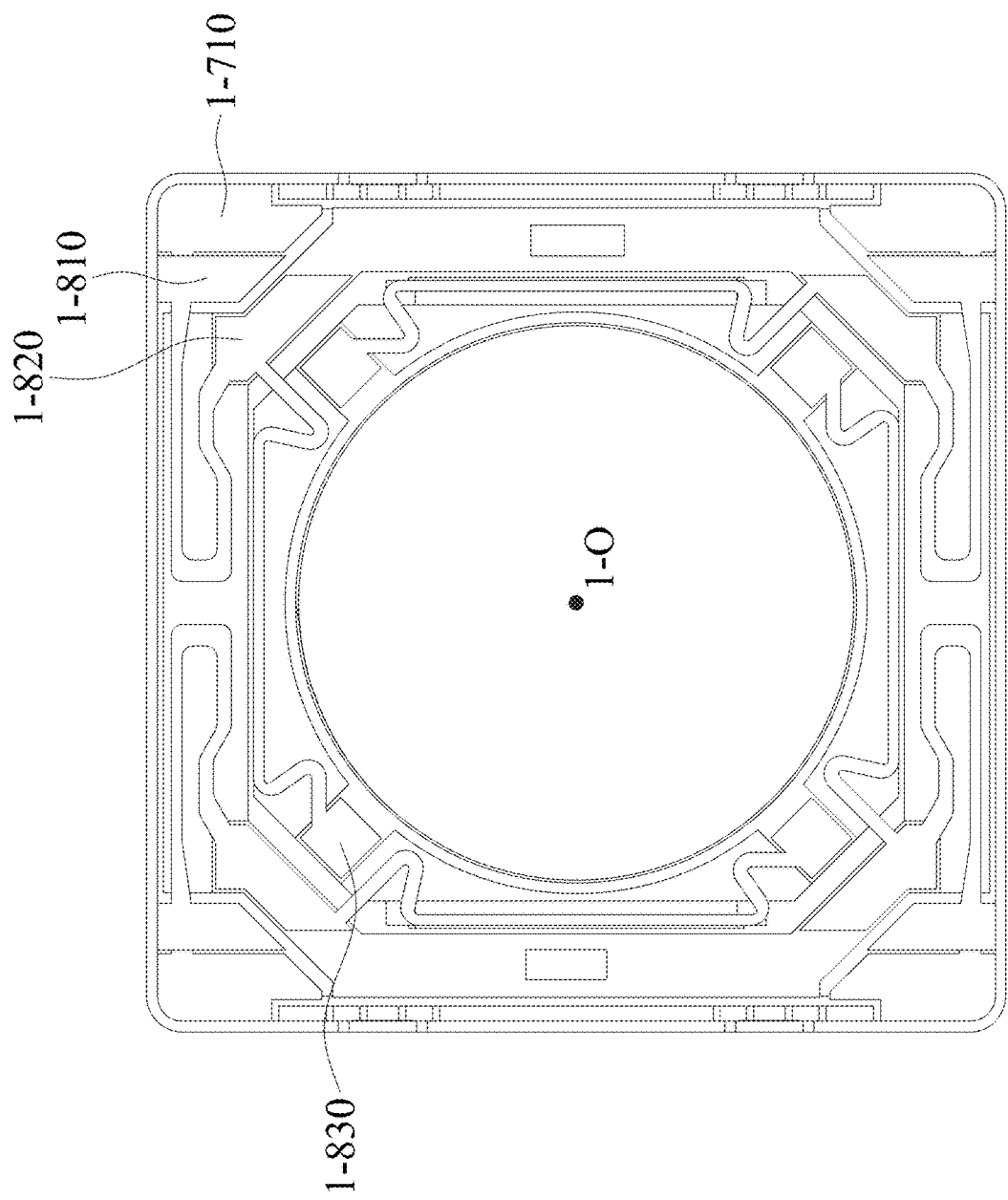
FIG. 7 shows bottom view of a partial structure of an optical element driving mechanism of FIG. 1.

Refer to FIG. 5 to FIG. 7. FIG. 5 shows a partial structure diagram of an optical element driving mechanism in accordance with an embodiment of this disclosure. FIG. 6 shows a top view of a partial structure of an optical element driving mechanism of FIG. 1. FIG. 7 shows bottom view of a partial structure of an optical element driving mechanism of FIG. 1. As shown in FIG. 5, the first elastic assembly 1-700 is integrated plate-shaped structure and the second elastic assembly 1-800 is integrated plate-shaped structure. Four first elastic assemblies 1-700 are disposed on a side of the moving portion 1-300 near a light incident end of a incident light 1-L, and elastically connected to the fixed portion 1-100, the movable portion 1-200, and the moving portion 1-300. More specifically, as shown in FIG. 5 and FIG. 6, the first elastic assembly 1-700 has a first fixed connecting portion 1-710, which is connected to the base 1-110. The first elastic assembly 1-700 has a first movable connecting portion 1-720 and a first moving connecting portion 1-730, which are connected to the movable portion 1-200 and the moving portion 1-300, respectively.

Similarly, four second elastic assemblies 1-800 are disposed on a side of the moving portion 1-300 near a light-emitting end of the incident light 1-L, and elastically connect the fixed portion 1-100, the movable portion 1-200, and the moving portion 1-300. More specifically, as shown in FIG. 7, the second elastic assembly 1-800 has a second fixed connecting portion 1-810, which is connected to the base 1-110. The second elastic assembly 1-800 has a second movable connecting portion 1-820 and a second moving connecting portion 1-830, which are connected to the movable portion 1-200 and the moving portion 1-300, respectively. By the connection of first elastic assembly 1-700 and the second elastic assembly 1-800 described above, the fixed portion 1-100, the movable portion 1-200, and the moving portion 1-300 may move relative to each other.

Figure 8:
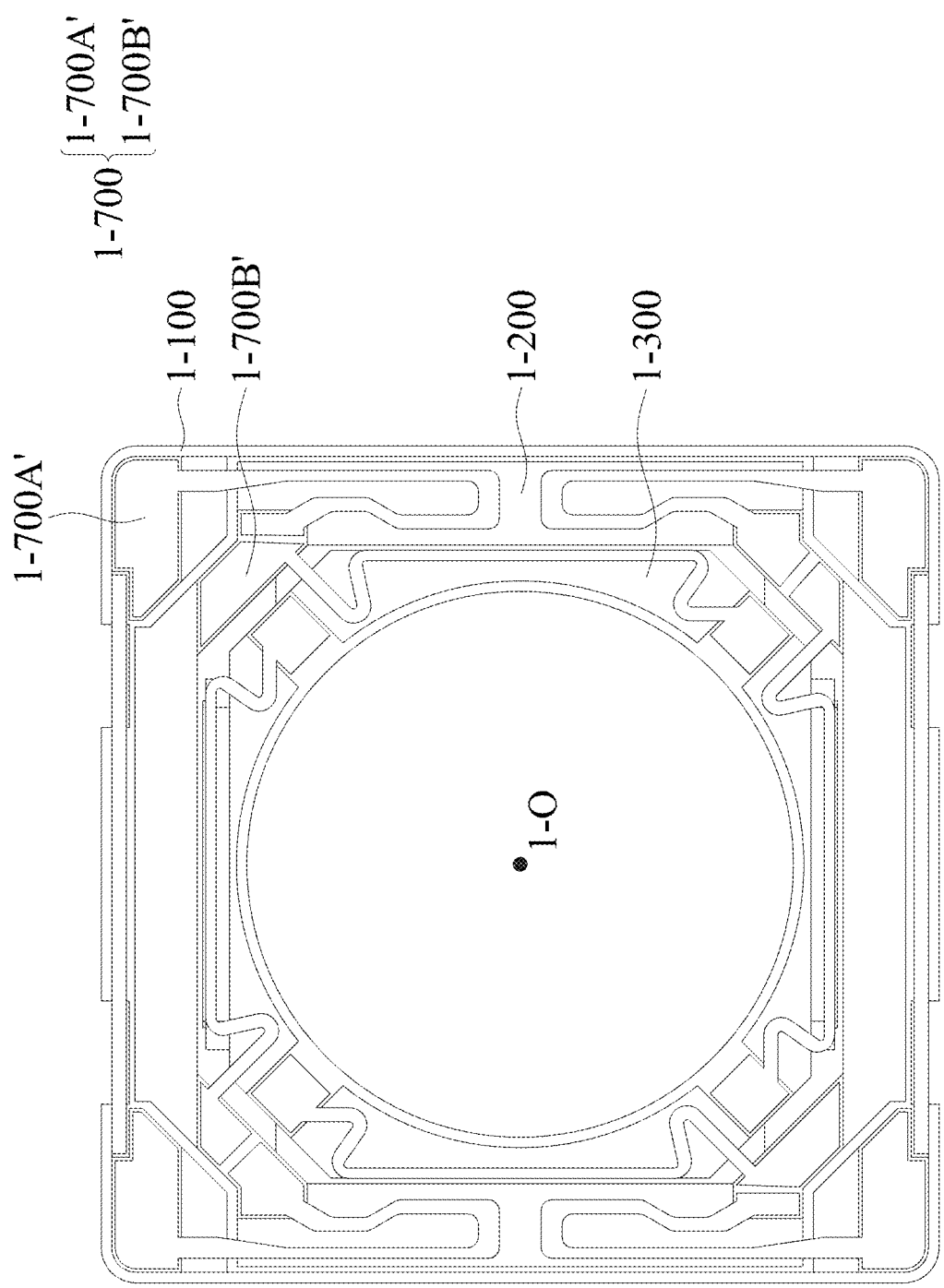
FIG. 8 shows a partial structure diagram of an optical element driving mechanism in accordance with an embodiment of this disclosure.

As shown in FIG. 6 and FIG. 7, when viewed in a direction that is parallel to the optical axis 1-O, the first fixed connecting portion 1-710 and the second fixed connecting portion 1-810 do not overlap each other. The first movable connecting portion 1-720 and the second movable connecting portion 1-820 overlap each other, and the first moving connecting portion 1-730 and the second moving connecting portion 1-830 overlap each other. In other words, the first elastic assembly 1-700 and the second elastic assembly 1-800 have approximately the same shape, but the shape and length can be changed as required. Further, in this embodiment, the integrated plate-shaped structure of the first elastic assembly 1-700 and the second elastic assembly 1-800 can reduce production costs, but the present invention is not limited to this. As shown in FIG. 8, FIG. 8 shows a partial structure diagram of an optical element driving mechanism in accordance with an embodiment of this disclosure. The first elastic assemblies 1-700' is not integrated, but is formed by an elastic assembly 700'A connecting movable portion 1-200 and a fixed portion 1-100 and an elastic assembly 700'B connecting the movable portion 1-200 and the moving portion 1-300.

As described above, the moving portion 1-300 is movably disposed in the movable portion 1-200 and the movable portion 1-200 is movably disposed in the fixed portion 1-100 by the first elastic assembly 1-700 and the second elastic assembly 1-800. More specifically, the moving portion 1-300 may be suspended in the frame 1-210 by the first elastic assembly 1-700 and the second elastic assembly 1-800, and the frame 1-210 may be suspended in the case 1-120 by the first elastic assembly 1-700 and the second elastic assembly 1-800. When a current is applied to the first driving coil 1-410 disposed on the fixed portion 1-100, the first driving coil may act with the magnetic field of the driving magnetic element 1-520 disposed on the movable portion 1-200 to generate an electromagnetic force, so that the frame 1-210 connected by the first movable connecting portion 1-720 of the first elastic assembly 1-700 and the second movable connecting portion 1-820 of the second elastic assembly 1-800 is driven to move relative to the case 1-120 in a direction that is parallel to the optical axis 1-O. That is, a driving method of moving the magnetic element in which the magnetic element moves relative to the driving coil.

On the other hand, when a current is applied to the second driving coil 1-510 disposed on the moving portion 1-300, the second driving coil 1-510 may act with the magnetic field of the driving magnetic element 1-520 disposed on the movable portion 1-200 to generate an electromagnetic force, so that the moving portion 1-300 connected by the first moving connecting portion 1-730 of the first elastic assembly 1-700 and the second moving connecting portion 1-830 of the second elastic assembly 1-800 is driven to move relative to the frame 1-210 in a direction that is parallel to the optical axis 1-O. That is, a driving method of moving the driving coil in which the driving coil moves relative to the magnetic element.

In the conventional optical element driving mechanism, the frame is fixed and immovable, and the movement of the optical element is controlled by an elastic assembly connected to a moving portion, which is a one-step movement. In contrast, in the present embodiment, the first elastic assembly 1-700 and the second elastic assembly 1-800 (referred to as the elastic assembly below) control the movement of the movable portion 1-200 relative to the fixed portion 1-100 and the movement of the moving portion 1-300 relative to the movable portion 1-200. The optical element may be moved in two steps by the elastic assembly.

Figure 9:
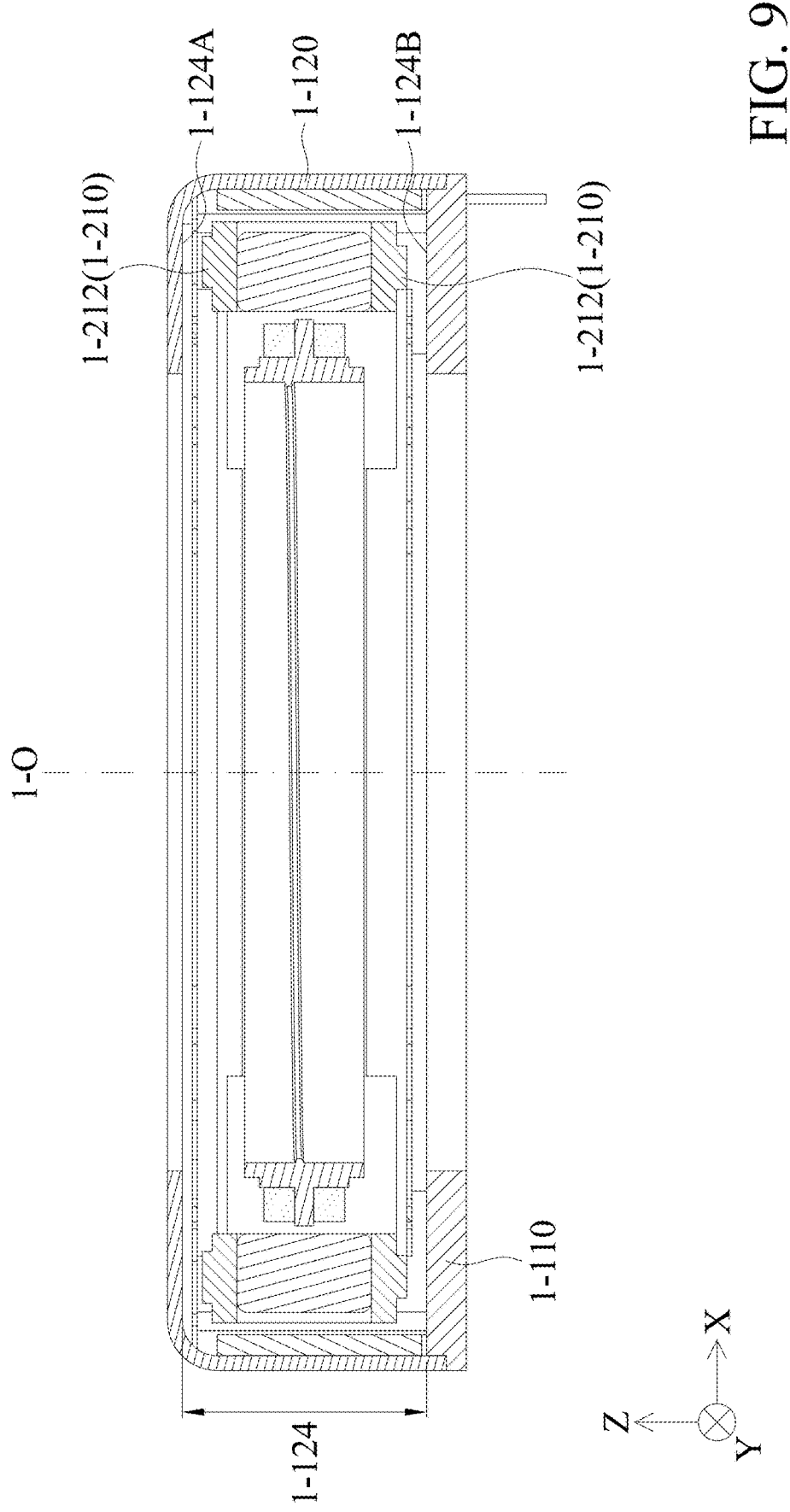
FIG. 9 shows a cross-sectional view of an optical element driving mechanism along a line 1-B to 1-B' in FIG. 1.
Figure 10:
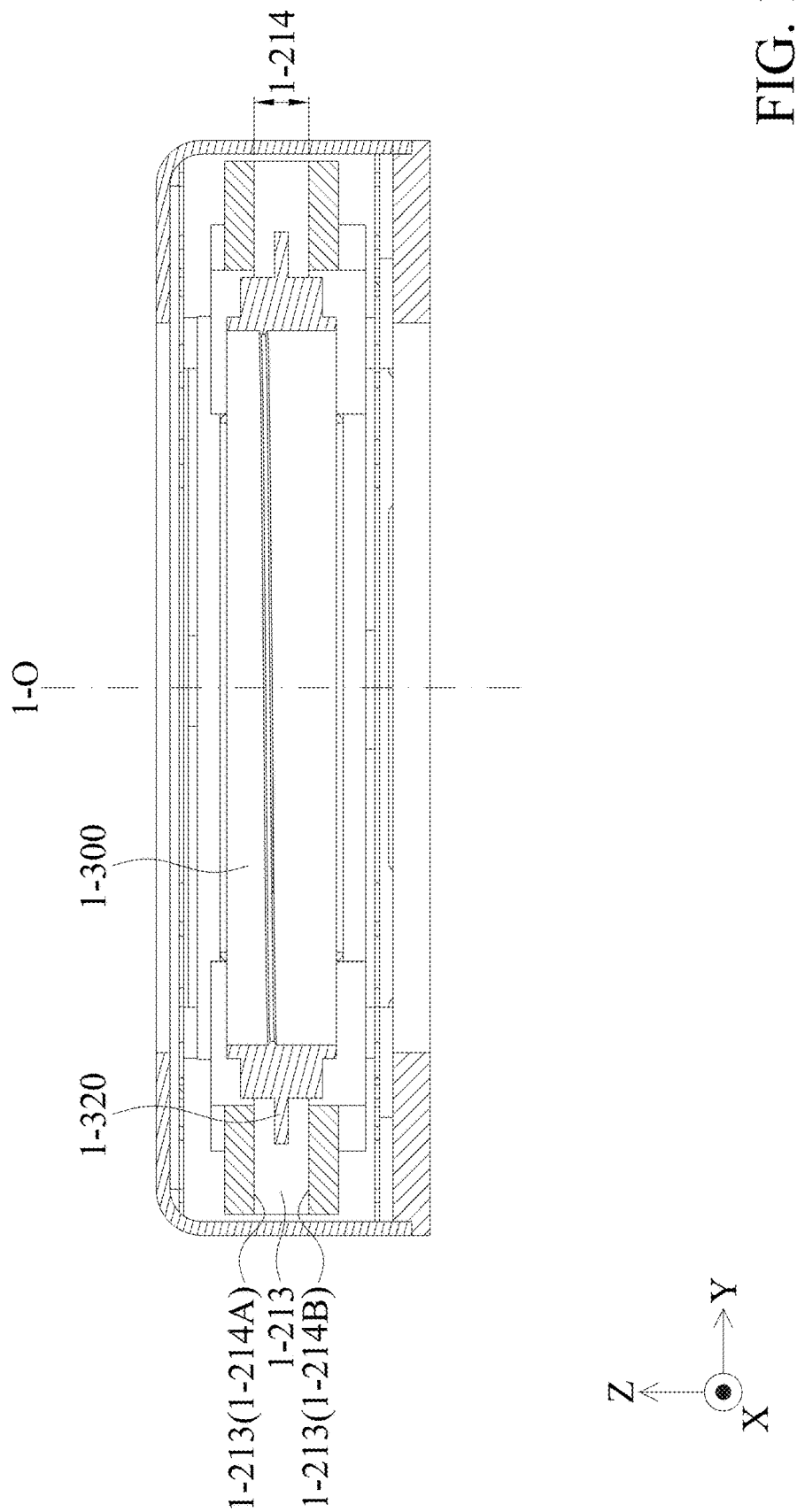
FIG. 10 shows a cross-sectional view of an optical element driving mechanism along a line 1-C to 1-C' in FIG. 1.

In addition, in this embodiment, the movement of the optical element may be controlled within a certain range. The following description is made with reference to FIG. 9 to FIG. 10. FIG. 9 shows a cross-sectional view of an optical element driving mechanism along a line 1-B to 1-B' in FIG. 1. FIG. 10 shows a cross-sectional view of an optical element driving mechanism along a line 1-C to 1-C' in FIG. 1. As shown in FIG. 9, the fixed portion 1-100 has a first upper limit plane 1-124A and a first lower limit plane 1-124B, and the first upper limit plane 1-124A and the first lower limit plane 1-124B restrict the movement of the movable portion 1-200 in a first movement range 1-124, more specifically, an inner wall surface of the case 1-120 of the fixed portion 1-100 constitutes a first upper limit plane 1-124A, and an upper surface of the base 1-110 constitutes a first lower limit plane 1-124B. The upper surface and lower surface of the frame 1-210 of the movable portion 1-200 respectively has a position-limiting portion 1-212 which is convex. When the frame 1-210 is driven to move in a direction that is parallel to the optical axis 1-O, the frame 1-210 stops when the position-limiting portion 1-212 touches the first upper limit plane 1-124A or the first lower limit plane 1-124B. Thus the movement of the frame 1-210 is restricted in the first movement range 1-124. However, the position-limiting portion 1-212 is not limited to this structure, and its shape, height, and position can be changed as required. For example, the position-limiting portion 1-212 can be disposed on an upper surface of the base 1-110 of the fixed portion 1-100 and an inner wall surface of the case 1-120.

Refer to FIG. 10, the movable portion 1-200 has a second upper limit plane 1-214A and a second lower limit plane 1-214B, and restricts the movement of the moving portion 1-300 in a second movement range 1-214. More specifically, an upper wall surface 1-213A and a lower wall surface 1-213B in the slot 1-213 of the movable portion 1-200 constitute a second upper limit plane 1-214A and a second lower limit plane 1-214B. The movement of the moving portion 1-300 is restricted in the second movement range 1-214, and the liming portion 1-320 of the moving portion 1-300 is located within the second movement range 1-214, that is, when the moving portion 1-300 is driven to move in a direction that is parallel to the optical axis 1-O, the moving portion 1-300 stops when the limiting portion 1-320 touches the second upper limit plane 1-214A or the second lower limit plane 1-214B. Thus, the movement of the movable portion 1-300 is restricted in the second movement range 1-214.

The positions of the first upper and lower limiting planes and the second upper and lower limiting planes may be disposed according to requirements, and are not limited. For example, in an embodiment, when viewed in a direction that is perpendicular to the optical axis 1-O, the first upper limit plane 1-124A and the second upper limit plane 1-214A do not overlap each other, or the first lower limit plane 1-124B and the second lower limit plane 1-214B do not overlap each other. In another embodiment, when viewed in a direction that is perpendicular to the optical axis 1-O, the first upper limit plane 1-124A and the second upper limit plane 1-214A do not overlap each other, and the first lower limit plane 1-124B and the second lower limit plane 1-214B do not overlap each other.

Compared with the conventional optical element driving mechanism, in this embodiment, as can be seen from the above, the two-step movement of the elastic assembly and the setting of the movement range of the movable portion 1-200 and the moving portion 1-300 may solve the problem of the elastic assembly being easy to break due to large movements. For example, a conventional elastic assembly of a conventional optical element driving mechanism may only stretch in one step to move an optical element held by a moving portion to achieve a movement of, for example, 300 micrometers. In contrast, in this embodiment, the moving connecting portion (the first moving connecting portion 1-730 and the second moving connecting portion 1-830) of the elastic assembly moves the moving portion 1-300 by 150 micrometers, and the movable connecting portion (the first movable connecting portion 1-720 and the second movable connecting portion 1-820) moves the movable portion 1-200 by 150 micrometers to achieve the movement of 300 micrometers. With two-step stretching, the range that each portion of the elastic assembly needs to stretch will be shorter, and therefore it is less likely to break than with conventional one-step stretching.

In addition, the overall relative moving range of the optical element in this embodiment may also be larger. For example, in the conventional optical element driving mechanism, the optical element held by the moving portion 1-300 may only move by +300 micrometers or –300 micrometers in a direction that is parallel to the optical axis 1-O due to the stretching limit of the elastic assembly. However, in this embodiment, in addition to the ±300 micrometers in which the moving portion 1-300 can move, the frame 1-210 can be moved, for example, ±300 microns, so the overall relative moving range is larger.

In addition, since the overall relative moving range of the optical element in this embodiment is larger, the optical element driving mechanism 1-1 may offer a greater range of focal length when applying in a zoom lens. Therefore, it can achieve a shorter or longer distance focusing. In addition, the one-step stretching elastic assembly of the conventional optical element driving mechanism may be designed longer to achieve the same range of focal length. However, in addition to the breakage problem mentioned above, this design also has a problem with the overall rigidity of the elastic assembly being difficult to control because the elastic assembly is too long, further causing a problem with the position of the optical element being hard to control. In comparison, in this embodiment, same range of focal length can be achieved without the need to use a longer elastic assembly, as the conventional elastic assembly does. In addition, the position of the optical element may be controlled more precisely because the elastic assembly is shorter.

Figure 11:
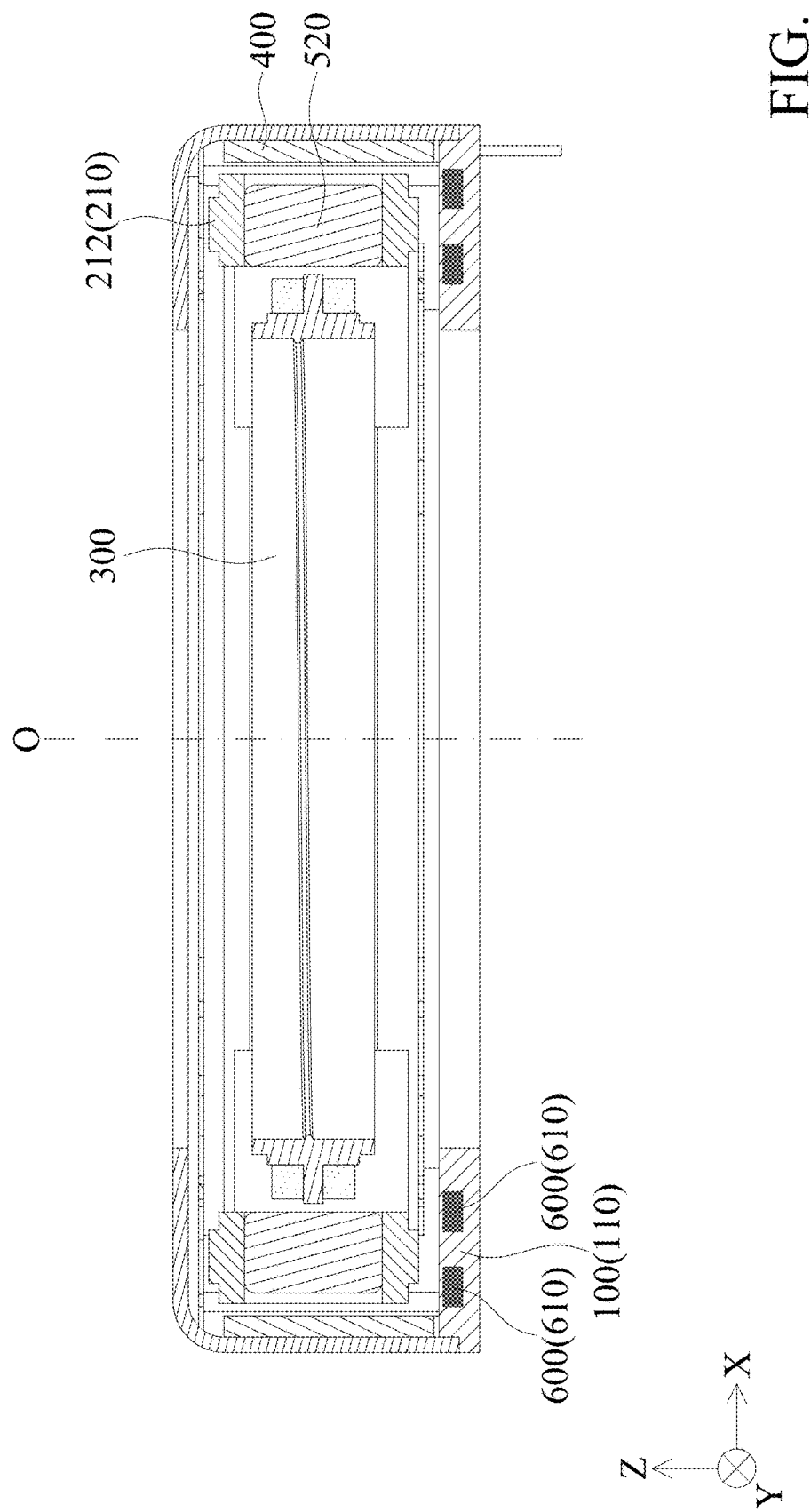
FIG. 11 shows a partial structure diagram of an optical element driving mechanism in accordance with an embodiment of this disclosure.

Refer to FIG. 11. FIG. 11 shows a partial structure diagram of an optical element driving mechanism in accordance with an embodiment of this disclosure. In order to control the optical element more precisely, a third driving assembly 1-600 may be disposed on the fixed portion 1-100 and close to a light-emitting end of the moving portion 1-300. The third driving assembly 1-600 may drive the moving portion 1-300 and the movable portion 1-200 to move relative to the fixed portion 1-100. More specifically, a third driving assembly 1-600 may be disposed on the base 1-110. The third driving assembly 1-600 includes a third driving coils 1-610 embedded in the base 1-110. When viewed in a direction that is parallel to the optical axis 1-O, the third driving coil 1-610 partially overlaps the driving magnetic element 1-520.

Further, the driving direction of the third driving assembly 1-600 is different from that of the first driving assembly 1-400 and the second driving assembly 1-500. The third driving assembly 1-600 drives the moving portion 1-300 and the movable portion 1-200 to move in a direction that is perpendicular to the optical axis 1-O. For example, position sensing elements (not shown), such as Hall effect sensor, magnetoresistive sensor (MR sensor), or magnetic flux sensor (Fluxgate), etc., are respectively installed on different sides of the base 1-110, which can be used to sense the driving magnetic elements 1-520 on the frame 1-210 to know the position offsets of the frame 1-210 and the moving portion 1-300 with respect to the base 1-110 in the X direction and the Y direction. Next, the electric signal is provided to the third driving coil 1-610, and the electromagnetic force generated between the third driving coil 1-610 and the driving magnetic element 1-520 on the frame 1-210 is used to drive the frame 1-210 to move in a direction that is perpendicular to the optical axis 1-O (parallel to the XY plane) to compensate the position offsets mentioned above. In addition to more accurate control of the optical element, the optical image stabilization (OIS) function is further realized.

Second Group of Embodiments

Figure 12:
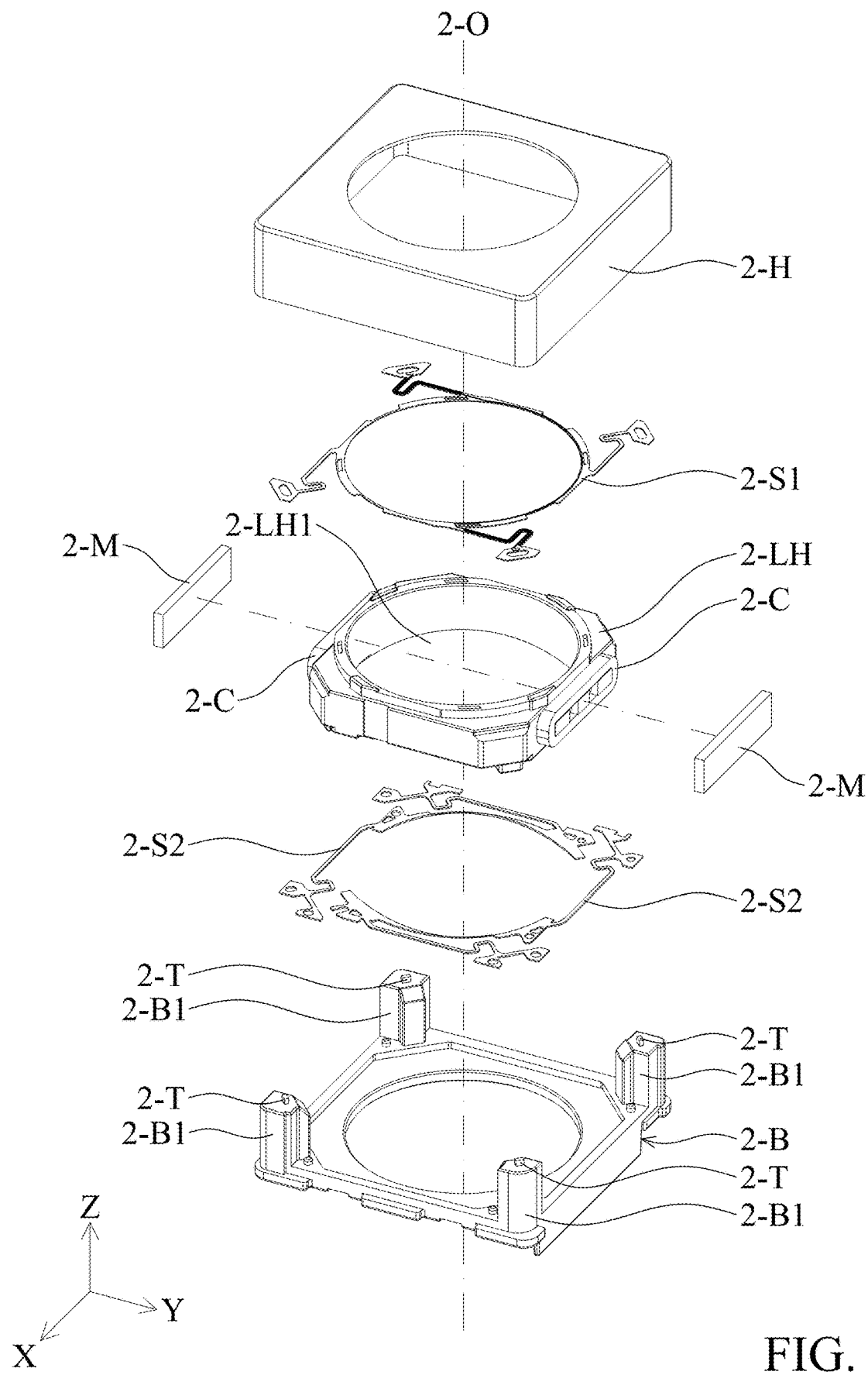
FIG. 12 is an exploded diagram of a driving mechanism according to an embodiment of the invention.
Figure 13:
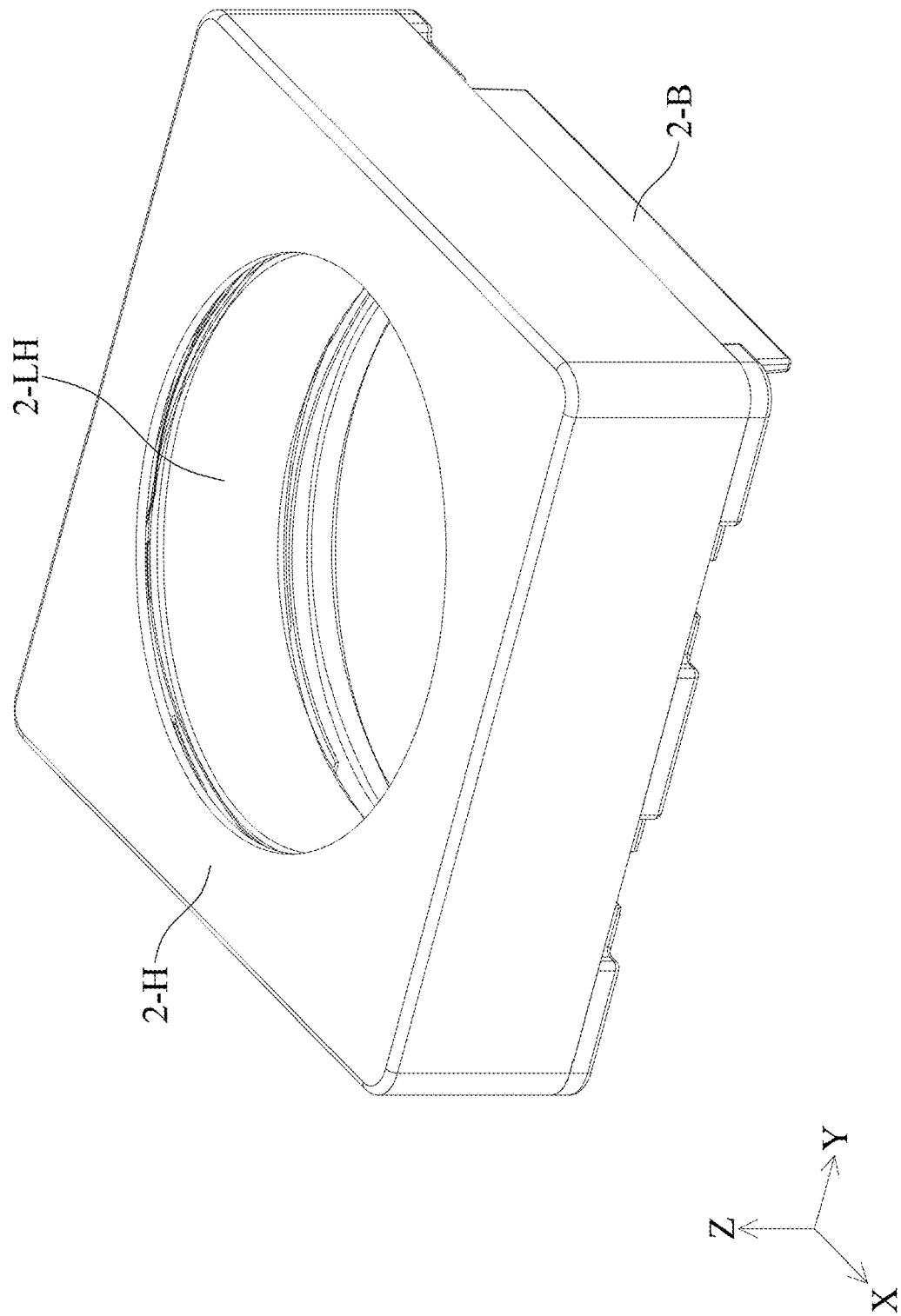
FIG. 13 is a perspective diagram of the driving mechanism in FIG. 12 after assembly.
Figure 14:
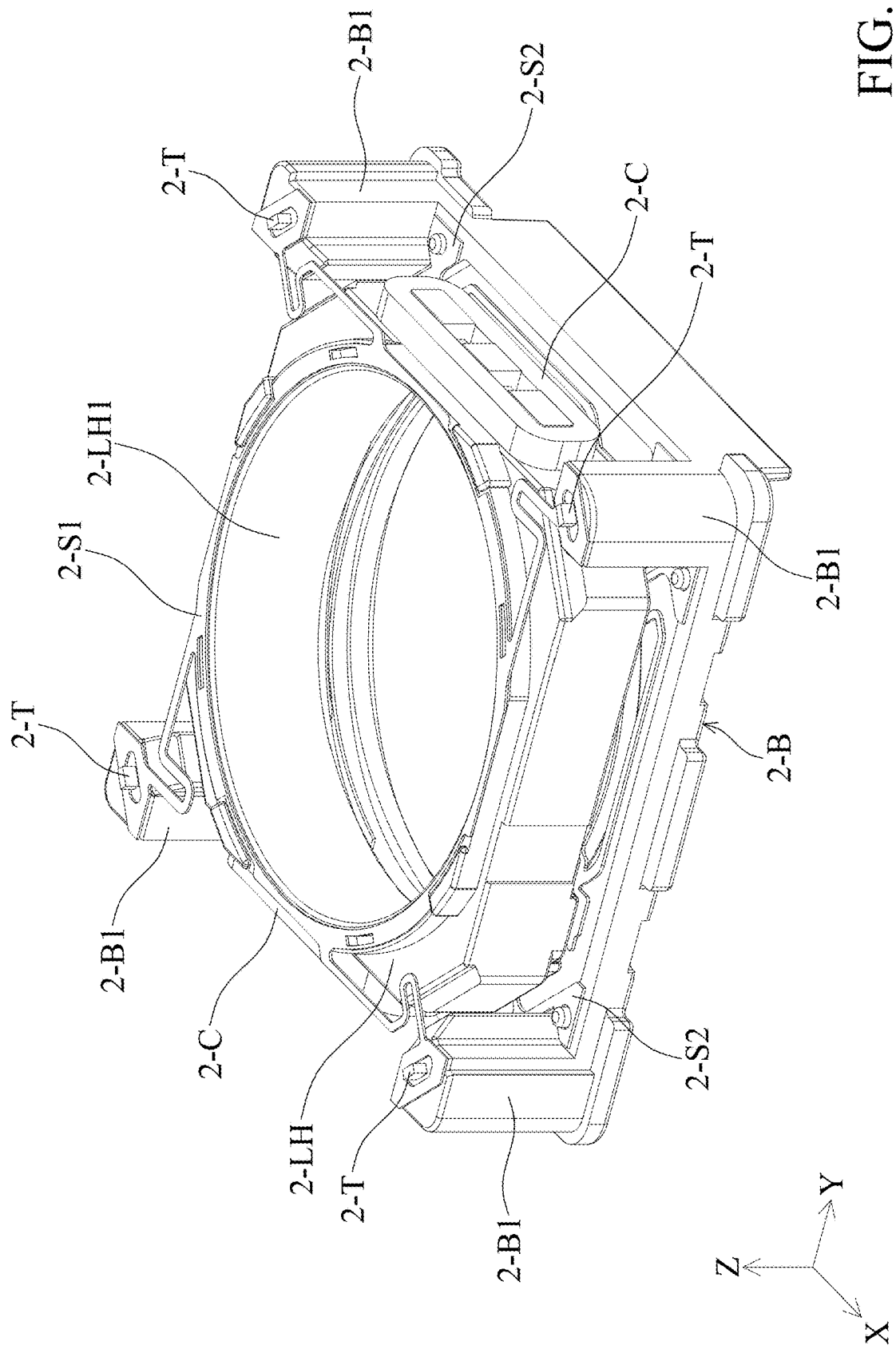
FIG. 14 is a perspective diagram of the driving mechanism in FIG. 13 with the housing 2-H and the magnets 2-M removed.

FIG. 12 is an exploded diagram of a driving mechanism according to an embodiment of the invention, FIG. 13 is a perspective diagram of the driving mechanism in FIG. 12 after assembly, and FIG. 14 is a perspective diagram of the driving mechanism in FIG. 13 with the housing 2-H and the magnets 2-M removed.

As shown in FIGS. 12-14, the driving mechanism in this embodiment may be a voice coil motor (VCM) that is disposed in a camera module of a cell phone for moving an optical element. The driving mechanism primarily comprises a housing 2-H, a resilient member 2-S1, a holder 2-LH, at least one coil 2-C, at least one magnet 2-M, at least one resilient member 2-S2, and a base 2-B. The resilient members 2-S1 and 2-S2 are disposed on the top and bottom sides of the holder 2-LH to movably connect the base 2-B with the holder 2-LH, and an optical element (e.g. optical lens) can be secured in the opening 2-LH1 at the center of the holder 2-LH. In this embodiment, the holder 2-LH constitutes a movable part of the driving mechanism and is movable relative to the base 2-B along an optical axis 2-O (Z direction) of the optical element, thus achieving auto focusing or optical image stabilization (OIS) of the camera module.

Referring to FIGS. 12 and 14, the rectangular base 2-B comprises resin material and forms four protruding columns 2-B1 at the corners thereof. At least one metal piece is embedded in the base 2-B with the terminals 2-T thereof exposed to the top surfaces of the protruding columns 2-B1. In practice, the terminals 2-T may be electrically connected to the resilient member 2-S1 by soldering, welding or conductive glue. Here, the resilient member 2-S1 is a flexible element (e.g. metal sheet spring) that electrically connects to the terminals 2-T of the metal piece and the coils 2-C on the holder 2-LH. Hence, an external circuit can apply an electrical current signal through the metal piece and the resilient member 2-S1 to the coils 2-C, whereby the holder 2-LH can be driven to move or rotate relative to the base 2-B.

Additionally, a control circuit element (not shown) may be provided in the driving mechanism, such as an IC element that includes a microcontroller unit (MCU) and a memory unit. The control circuit element may be disposed on the holder 2-LH or the base 2-B, and it is electrically connected to the resilient member 2-S1 and the coils 2-C. Since the resilient member 2-S1 in this embodiment comprises a metal sheet spring, it can be used as a strain gauge to detect the position of the holder 2-LH relative to the base 2-B. It should be noted that when the holder 2-LH moves relative to the base 2-B, the resilient member 2-S1 deforms, and the electrical parameter (e.g. resistance, inductance or capacitance) of the resilient member 2-S1 changes accordingly. Therefore, the position or angle of the holder 2-LH (movable part) relative to the housing 2-H and the base 2-B (fixed part) can be detected by the control circuit element measuring the electrical parameter (e.g. resistance, inductance or capacitance) of the resilient member 2-S1.

In some embodiments, some predetermined information can be stored in the memory unit of the control circuit element, wherein the predetermined information may include a relationship between the electrical parameter of the resilient member 2-S1 and the position of the holder 2-LH (movable part) relative to the housing 2-H and the base 2-B (fixed part). Subsequently, the control circuit element can compare the electrical parameter of the resilient member 2-S1 to the predetermined information, and then output an electrical signal accordingly to the coils 2-C on the holder 2-LH, thus driving the holder 2-LH and the optical element to rapidly move to a target position by closed-loop control.

In some embodiments, the predetermined information may be obtained by an external instrument measuring the driving mechanism. The external instrument may be electrically connected to the control circuit element for measuring and obtaining the predetermined information, and it can be detached from the driving mechanism after the predetermined information is stored in the memory unit of the control circuit element.

In some embodiments, the driving mechanism may comprise a wire (flexible element) that is made of shape memory alloy (SMA). The SMA wire connects the holder 2-LH with the base 2-B and electrically connects to the control circuit element. When the holder 2-LH moves relative to the base 2-B, the length and the electrical parameter (e.g. resistance, inductance or capacitance) of the SMA wire change accordingly. Hence, the position or angle of the holder 2-LH (movable part) relative to the housing 2-H and the base 2-B (fixed part) can be detected by the control circuit element measuring the electrical parameter (e.g. resistance, inductance or capacitance) of the SMA wire.

As shown in FIGS. 12-14, the housing 2-H and the base 2-B constitute a fixed part of the driving mechanism, and the coils 2-C and the magnets 2-M constitute a driving assembly of the driving mechanism, wherein the coils 2-C are affixed to the outer surface of the holder 2-LH, and the magnets 2-M are affixed to the inner surface of the housing 2-H and located corresponding to the coils 2-C. During operation of the driving mechanism, an electrical current signal can be applied to the coils 2-C. Therefore, an electromagnetic force is generated by the coils 2-C and the magnets 2-M to move or rotate the holder 2-LH relative to the base 2-B, thus achieving rapid focusing and optical image stabilization (OIS) of the camera module.

Figure 15:
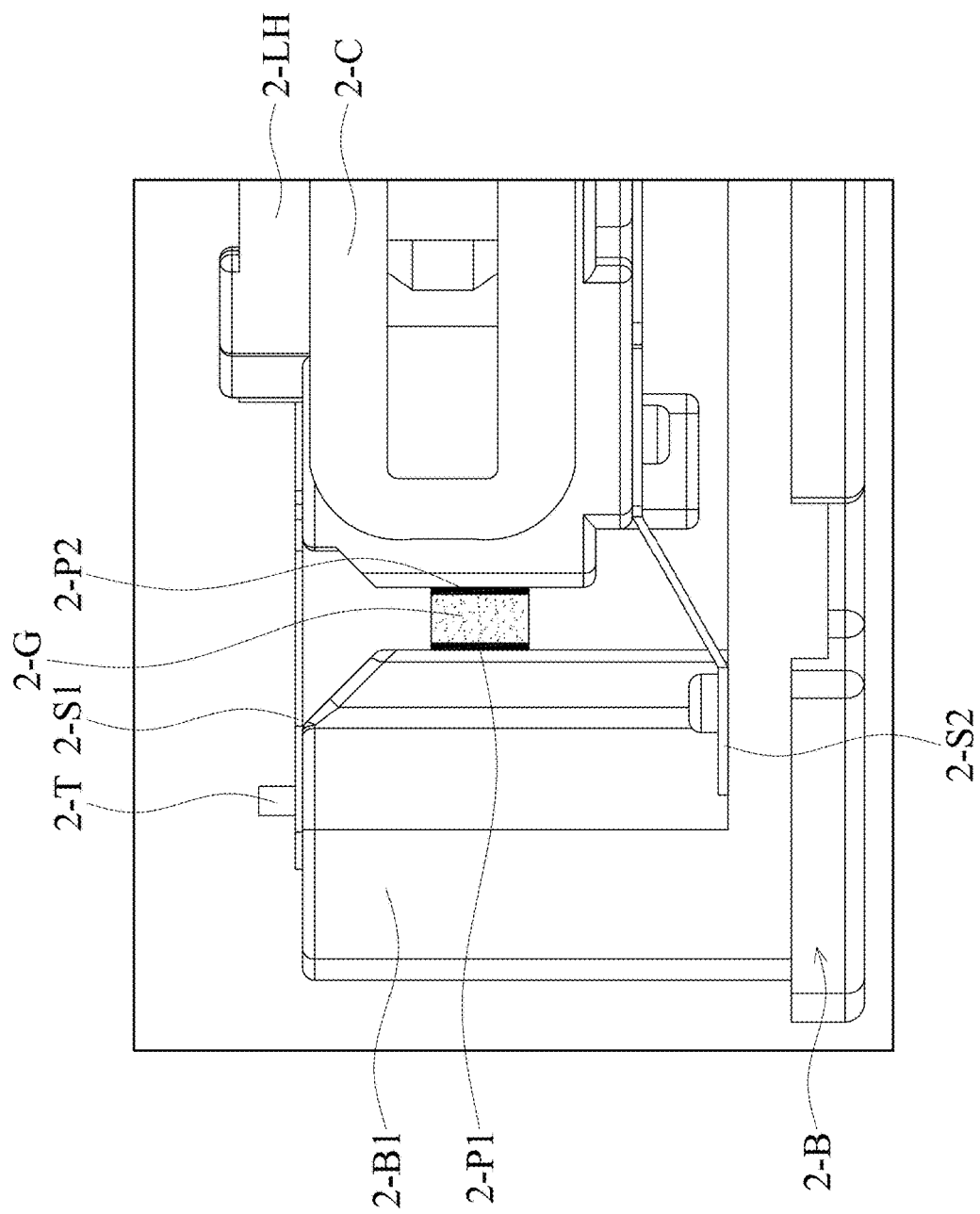
FIG. 15 is a partial enlarged view of a driving mechanism according to another embodiment of the invention.
Figure 16:
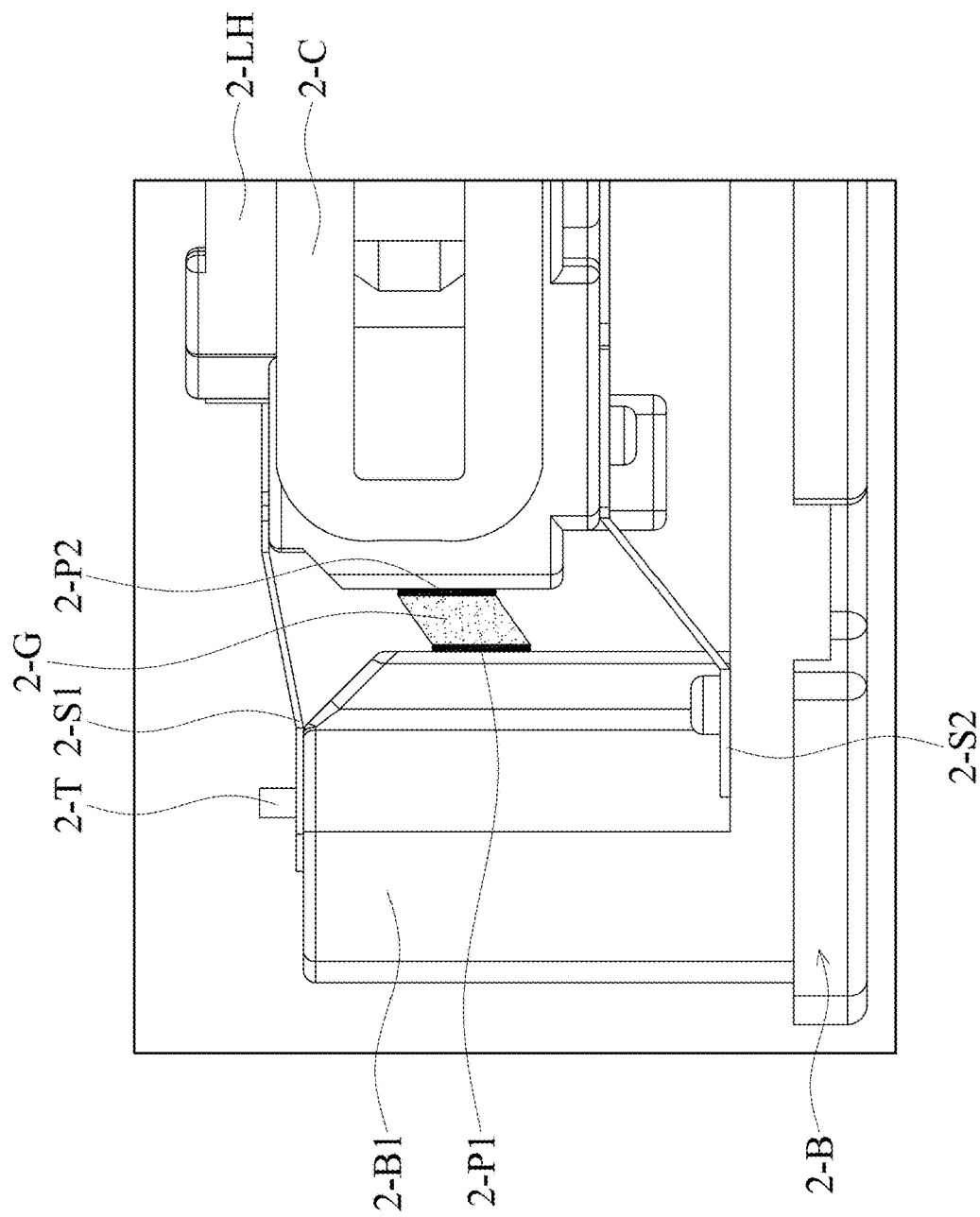
FIG. 16 is a partial enlarged view shows the holder 2-LH in FIG. 15 when moving upward relative to the base 2-B in the Z direction.

FIG. 15 is a partial enlarged view of a driving mechanism according to another embodiment of the invention, and FIG. 16 is a partial enlarged view shows the holder 2-LH in FIG. 15 when moving upward relative to the base 2-B in the Z direction.

Referring FIGS. 15 and 16, the driving mechanism in this embodiment is different from FIGS. 12-14 in that at least a buffer element 2-G is disposed between the holder 2-LH and the base 2-B. The buffer element 2-G may comprise soft resin material (e.g. conductive gel), and it is connected to a contact pad 2-P1 that is exposed to the inner side of the base 2-B (fixed part) and another contact pad 2-P2 that is exposed to the outer side of the holder 2-LH (movable part).

In this embodiment, the buffer element 2-G is used as a flexible damper between the holder 2-LH and the base 2-B. The buffer element 2-G is electrically connected to the control circuit element via the contact pads 2-P1 and 2-P2 to form a detection circuit. As shown in FIG. 16, when the holder 2-LH in FIG. 15 moves upward relative to the base 2-B in the Z direction, the buffer element 2-G deforms, and the electrical parameter (e.g. resistance, inductance or capacitance) of the buffer element 2-G changes accordingly. Hence, the position or angle of the holder 2-LH (movable part) relative to the housing 2-H and the base 2-B (fixed part) can be detected by the control circuit element measuring the electrical parameter (e.g. resistance, inductance or capacitance) of the buffer element 2-G.

In some embodiments, several buffer elements 2-G may be disposed on the four sides or at the four corners (between the holder 2-LH and the protruding columns of the base 2-B) of the rectangular driving mechanism to connect the holder 2-LH with the base 2-B, and the resilient members 2-S1 and 2-S2 may be omitted from the driving mechanism. In some embodiments, the buffer elements 2-G may encompass a part of the resilient members 2-S1 and 2-S2 or the wires made of shape memory alloy (SMA). Since the buffer elements 2-G deform along with the resilient members 2-S1, 2-S2 and the SMA wires when the holder 2-LH moves relative to the base 2-B, the position or angle of the holder 2-LH (movable part) relative to the housing 2-H and the base 2-B (fixed part) can be detected by the control circuit element measuring the electrical parameter (e.g. resistance, inductance or capacitance) of the buffer elements 2-G.

In some embodiments, four buffer elements 2-G may be disposed on the four sides or at the four corners of the driving mechanism, and they may be arranged in a rotational symmetrical manner or in a mirror symmetrical manner with respect to the optical axis 2-O of the optical element. When the holder 2-LH moves relative to the base 2-B, the buffer elements 2-G may deform in different ways. For example, when a buffer element 2-G on the left side of the optical axis 2-O is elongated, another buffer element 2-G on the right side of the optical axis 2-O is compressed. In some embodiments, the buffer element 2-G may be filled in the space between the holder 2-LH and the base 2-B (or the holder 2-LH and the housing 2-H), so that the buffer element 2-G may extend through a side of the holder 2-LH or surround the holder 2-LH.

In some embodiments, the holder 2-LH can move within a specific interval relative to the base 2-B, and the electrical parameter (e.g. resistance, inductance or capacitance) of the buffer element 2-G is set as an initial value when the holder 2-LH is at the end position of the specific interval. It should be noted that the electrical parameter of the buffer element 2-G changes when the holder 2-LH in different positions of the specific interval.

In some embodiments, the driving mechanism may comprise two holders 2-LH respectively holding an optical element (e.g. optical lens). Specifically, the buffer element 2-G is connected to the two holders 2-LH and electrically connected to the control circuit element. Thus, the relative position or angle between the two holders 2-LH (movable part) can be detected by the control circuit element measuring the electrical parameter (e.g. resistance, inductance or capacitance) of the buffer element 2-G.

Figure 17:
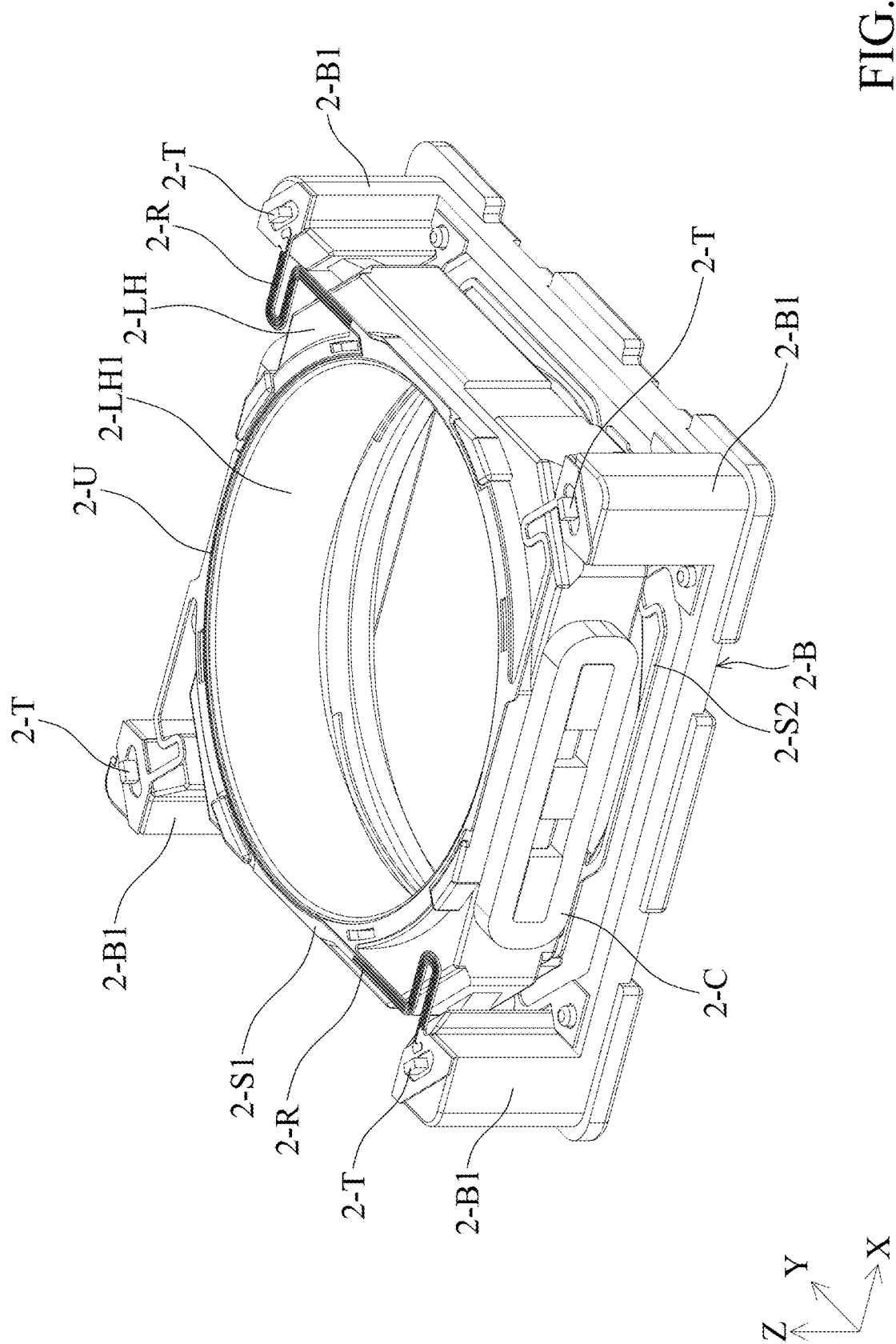
FIG. 17 is a perspective diagram of a driving mechanism with the housing 2-H and the magnets 2-M removed according to another embodiment of the invention.
Figure 18:
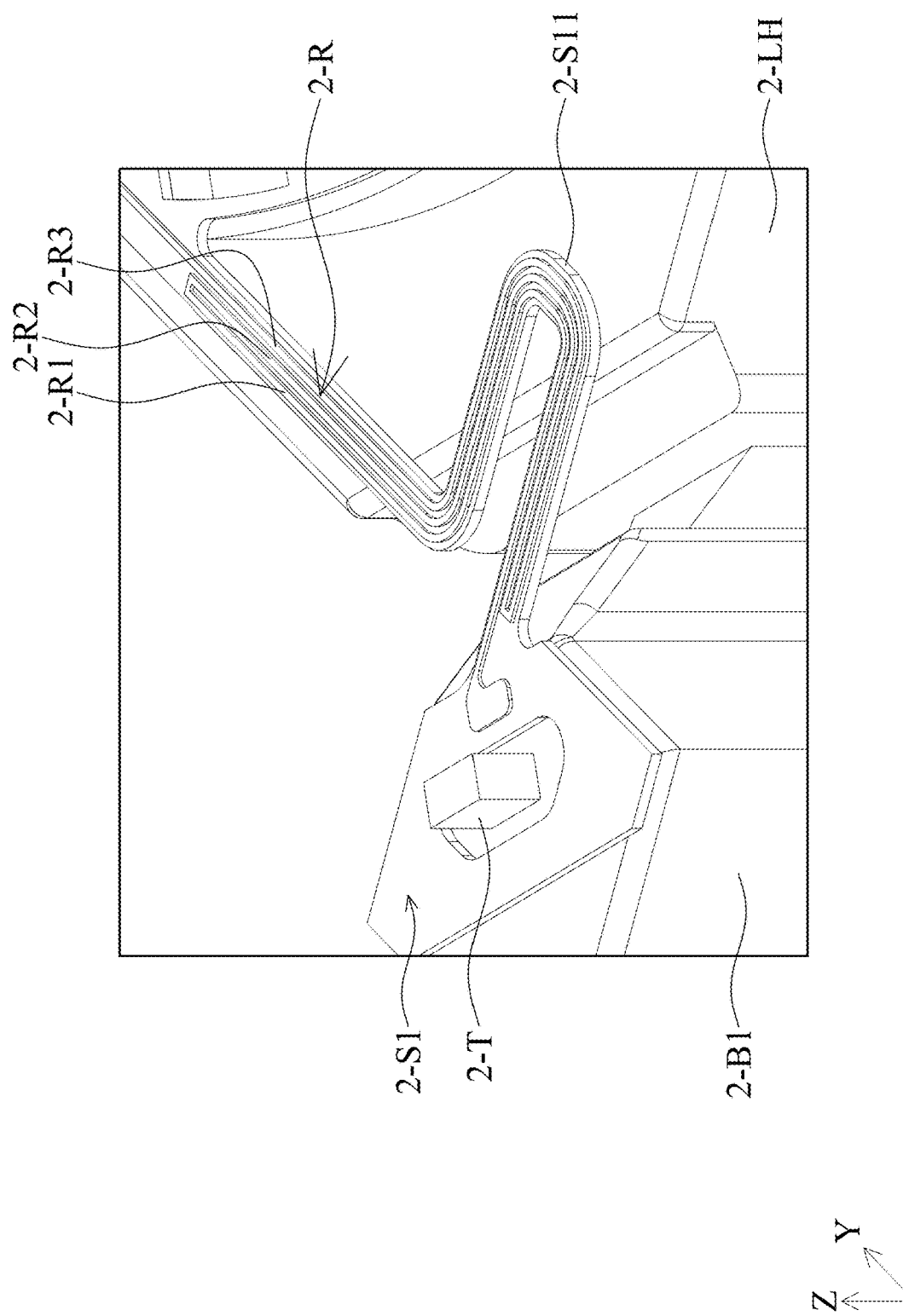
FIG. 18 is a partial enlarged view of FIG. 17 that shows a conductive structure 2-R formed on a connection portion 2-S11 of the resilient member 2-S1.

FIG. 17 is a perspective diagram of a driving mechanism with the housing 2-H and the magnets 2-M removed according to another embodiment of the invention, and FIG. 18 is a partial enlarged view of FIG. 17 that shows a conductive structure 2-R formed on a connection portion 2-S11 of the resilient member 2-S1.

Referring FIGS. 17 and 18, the driving mechanism in this embodiment is different from FIGS. 12-14 in that two conductive structures 2-R are respectively formed on two connection portions 2-S11 of the resilient member 2-S1, wherein the connection portions 2-S11 are suspended between the holder 2-LH (movable part) and the base 2-B (fixed part). The conductive structure 2-R may be a flexible element that is integrally formed on the upper surface of the connection portion 2-S11 by metallic printing ink or circuit-on-metal technology, and an insulating layer may be formed between the conductive structures 2-R and the resilient member 2-S1 to prevent short circuit thereof.

In this embodiment, the two conductive structures 2-R are disposed on opposite sides of the resilient member 2-S1, and they can be electrically connected to the control circuit element via the terminals 2-T on the top side of the protruding columns 2-B1 to form a detection circuit. Here, the conductive structures 2-R are used as strain gauges to detect the position of the holder 2-LH relative to the base 2-B.

It should be noted that when the holder 2-LH moves relative to the base 2-B, the conductive structure 2-R deforms along with the connection portion 2-S11 of the resilient member 2-S1, so that the electrical parameter (e.g. resistance, inductance or capacitance) of the conductive structure 2-R changes accordingly. Therefore, the position or angle of the holder 2-LH (movable part) relative to the housing 2-H and the base 2-B (fixed part) can be detected by the control circuit element measuring the electrical parameter (e.g. resistance, inductance or capacitance) of the conductive structure 2-R.

As shown in FIG. 18, each of the meandering conductive structures 2-R has three parallel longitudinal extending portions 2-R1, 2-R2 and 2-R3 formed on the upper surface of the connection portion 2-S11 of the resilient member 2-S1, so as to detect the position or angle of the holder 2-LH relative to the base 2-B. In some embodiments, one or several conductive structures 2-R may be formed the top and bottom surfaces of the conductive structure 2-R, thus facilitating sensitive and precise position detection of the holder 2-LH relative to the base 2-B.

Third Group of Embodiments

Figure 19:
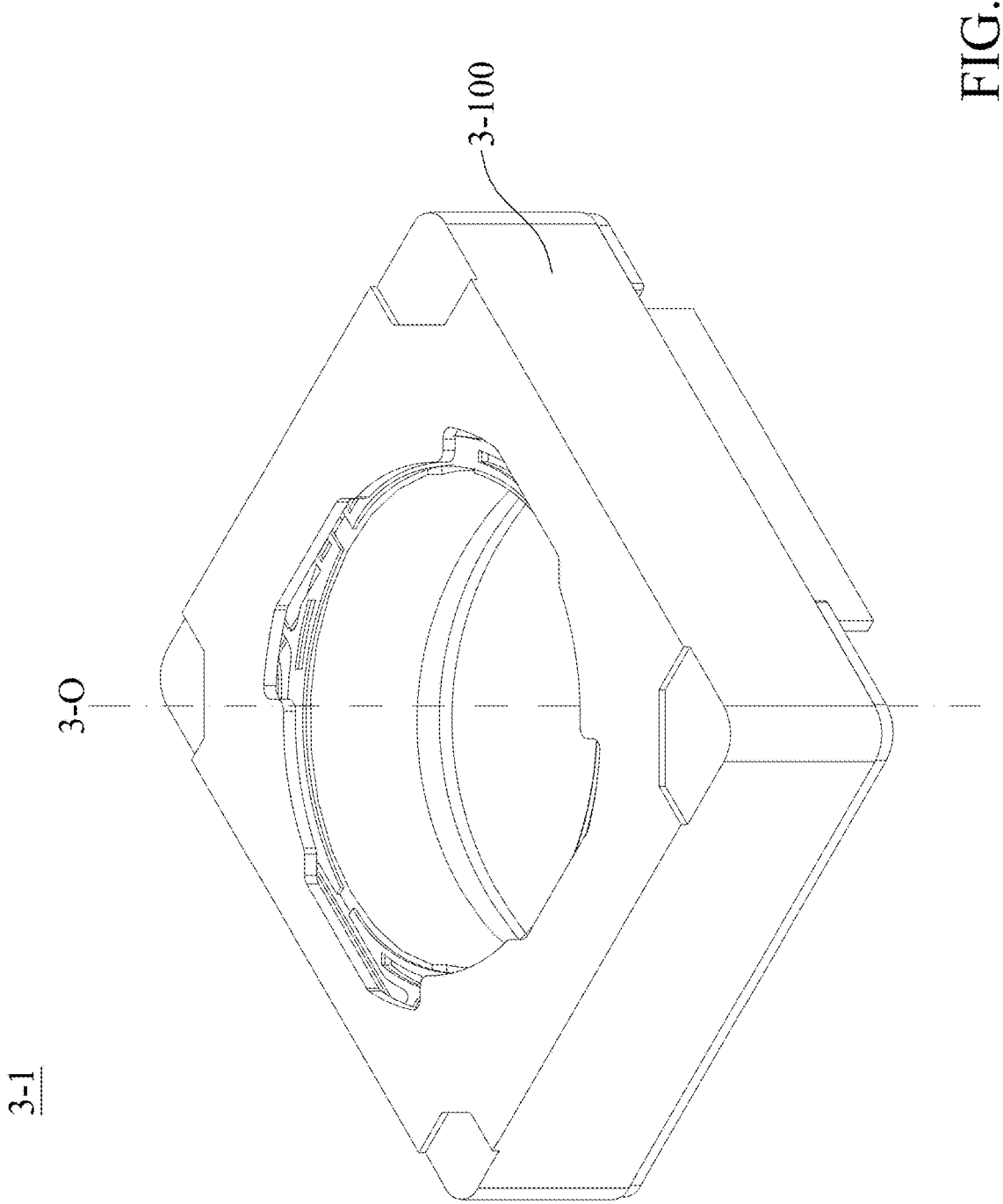
FIG. 19 is a perspective view of an optical element driving mechanism according to an embodiment of the disclosure.
Figure 20:
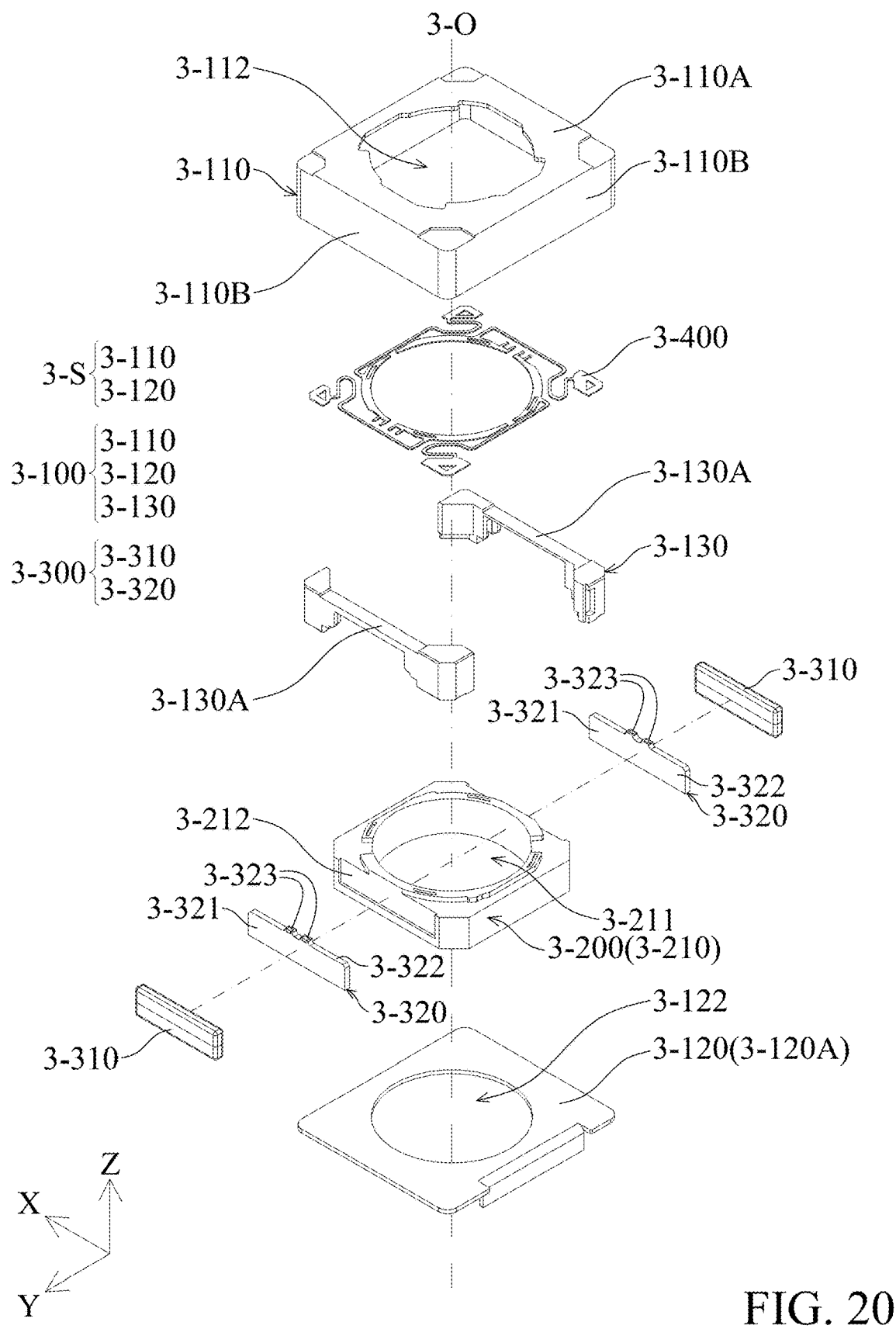
FIG. 20 is an exploded view of an optical element driving mechanism according to an embodiment of the disclosure.

Refer to FIG. 19 to FIG. 20. FIG. 19 is a perspective view of an optical element driving mechanism 3-1 according to an embodiment of the present disclosure. FIG. 20 is an exploded view of an optical element driving mechanism 3-1 according to an embodiment of the present disclosure. The optical element driving mechanism 3-1 has an optical axis 3-O, and includes a fixed portion 3-100, a movable portion 3-200, a driving portion 3-300, and an elastic element 3-400. In this embodiment, the optical element driving mechanism 3-1 is a voice coil motor (VCM) with an auto focusing (AF) function, but is not limited to this. In some embodiments, the optical element driving mechanism 3-1 can also have auto focus and optical image stabilization (OIS) functions.

The fixed portion 3-100 includes a top case 3-110, a base 3-120, and a frame 3-130. The top case 3-110 has a hollow structure, and can be combined with the base 3-120 to form a housing 3-S of the optical element driving mechanisms 3-1, wherein the top case 3-110 constitutes a top wall 3-110A and four side walls 3-110B of the housing 3-S, and the base 3-120 constitute a bottom wall 3-120A of the housing 3-S. It should be understood that the top case 3-110 and the base 3-120 are formed with a top case opening 3-112 and a base opening 3-112, respectively. The center of the top case opening 3-112 corresponds to the optical axis 3-O, and the base opening 3-112 corresponds to an image-sensing element (not shown in the figures) disposed outside the optical element driving mechanism 3-1. External light may enter the top case 3-110 through the top case opening 3-112, and is received by the image-sensing element (not shown in the figures) after passing through an optical element (not shown in the figures) and the base opening 3-112, so as to generate a digital image signal. The frame 3-130 has a frame edge 3-130A, wherein the frame edge 3-130A corresponds to the side wall 3-110B of the top case 3-110.

The movable portion 3-200 may be connected with an optical element, and moves relative to the fixed portion 3-100. In this embodiment, the movable portion 3-200 is a holder 3-210, which has a through hole 3-211 and a groove 3-212, wherein the through hole 3-211 forms a threaded structure (not shown in the figures) corresponding to another threaded structure on the outer peripheral surface of the optical element, so that the optical element may be secured in the through hole 3-211.

The driving portion 3-300 includes a magnetic element 3-310 and a driving coil 3-320. The shape of the magnetic element 3-310 may be a long strip, and the magnetic element 3-310 may be fixed to the frame edge 3-130A of the frame 3-130. In some embodiments, the magnetic element 3-310 may have other different shapes, and the magnetic element 3-310 may be affixed to four corners of the frame 3-130.

In this embodiment, the driving coil 3-320 is a plate coil 3-320 made using Flexible Printed Circuit (FPC) technology. The plate coil 3-320 is rectangular and has a plane 3-321, an insulating layer 3-322, a coil 3-323, and an electronic element (not shown in the figures). The plate coil 3-320 is disposed on the groove 3-212 of the holder 3-210, and the plane 3-321 is parallel with the optical axis 3-O. When viewed in a direction that is parallel to the optical axis 3-O, the plate coil 3-320 partially overlaps the holder 3-210. In other words, the plate coil 3-320 is partially received in the groove 3-212, but is not limited this. In some embodiments, the plate coil 3-320 may also be completely received in the groove 3-212.

The number of the grooves 3-212, the plate coils 3-320, and the magnetic elements 3-310 is not limited, and may be determined according to requirements. In some embodiments of the present invention, four plate coils 3-320 are disposed on four grooves 3-212 of the holder 3-210, and correspond to four magnetic elements 3-310 disposed on the frame 3-130. In some embodiments of the present invention, two plate coils 3-320 are disposed on the opposite sides of two grooves 3-212 of the base 3-210, and correspond to two magnetic elements 3-310 disposed on the opposite sides of the frame 3-130.

Figure 21:
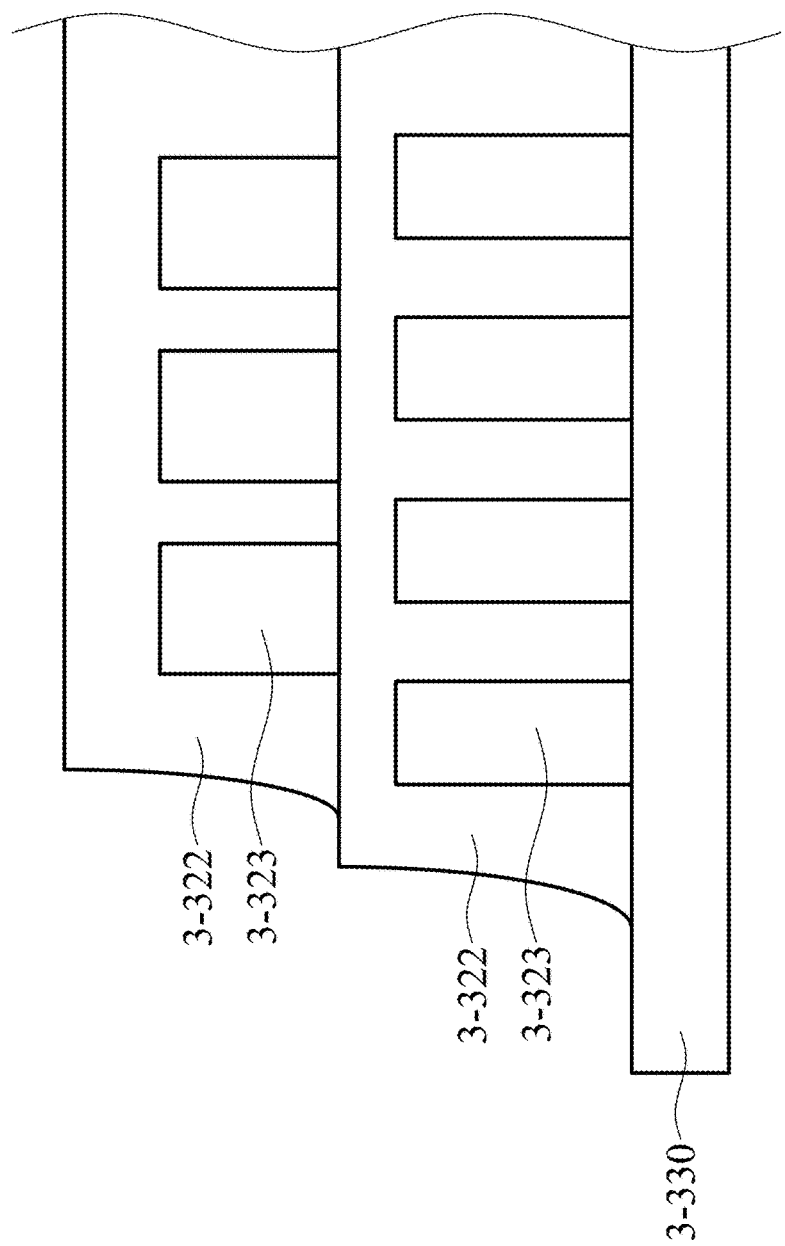
FIG. 21 is a schematic diagram of the internal structure of a plate coil according to an embodiment of the disclosure.

As shown in FIG. 21, FIG. 21 is a schematic diagram of an internal structure of a plate coil according to an embodiment of the present disclosure. The coil of the plate coil 3-320 in this embodiment is designed as two layers. The insulating layer 3-322 covers the coil 3-323. The material of the coil 3-323 is copper, and the material of insulating layer 3-322 is Polyimide (PI). The plate coil 3-320 process may be used in two ways. The first is lamination. First, an organic film is covered with a laminator on the entire copper foil, after an exposure and development process, the desired copper coil will be formed. The second is plating. First, a barrier layer (such as ink) is added to a portion that is not to be conductive, then copper is electroplated to the required thickness, and the coil will be formed after the barrier layer is removed. The formation of the two layers of the coil may use one of the methods, or both of the methods.

Compared with the conventional winding-type driving coil, which is exposed to the outside, the coil 3-323 of the plate coil 3-320 is covered with the insulating layer 3-322, so that it is not easily broken by the collision of the magnetic element 3-310 when the holder 3-210 is driven by a magnetic force or when the optical element driving mechanism 3-1 is subjected to an external force. In addition, the winding-type driving coil is difficult to precisely control the tightness of the winding, so the wire pitch tolerance is large. The plate coil 3-320 obtained by the process described above has a small wire pitch tolerance. Because the winding-type driving coil needs to design a winding post on a holder to wind and position the coil, besides, a lead groove and a welding point must also be designed to connect the coil to other elements (such as the elastic element 3-400), so that the design of the holder may be more complicated. The plate coil 3-320 is easy to control because of its shape and size, so that is it more precise and convenient when assembling and positioning the plate coil 3-320 to the holder 3-210. In addition, the holder 3-210 only needs to be designed with the grooves 3-212 to receive the plate coil 3-320, so it may achieve the miniaturization of the overall mechanism compared to the complicated design of holder using the conventional winding-type driving coil.

In this embodiment, the elastic element 3-400 is a metal spring, and the elastic element 3-400 connects the fixed portion 3-100 and the movable portion 3-200. More specifically, one end of the elastic element 3-400 is connected to the holder 3-210, and the other end of the elastic element 3-400 is connected to the frame 3-130, and the holder 3-210 is suspended in the frame 3-130 by the elastic element 3-400.

The elastic element 3-400 is further connected to a circuit component (not shown in the figures) and the plate coil 3-320. After a current is applied to the circuit component, the current flows through the elastic element 3-400 to the plate coil 3-320, then the driving portion 3-300 drives the movable portion 3-200 to move relative to the fixed portion 3-100. More specifically, the current flows through the elastic element 3-400 to the plate coil 3-320 by the electrical connection described above, then the plate coil 3-320 acts with the magnetic field of the magnetic element 3-310 to generate an electromagnetic force, and the electromagnetic force drives the holder 3-210 to move in a direction that is parallel to the optical axis 3-O, thereby achieving the effect of fast focusing.

Figure 22:
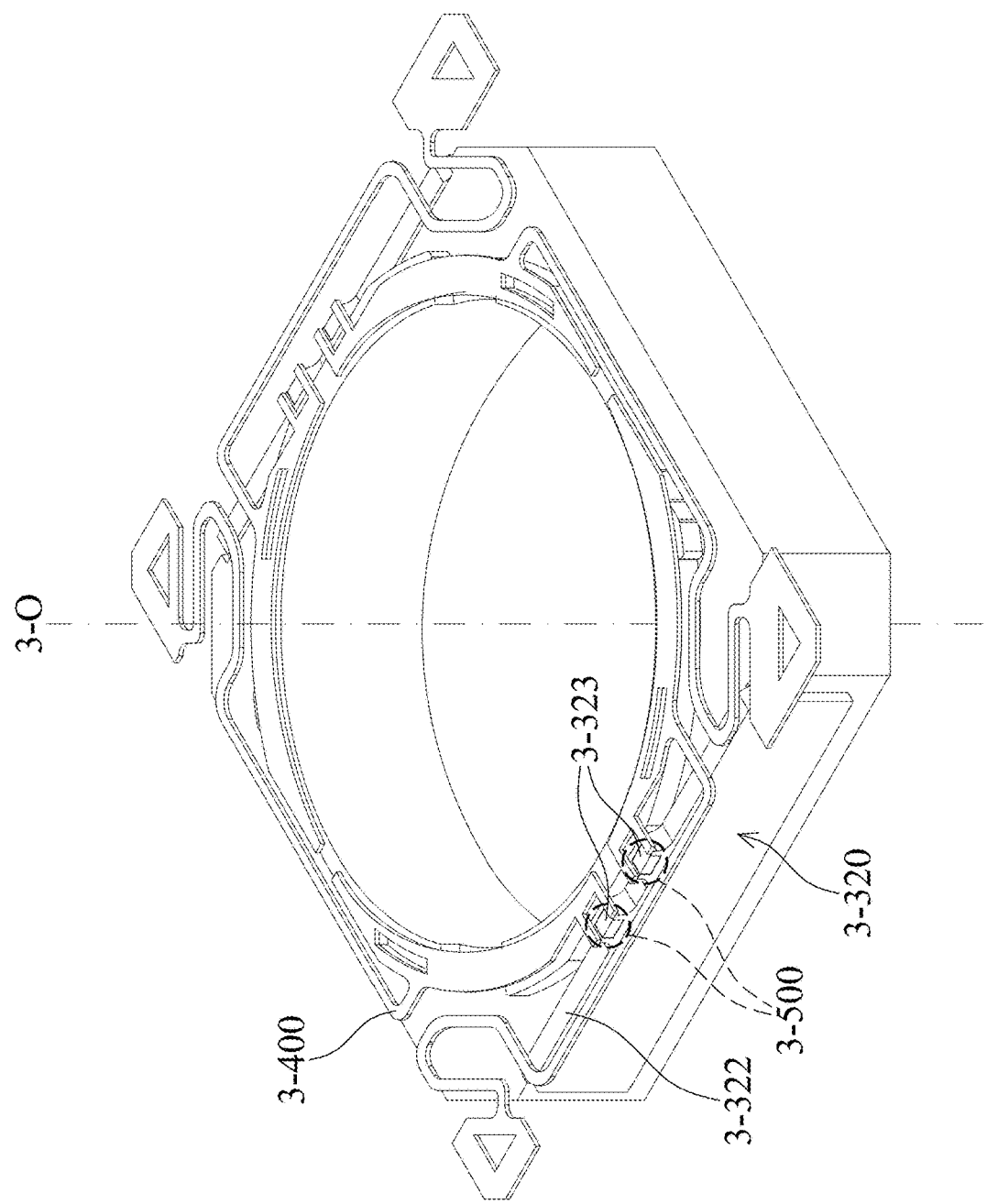
FIG. 22 is a schematic diagram of a partial structure of an optical element driving mechanism according to an embodiment of the disclosure.

Refer to FIG. 22. FIG. 22 is a schematic diagram of a partial structure of the optical element driving mechanism 3-1 according to an embodiment of the present disclosure. In this embodiment, the optical element driving mechanism 3-1 further includes a welding portion 3-500. The welding portion 3-500 is connected to the plate coil 3-320 and the elastic element 3-400. With this connection, the plate coil 3-320 does not need to pull out the lead wire and design the lead wire connection path to connect to the elastic element 3-400 as in the conventional winding type coil. It only needs to expose the coil 3-323 from the insulating layer 3-322, and use the welding portion 3-500 (in this embodiment, a solder ball is used) to weld, so that the plate coil 3-320 and the elastic element 3-400 may be electrically connected simply.

Figure 23:
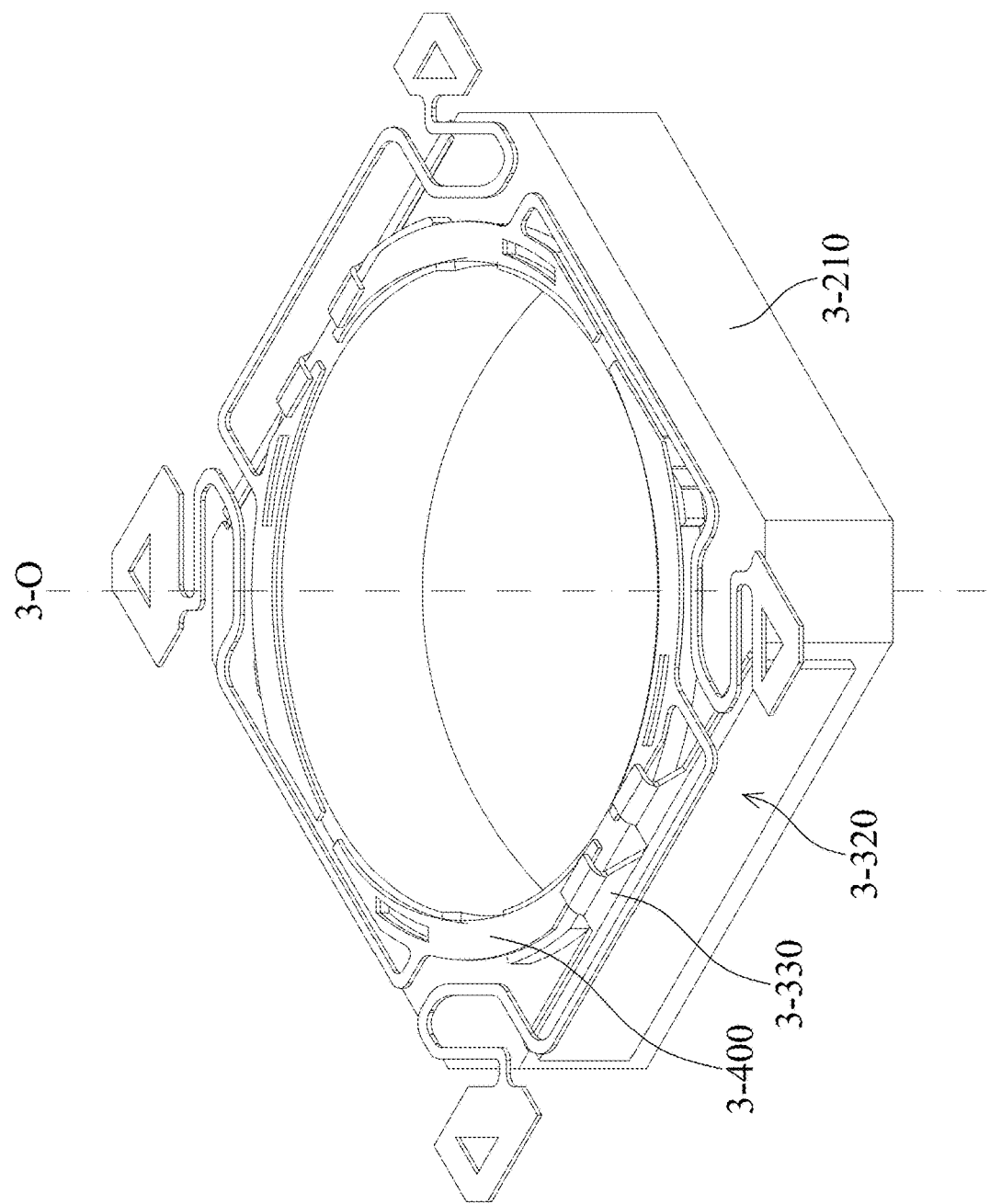
FIG. 23 is a schematic diagram of a partial structure of an optical element driving mechanism according to another embodiment of the disclosure.

Refer to FIGS. 5 to FIG. 24, which are schematic diagrams of a partial structure of the optical element driving mechanism 3-1 according to another embodiment of the present disclosure. As shown in FIG. 23, in this embodiment, the optical element driving mechanism 3-1 includes a metal substrate 3-330, and the flat plate coil 3-320 and the metal substrate 3-330 are integrally formed. In the manufacturing process of the plate coil 3-320, the metal substrate 3-330 is usually used to support the plate coil 3-320, and removed in the end of the process. In this embodiment, the metal substrate 3-330 is not removed in the process, thus the plate coil 3-320 with the metal substrate 3-330 may be directly obtained. The plate coil 3-320 with the metal substrate 3-330 may make the overall structure stronger. In addition, the metal substrate 3-330 has the effect of magnetic permeability.

Figure 24:
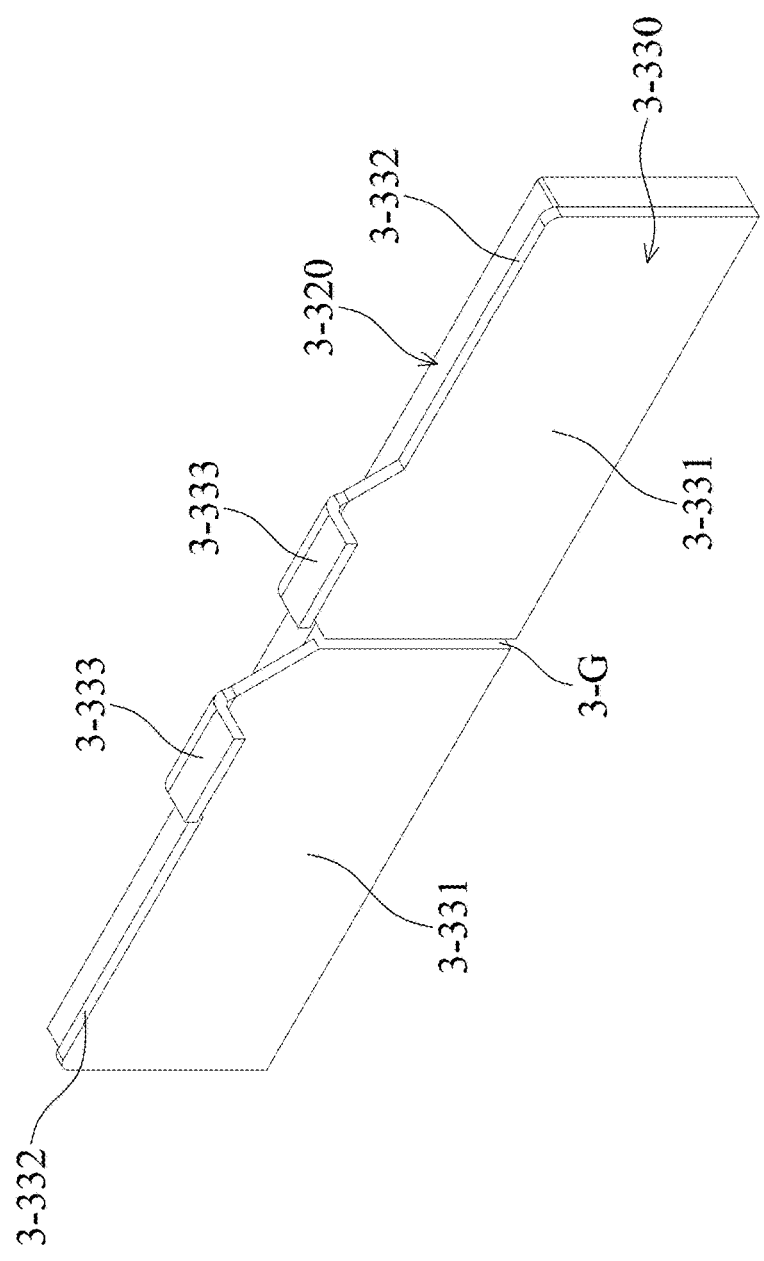
FIG. 24 is a schematic diagram of a partial structure of an optical element driving mechanism according to another embodiment of the disclosure.

In this embodiment, as shown in FIG. 24, the metal substrate 3-330 has a substrate plane 3-331, a main body portion 3-332, and a protruding portion 3-333. Since the plate coil 3-320 is directly manufactured on the metal substrate 3-330 as mentioned above, the substrate plane 3-331 is parallel with the plane 3-321 of the plate coil 3-320, and when viewed in a direction that is perpendicular to the optical axis 3-O, the metal substrate 3-330 overlaps the plate coil 3-320. The magnetic element 3-310 and the plate coil 3-320 each have two, corresponding to and arranged on opposite sides. When the plate coil 3-320 is disposed on the holder 3-210, the metal substrate 3-330 is closer to the holder 3-210 than the plate coil 3-320, but is not limited to this. In some embodiments, the plate coil 3-320 is closer to the holder 3-210 than the metal substrate 3-330.

The main body portion 3-332 of the metal substrate 3-330 is connected to the plate coil 3-320, and the protruding portion 3-333 is connected to the elastic element 3-400. More specifically, as shown in FIG. 24, there is a gap 3-G in the middle of the metal substrate 3-330, so that two metal substrates 3-330 correspond one plate coil 3-320 substantially, and each of the two metal substrates 3-330 has a protruding portion 3-333, and the protruding portion 3-333 may be connected to the elastic element 3-400 by solder ball welding as in the embodiment of FIG. 21 or laser welding. That is, the plate coil 3-320 is electrically connected to the main body portion 3-332 of the metal substrate 3-330, and may be electrically connected to the elastic element 3-400 through the protruding portion 3-333 of the metal substrate 3-330. With the design of this embodiment, the two plate coils 3-320 may be electrically connected to the four elastic elements 3-400. However, it is not limited to this. In some embodiments, there is no gap 3-G on the metal substrate 3-330, so one metal substrate 3-330 corresponds to one plate coil 3-320, and the four elastic elements 3-400 is connected to four plate coils 3-320.

Figure 25:
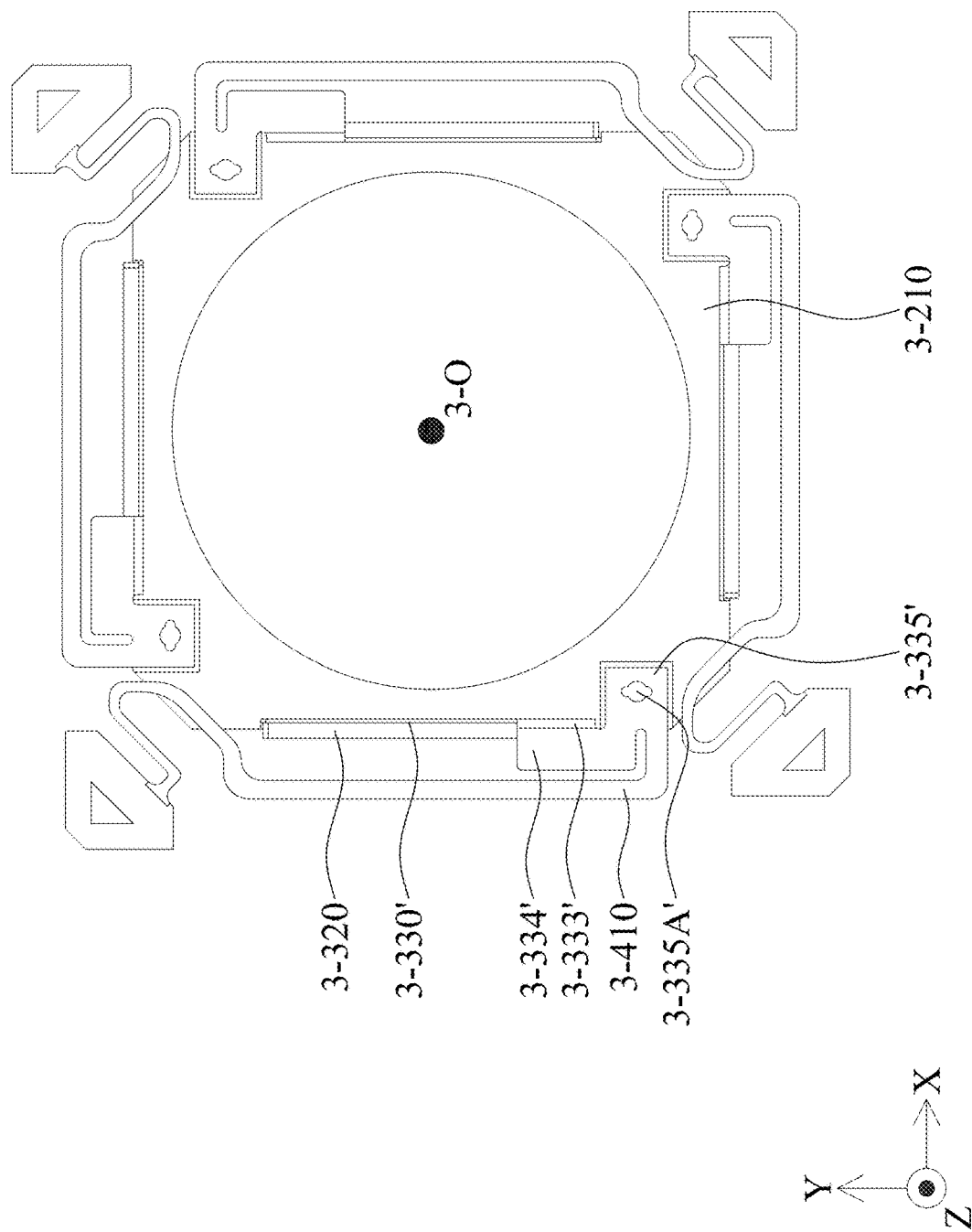
FIG. 25 is a schematic diagram of a partial structure of an optical element driving mechanism according to another embodiment of the disclosure.
Figure 26:
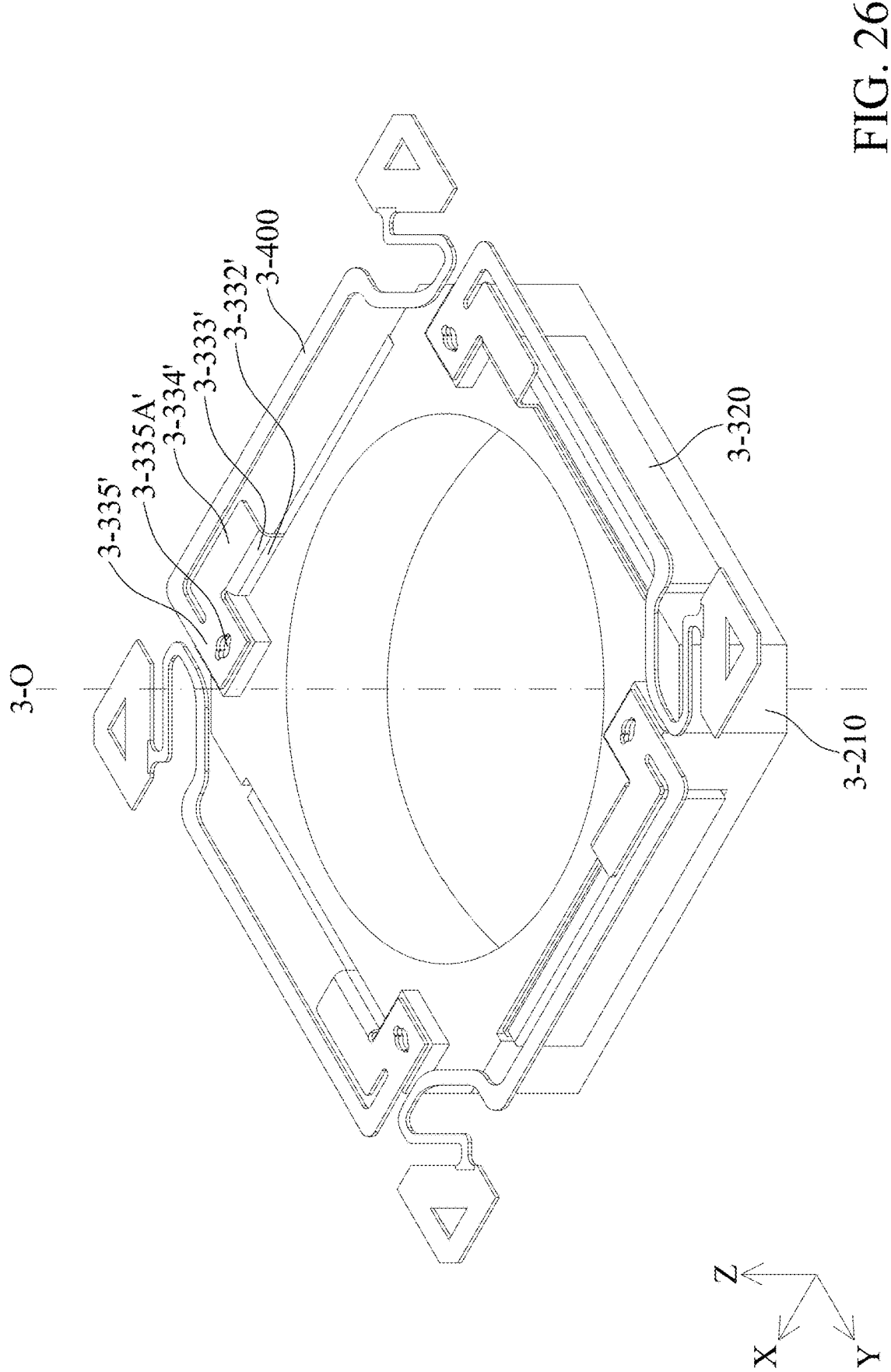
FIG. 26 is a schematic diagram of a partial structure of an optical element driving mechanism according to another embodiment of the disclosure.

Refer to FIG. 25 to FIG. 26. FIG. 25 and FIG. 26 are schematic diagrams of a partial structure of the optical element driving mechanism 3-1 according to another embodiment of the present disclosure. As shown in FIG. 25, in this embodiment, the optical element driving mechanism 3-1 further includes a metal substrate 3-330', and the metal substrate 3-330' is connected to the plate coil 3-320 and the elastic element 3-400. In addition, the plate coil 3-320, the elastic element 3-400, and the metal substrate 3-330' are integrally formed. The metal substrate 3-330' has a main body portion 3-332', a curved portion 3-333', and a first flat portion 3-334' and a second flat portion 3-335'.

As shown in FIG. 25 and FIG. 26, the curved portion 3-333' extends in a direction that is parallel to the optical axis 3-O and is connected to the main body portion 3-332', and the curved portion 3-333' extends in a direction that is perpendicular to the optical axis 3-O and is connected to the first flat portion 3-334', and the second flat portion 3-335' is connected to the first flat portion 3-334' and the elastic element 3-400. The first flat portion 3-334' extends in a direction that is perpendicular to the optical axis 3-O and away from a center of the optical axis 3-O. When viewed in a direction that is parallel to the optical axis 3-O, the first flat portion 3-334' partially overlaps the plate coil 3-320. The second flat portion 3-335' has a positioning portion 3-335A', and the second flat portion 3-335' is connected to the holder 3-210 by the positioning portion 3-335A'. The second flat portion 3-335' is extends in a direction that is perpendicular to the optical axis 3-O and close to the center of the optical axis 3-O. Therefore, when viewed in a direction that is parallel to the optical axis 3-O, the second flat portion 3-335' overlaps the holder 3-210.

With the structure described above, the curved portion 3-333' connects the first flat portion 3-334' and the main body portion 3-332', so that the stress of the curved portion 3-333' is not concentrated on a point or a line, and is not easy to break. The elastic element 3-400 is connected to the second flat portion 3-335', so that the stress of the elastic element 3-400 is not concentrated on a point or a line, and is not easy to break. In addition, the second flat portion 3-335' is connected to the holder 3-210, more specifically, the second flat portion 3-335' is disposed on the holder, so the holder 3-210 also relatively supports the second flat portion 3-335', so that the elastic element 3-400 is not easy to break.

In addition to the advantages mentioned above, the positioning may be completed quickly when assembling the optical element driving mechanism 3-1. More specifically, the plate coil 3-320, the elastic element 3-400, and the metal substrate 3-330' are on the same plane after being formed integrally, so the positioning and assembling of the plate coil 3-320, the elastic element 3-400, and the metal substrate 3-330' may be quickly completed just by bending the metal substrate 3-330' to form the curved portion 3-333' and placing the plate coil 3-320 in the groove 3-212. Thus, many steps of assembling may be omitted.

In addition, in a mechanism with the OIS function, it is necessary to control a movement of an optical element in the direction that is perpendicular to the optical axis 3-O.

Therefore, the plate coil 3-320 is usually arranged in a direction that the plane 3-321 is perpendicular to the optical axis 3-O (for example, the plate coil 3-320 is embedded in the base 3-120), so that the direction of the electromagnetic force generated by the plate coil 3-320 and the magnetic element 3-310 is perpendicular to the optical axis 3-O. Therefore, in this embodiment, the metal substrate 3-330' is no need to bend to form the curved portion 3-333' and may directly apply to the mechanism with OIS function.

Figure 27:
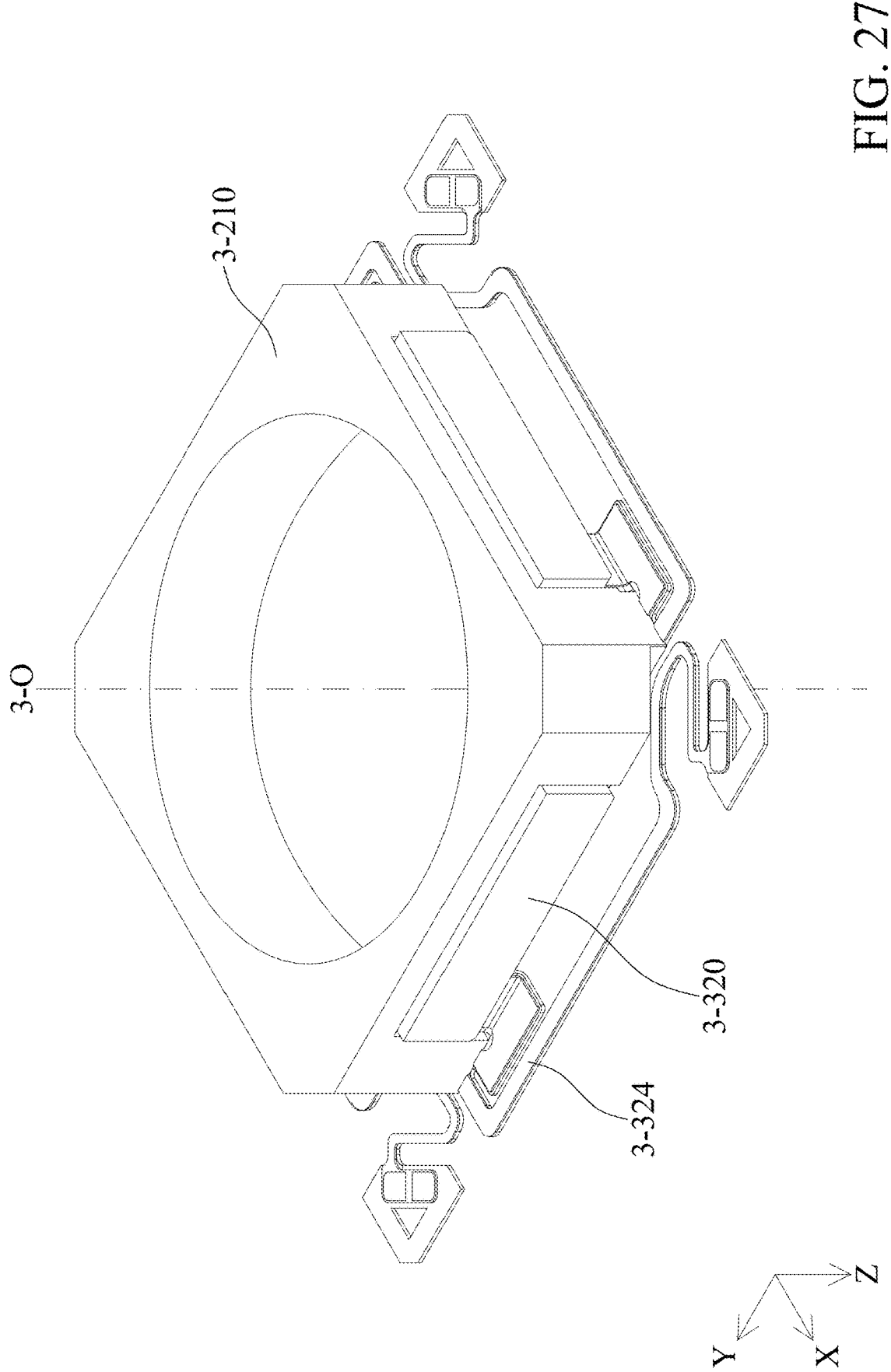
FIG. 27 is a schematic diagram of a portion of a structure of an optical element driving mechanism according to another embodiment of the disclosure.
Figure 28:
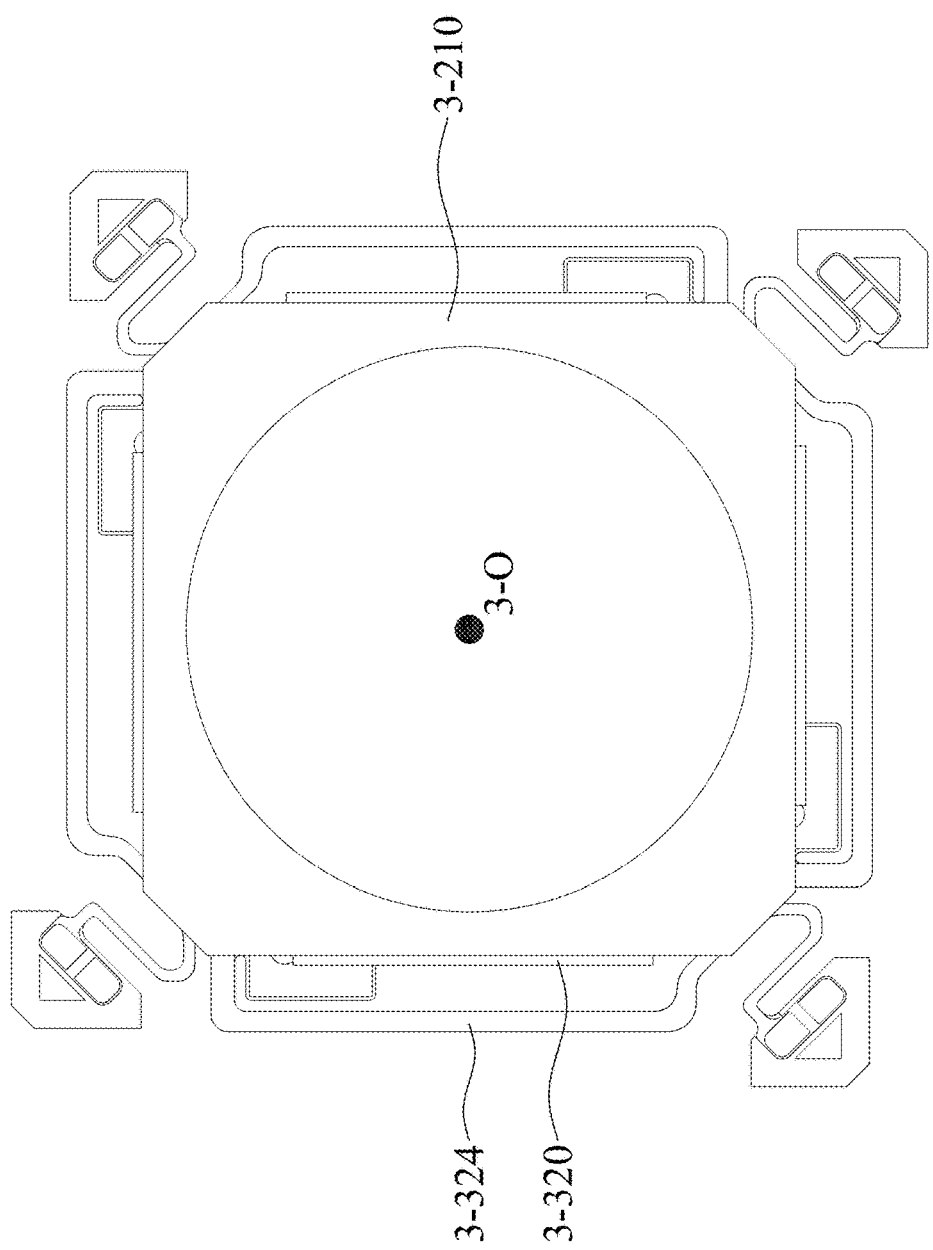
FIG. 28 is a schematic diagram of a partial structure of an optical element driving mechanism according to another embodiment of the disclosure.

Refer to FIG. 27 and FIG. 28, which are schematic diagrams of a partial structure of the optical element driving mechanism 3-1 according to another embodiment of the present disclosure. As shown in FIG. 27, in this embodiment, the optical element driving mechanism 3-1 further includes an electrical connection portion 3-324, and the plate coil 3-320, the electrical connection portion 3-324, the elastic element 3-400, and the metal substrate 3-330' are integrally formed. The electrical connection portion 3-324 is connected to the elastic element 3-400. As shown in FIG. 28, when viewed in a direction that is parallel to the optical axis 3-O, the electrical connection portion 3-324 overlaps the elastic element 3-400. In this embodiment, the required electronic elements may be designed in the plate coil 3-320, and electrically connect with other different elements in the optical element driving mechanism 3-1 through the electrical connection portion 3-324, such as a signal cable, etc. That is, the plate coil 3-320, the required electronic elements and electrical connection portions 3-324 are manufactured at the same time, which may not only simplify the circuit and reduce the number of steps required for assembling, but also aid in the miniaturization of the mechanism.

As described above, in these embodiments of this disclosure, the plate coil 3-320 is directly connected to the elastic element 3-400, so that a miniature optical element driving mechanism with simplified circuitry can be obtained.

Fourth Group of Embodiments

Figure 29:
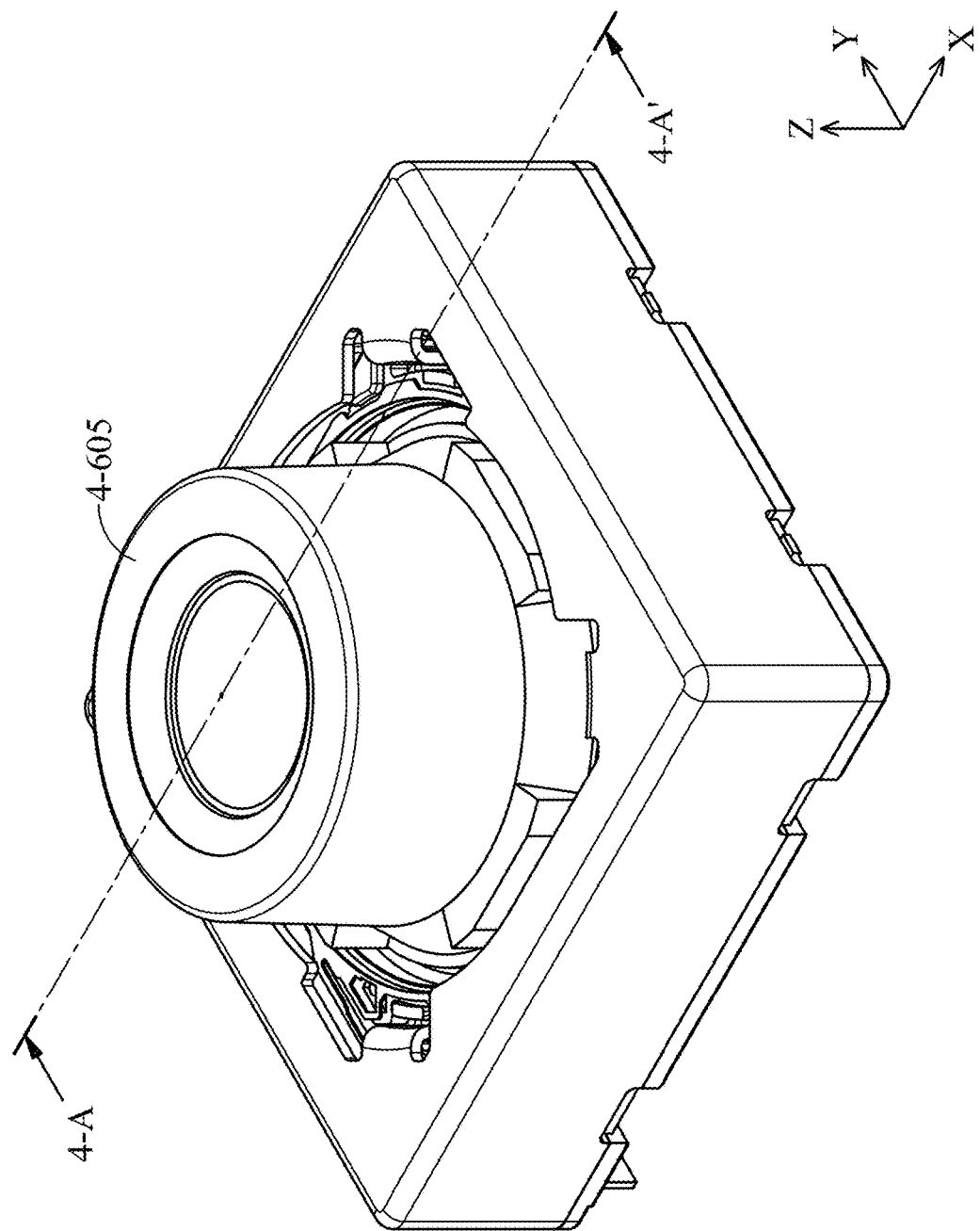
FIG. 29 is a perspective view of a driving mechanism in some embodiments of the present disclosure.
Figure 30:
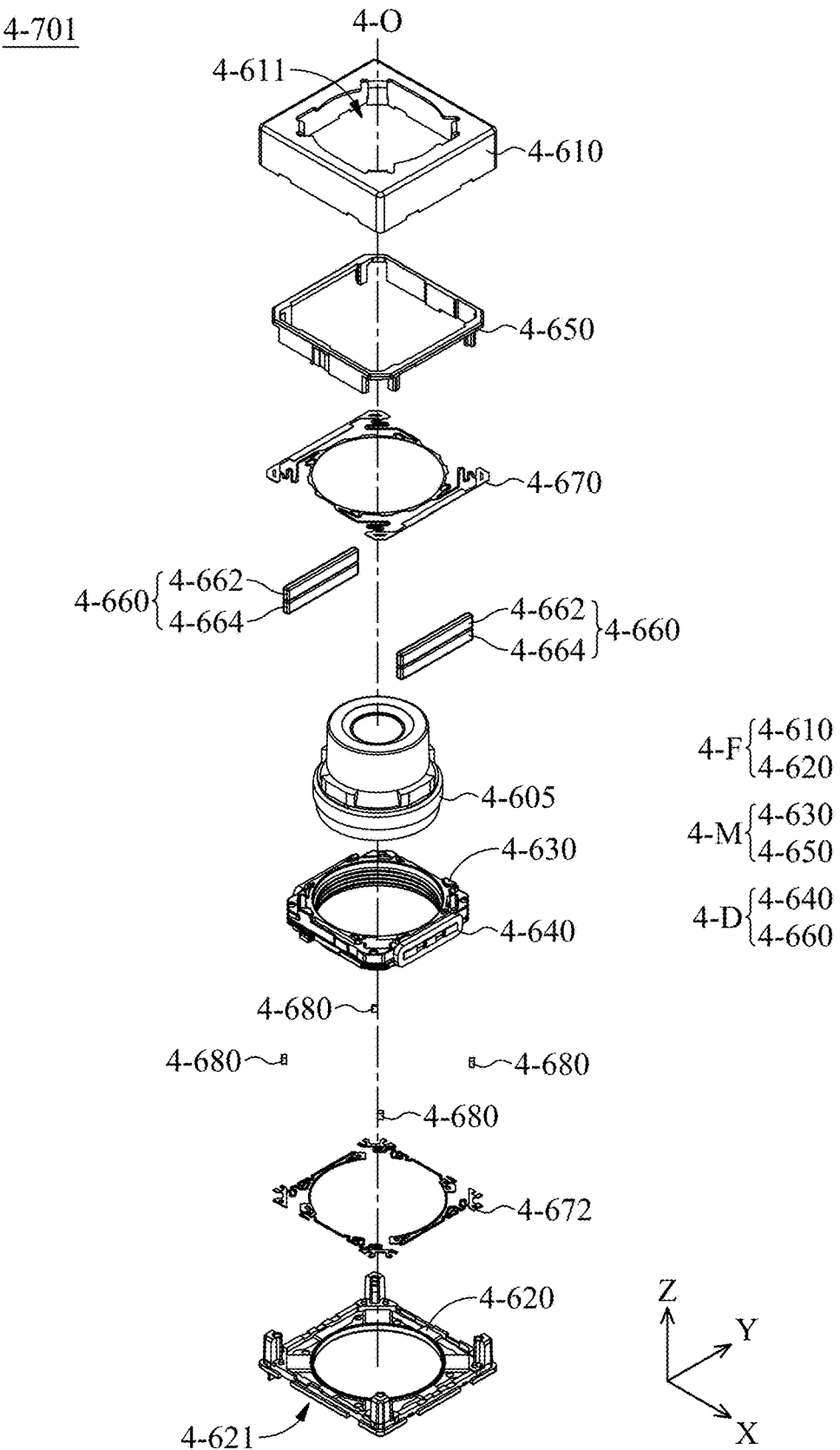
FIG. 30 is an exploded view of the driving mechanism.
Figure 31:
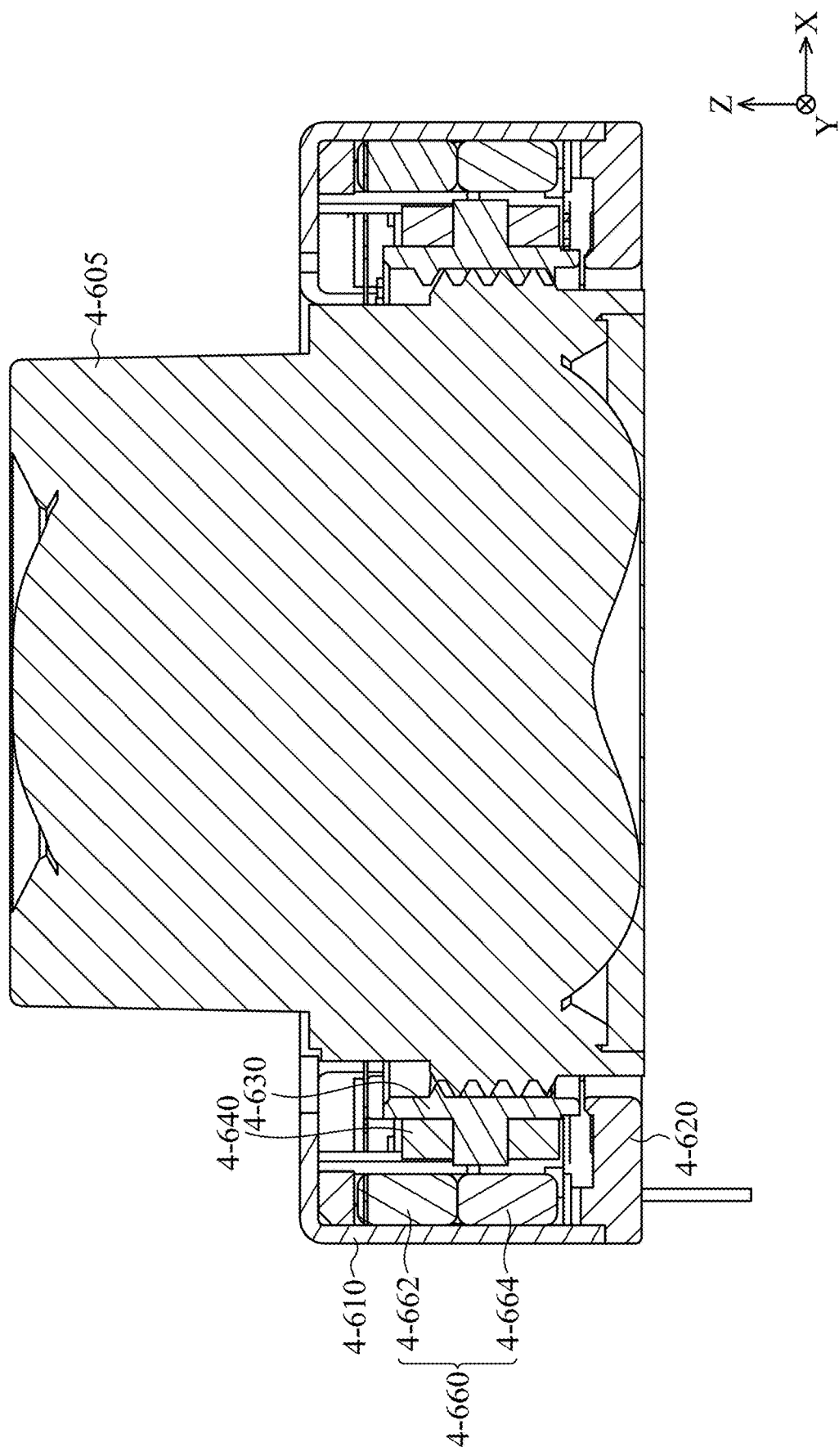
FIG. 31 is a cross-sectional view illustrated along a line 4-A to 4-A' in FIG. 29.

Refer to FIGS. 29 to 31, wherein FIG. 29 is a perspective view of the driving mechanism 4-701 in some embodiments of the present disclosure, FIG. 30 is an exploded view of the driving mechanism 4-701, and FIG. 31 is a cross-sectional view illustrated along the line 4-A to 4-A' in FIG. 29. As shown in FIGS. 29 to 31, the driving mechanism 4-701 mainly includes a case 4-610, a base 4-620, a holder 4-630, a driving coil 4-640, a frame 4-650, a plurality of magnetic elements 4-660 (includes a first magnetic element 4-662 and a second magnetic element 4-664), a first resilient element 4-64-70, a second resilient element 4-672, and a plurality of buffering elements 4-680 in this embodiment. The driving mechanism 4-701 may drive an optical element 4-605 to move for achieving auto focus (AF) or optical image stabilization (OIS).

The case 4-610 and the bottom 4-620 may be called as a fixed portion 4-F, and the holder 4-630 and the frame 4-650 may be called as a movable portion 4-M. The movable portion 4-M is movably connected to the fixed portion 4-F, in other words, the movable portion 4-M may move relative to the fixed portion 4-F. Furthermore, the driving coil 4-640 and the magnetic element 4-660 may be called as a driving assembly 4-D for moving the movable portion 4-M relative to the fixed portion 4-F. Moreover, the buffering element 4-680 may be disposed between the movable portion 4-M and the fixed portion 4-F, have a distance to the movable portion 4-M or the fixed portion 4-F, and in contact with the other of the movable portion 4-M or the fixed portion 4-F (such as being in contact with the movable portion 4-M and having a distance to the fixed portion 4-F, or being in contact with the fixed portion 4-F and having a distance to the movable portion 4-M) for buffering the movement of the movable portion 4-M relative to the fixed portion 4-F.

The case 4-610 and the bottom 4-620 may be combined with each other to form a case of the driving mechanism 4-701. For example, the bottom 4-620 may be affixed to the case 4-610. It should be noted that a case opening 4-611 and a bottom opening 4-621 are formed on the case 4-610 and the bottom 4-620, respectively. The center of the case opening 4-611 corresponds to a main axis 4-O of the optical element 4-605, the bottom opening 4-621 corresponds to an image sensor (not shown) outside the driving mechanism 4-701. As a result, the optical element 4-605 disposed in the driving mechanism 4-701 can perform image focusing with the image sensor along the main axis 4-O.

The holder 4-630 has a through hole, and the optical element 4-605 may be fixed in the through hole. The driving coil 4-640 may be disposed on the outer surface of the holder 4-630. The magnetic element 4-660 may be affixed to the frame 4-650 or movable relative to the frame 4-650. In this embodiment, the magnetic element 4-660 may be a multipolar magnet which includes a first magnetic element 4-662 and a second magnetic element 4-664 having opposite magnetic pole directions. In this embodiment, the driving coil 4-640 may be capsule-shaped and disposed on a side of the holder 4-630 which corresponds to the first magnetic element 4-662 and the second magnetic element 4-664. Specifically, a magnetic force may be generated by the interaction between the magnetic element 4-660 and the driving coil 4-640 to move the holder 4-630 along the direction of the main axis 4-O relative to the frame 4-650 to achieve rapid focusing.

In this embodiment, the holder 4-630 and the optical element 4-605 disposed therein are movably disposed in the frame 4-650. More specifically, the holder 4-630 may be connected to and suspended in the frame 4-650 by the first resilient element 4-64-70 and the second resilient element 4-672 made of a metal material, for example (FIG. 3). When current is applied to the driving coil 4-640, the driving coil 4-640 can act with the magnetic field of the magnetic element 4-660 to generate an electromagnetic force to move the holder 4-630 and the optical element 4-605 along the main axis 4-O relative to the frame 4-650 to achieve auto focusing.

In some embodiments, additional circuits may be provided on the bottom 4-620 and be electrically connected to electronic elements disposed inside or outside the driving mechanism 4-701 to achieve auto focus or optical image stabilization. Electrical signal may be transferred by the circuits on the bottom 4-620 to the driving coil 4-640 through the first resilient element 4-64-70 or the second resilient element 4-672, for controlling the movement of the holder 4-630 in X, Y, or Z directions. The second resilient element 4-672 may be assembled with the circuits on the bottom 4-620 by soldering or laser welding to allow the driving coil 4-640 to connect to external circuits.

Furthermore, in some embodiments, a plurality of additional driving coils (not shown) may be embedded in the bottom 4-620 to interact with the first magnetic element 4-662 or the second magnetic element 4-664 to move the holder 4-630. Driving forces having different directions may be generated when the driving coil 4-640 and the additional driving coil in the bottom 4-620 interact with the magnetic element 4-660 to perform auto focus or optical image stabilization.

Figure 32:
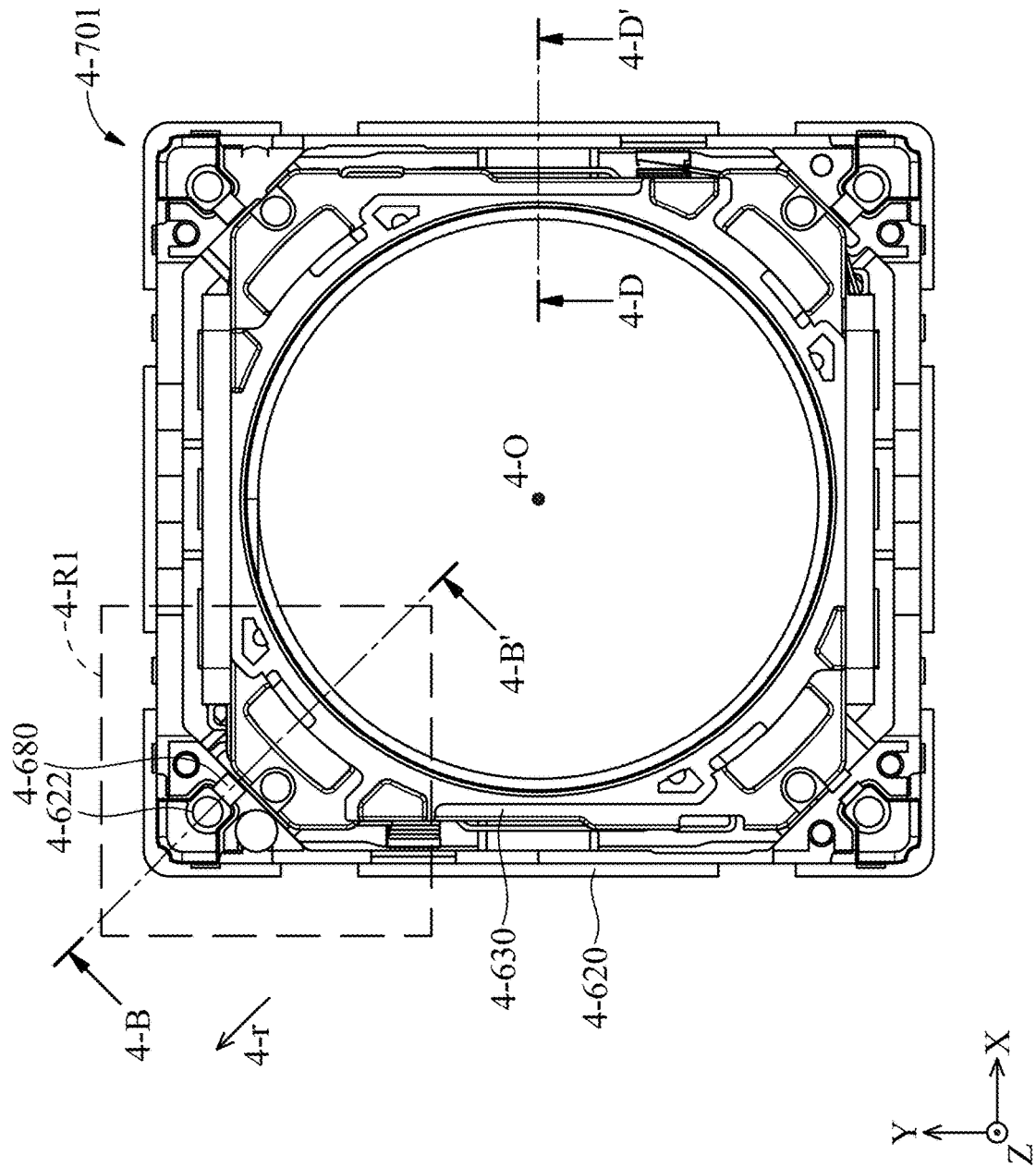
FIG. 32 is a top view of some elements of the driving mechanism.
Figure 33:
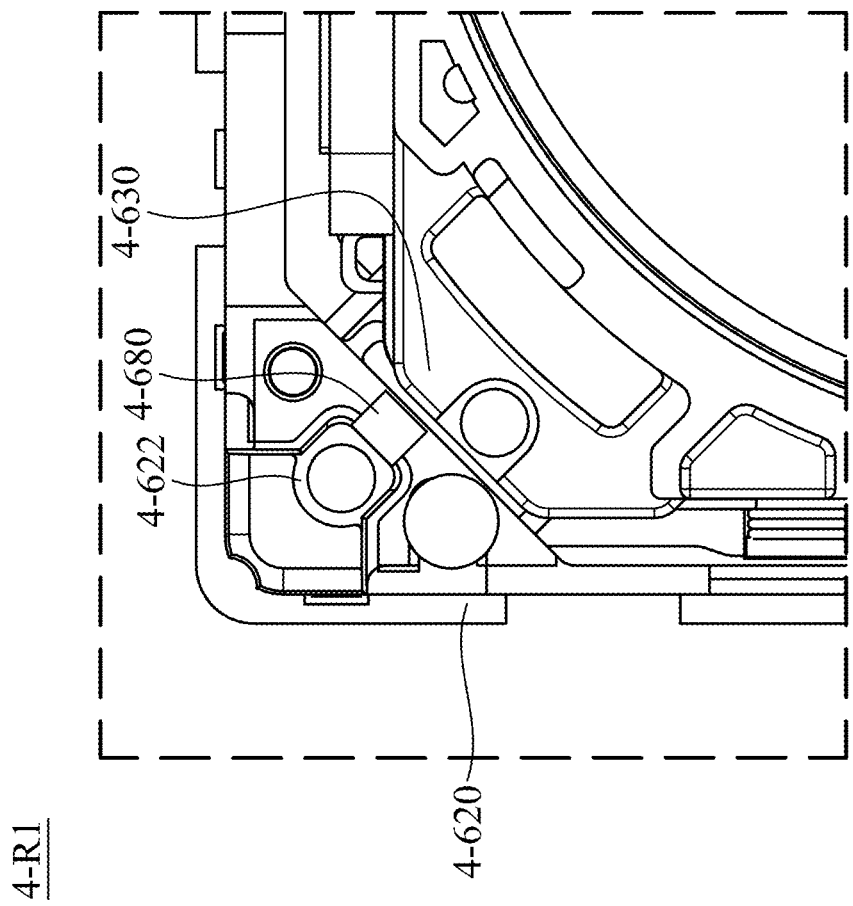
FIG. 33 is an enlarged view of the area 4-R1 in FIG. 32.
Figure 34:
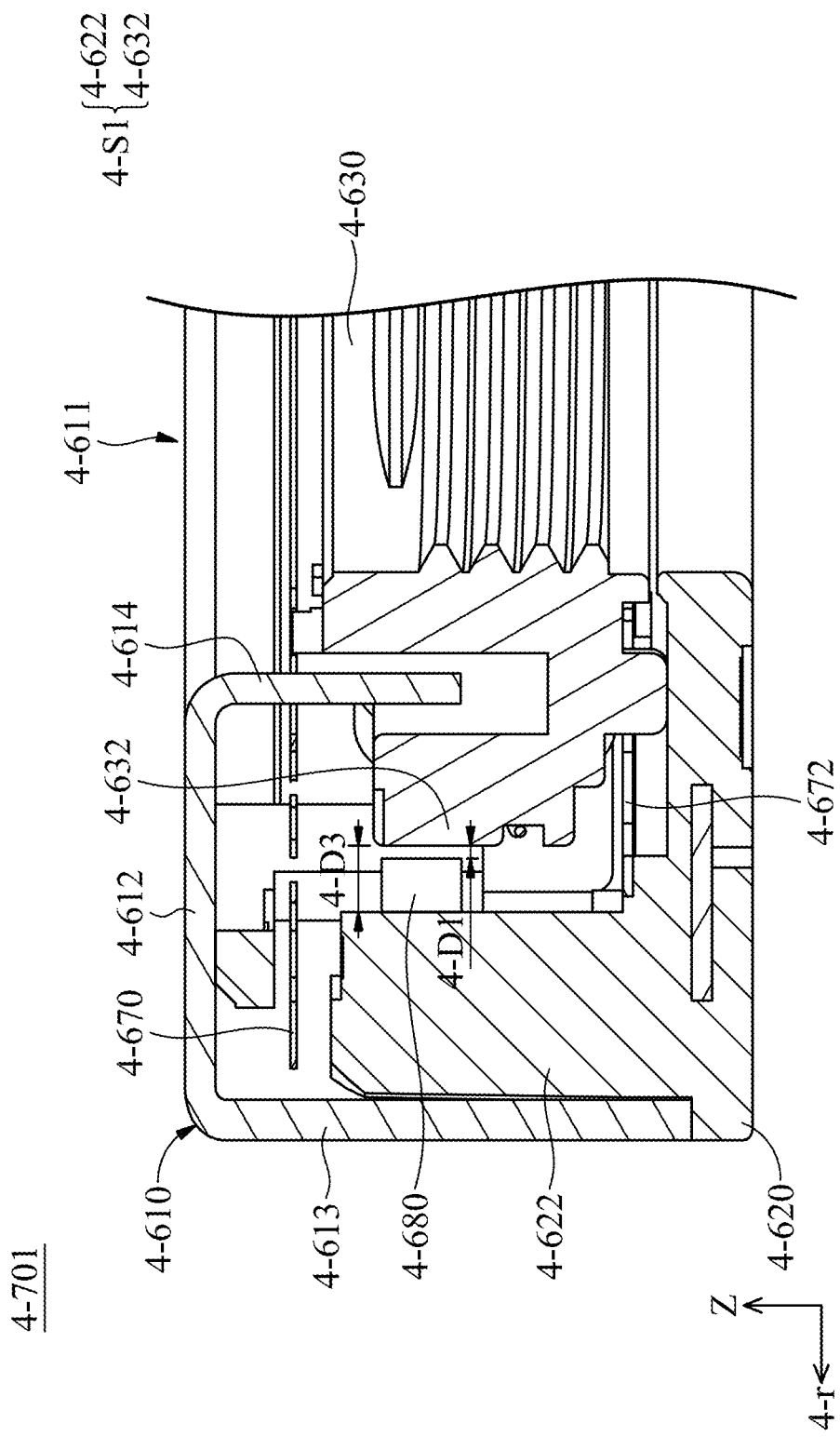
FIG. 34 is a cross-sectional view illustrated along a line 4-B to 4-B' in FIG. 32.

FIG. 32 is a top view of some elements of the driving mechanism 4-701, FIG. 33 is an enlarged view of the area 4-R1 in FIG. 32, and FIG. 34 is a cross-sectional view illustrated along the line 4-B to 4-B' in FIG. 32. It should be noted that the case 4-610 is omitted in FIGS. 32 and 33. In FIG. 34, the case 4-610 includes a top plate 4-612, an outer sidewall 4-613 extended from the edges of the top plate 4-612 along the main axis 4-O (Z direction), and an inner sidewall 4-614 extended from the edges of the case opening 4-611 along the main axis 4-O, wherein the bottom 4-620 has a column 4-622 extending to the top plate 4-612. Furthermore, as shown in FIG. 32, a direction 4-r is defined as a direction that is extending from the main axis 4-O.

In FIGS. 32 to 34, the buffering element 4-680 may be disposed between the column 4-622 and the holder 4-630 (the movable portion 4-M) and have a distance 4-D1 to the protrusion 4-632, and the buffering element 4-680 may be in direct contact with the column 4-622. In other words, the buffering element 4-680 is in direct contact with the fixed portion 4-F and has a distance to the movable portion 4-M. The buffering element 4-620 may be an element which can absorb vibration, such as a gel. In some embodiments, a stopping assembly 4-S1 may include the column 4-622 and the protrusion 4-632 for limiting the moving range of the movable portion 4-M relative to the fixed portion 4-F, to prevent the movable portion 4-M from being damaged. In some embodiments, the buffering element 4-680 may include resin, and the case 4-610 (such as the outer sidewall 4-613 or the inner sidewall 4-614) may include metal. As a result, the hardness of the buffering element 4-680 may be less than the hardness of the case 4-610 (such as the outer sidewall 4-613 or the inner sidewall 4-614). In other embodiments, the bottom 4-620 also may include metal, so the hardness of the buffering element 4-680 also may be less than the hardness of the bottom 4-620 to prevent the case 4-610 or the bottom 4-620 from being damaged by the buffering element 4-680.

In this embodiment, when the holder 4-630 (a portion of the movable portion 4-M) is static, the buffering element 4-680 is not in contact with the holder 4-630, that is, has a distance to the holder 4-630. As a result, when the movable portion 4-M moves relative to the fixed portion 4-F, the buffering element 4-680 is not in contact with the movable portion 4-M and the fixed portion 4-F at the same time, so the buffering element 4-680 does not pulled by the movable portion 4-M and the fixed portion 4-F together at the same time, which makes the buffering element 4-680 facing a force exceeding its limit. As a result, the buffering element 4-680 may be prevented from being damaged (such as fractured) when the movable portion 4-M is moving relative to the fixed portion 4-F.

Furthermore, the buffering element 4-680 has a distance to the holder 4-630 (a portion of the movable portion 4-M) in this embodiment, so the buffering element 4-680 can change the resonance frequency of the elements if resonance occurs during the operation of the driving mechanism 4-701, and the noise created from the resonance may be reduced. Moreover, the movement of the movable portion 4-M relative to the fixed portion 4-F may be prevented from the resonance to improve the performance of the driving mechanism 4-701.

Moreover, the hardness of the buffering element 4-680 is less than the thickness of the column 4-622 of the bottom 4-620 (a portion of the stopping assembly 4-S1) in some embodiments of the present disclosure. In some embodiments, the column 4-622 and the buffering element 4-680 may both include resin, and the column 4-622 has a different hardness than the buffering element 4-680. As a result, the column 4-622 may be prevented from being damaged by the buffering element 4-680 when the movable portion 4-M moves relative to the fixed portion 4-F, so the durability of the fixed portion 4-F may be enhanced.

Figure 35:
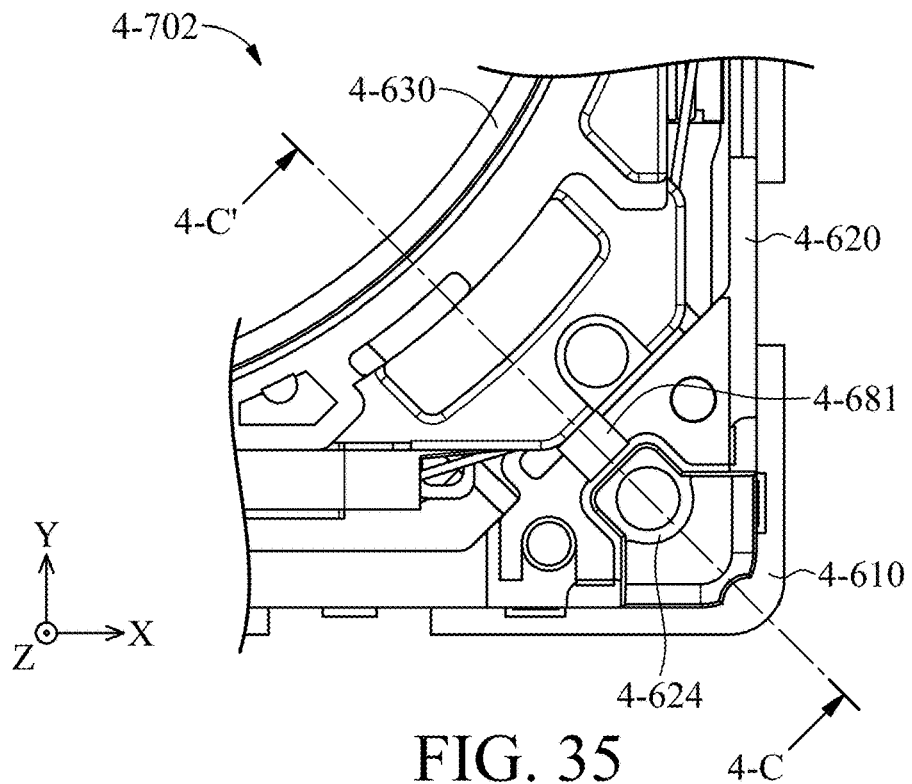
FIG. 35 is a schematic view of a driving mechanism in other embodiments of the present disclosure.
Figure 36:
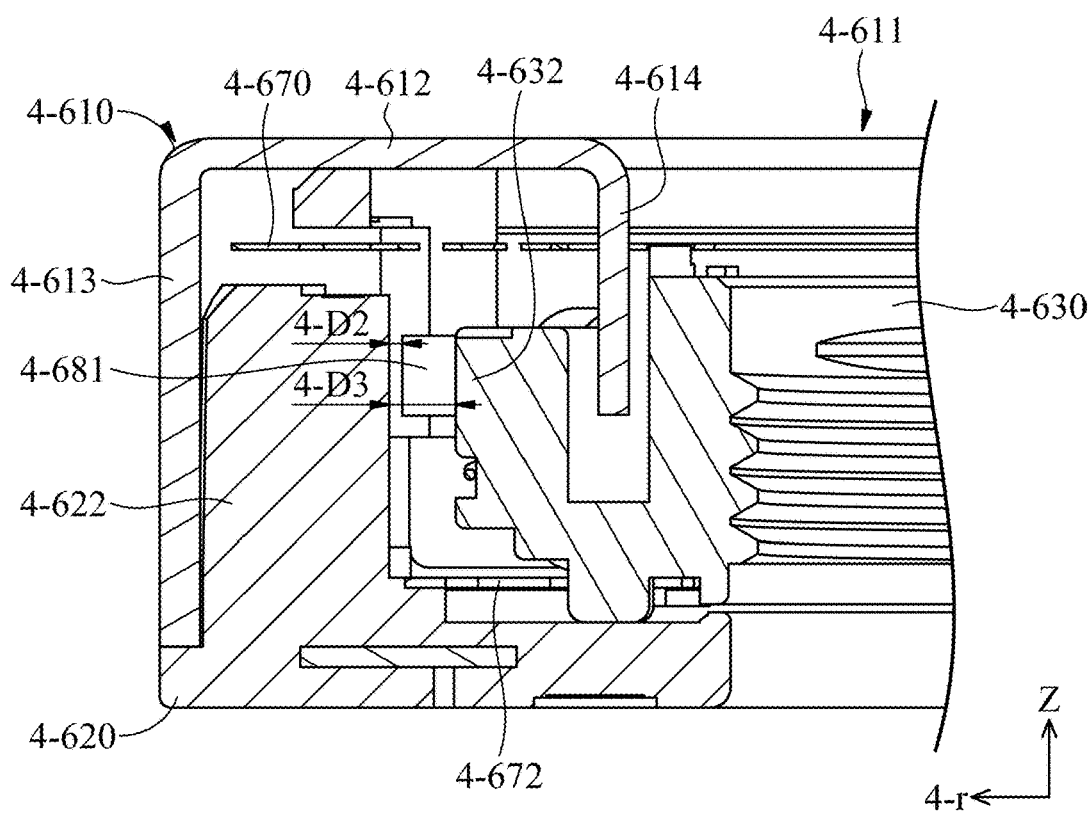
FIG. 36 is a cross-sectional view illustrated along a line 4-C to 4-C' in FIG. 35.

FIG. 35 is a schematic view of some elements of a driving mechanism 4-702 in some embodiments of the present disclosure, and FIG. 36 is a cross-sectional view illustrated along the line 4-C to 4-C' in FIG. 35. In FIGS. 35 and 36, the difference between this embodiment to previous embodiments is that the buffering element 4-681 of the driving mechanism 4-702 is disposed on the holder 4-630 (such as in direct contact with the holder 4-630) and has a distance 4-D2 to the column 4-622 of the bottom 4-620. In other words, when the movable portion 4-M is static, the buffering element 4-681 is disposed on the movable portion 4-M without in contact with the fixed portion 4-F (i.e. has a distance to the fixed portion 4-F). As a result, the buffering element 4-681 may be prevented from being fractured when the movable portion 4-M moving relative to the fixed portion 4-F.

Furthermore, in FIG. 34, the buffering element 4-680 partially overlaps the fixed portion 4-F and the movable portion 4-M along the line 4-B to 4-B' (i.e. first direction). Furthermore, the shortest distance 4-D3 between the column 4-622 and the protrusion 4-632 of the holder 4-630 is greater than the shortest distance 4-D1 between the buffering element 4-680 and the protrusion 4-632 (FIG. 34), or greater than the shortest distance 4-D2 between the buffering element 4-681 and the column 4-622 (FIG. 36) in this direction.

In this embodiment, the protrusion 4-632 may be called as a first stopping element, and the column 4-622 may be called as a second stopping element, and the stopping assembly 4-S1 may include the protrusion 4-632 and the column 4-622. In other words, the shortest distance between the first stopping element and the second stopping element is greater than the shortest distance between the buffering element and the movable portion, or greater than the shortest distance between the buffering element and the fixed portion in the first direction. As a result, the buffering element 4-680 will be in contact with the movable portion 4-M or the fixed portion 4-F to absorb impact before the first stopping element and the second stopping element collide with each other, so the durability of the driving mechanism 4-701 may be enhanced.

Figure 37:
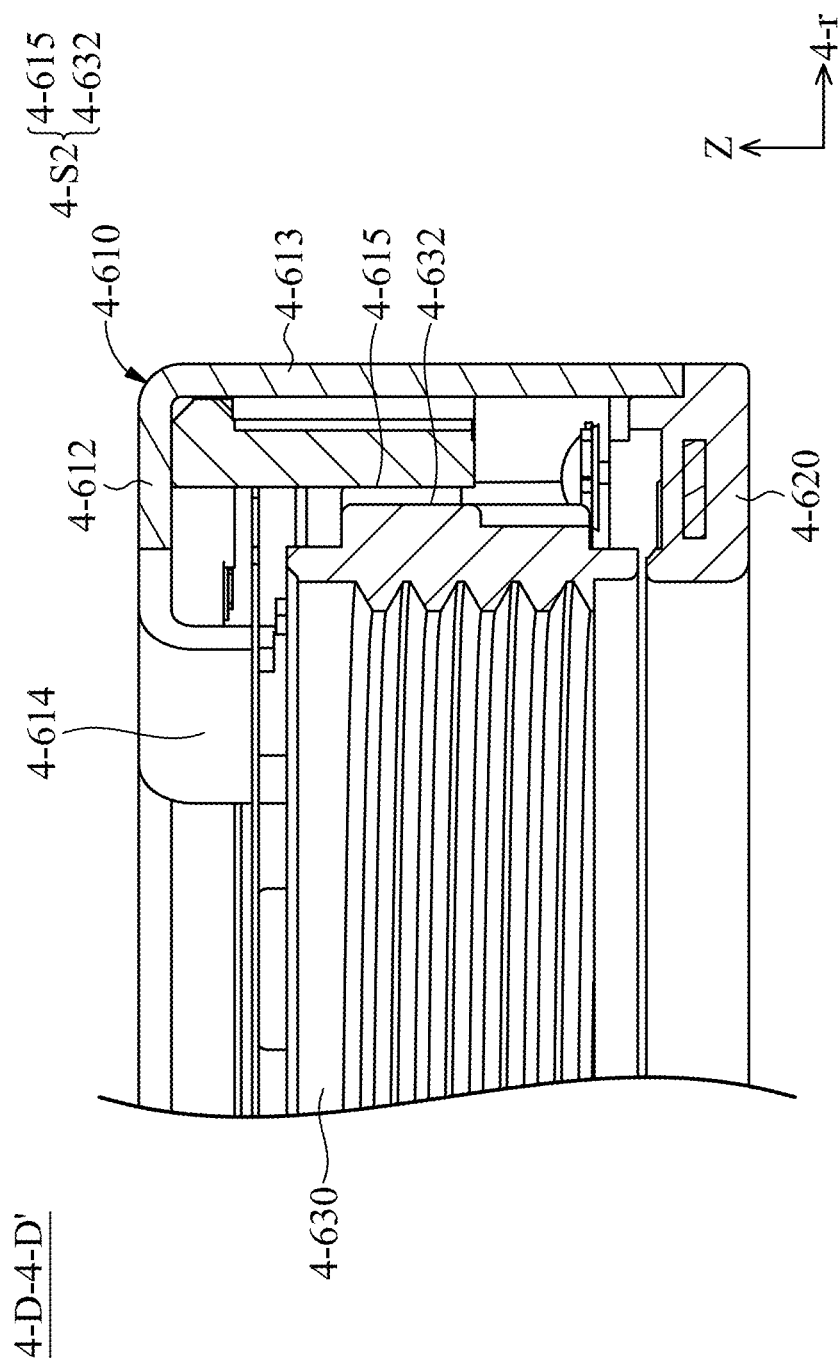
FIG. 37 is a cross-sectional view illustrated along a line 4-D to 4-D' in FIG. 32.

FIG. 37 is a cross-sectional view illustrated along the line 4-D to 4-D' in FIG. 32. In FIG. 37, the protrusion 4-632 on the holder 4-630 (movable portion 4-M) may be called as the first stopping element, and a protrusion 4-615 which corresponds to the protrusion 4-632 may be disposed on the case 4-610 (fixed portion 4-M), wherein the protrusion 4-615 may be called as the second stopping element on the movable portion 4-M, and the protrusions 4-615 and 4-632 may be a portion of the stopping assembly 4-S2. In this embodiment, the hardness of the buffering element 4-680 may be different than the hardness of the protrusion 4-615 and the hardness of the protrusion 4-632. For example, the hardness of the buffering element 4-680 may be less than the hardness of the protrusion 4-615 and the hardness of the protrusion 4-632, so the elements in the driving mechanism 4-701 may collide with the softer buffering element 4-680 prior to collide with other elements, to prevent other elements from being damaged during the operation of the driving mechanism 4-701.

Figure 38:
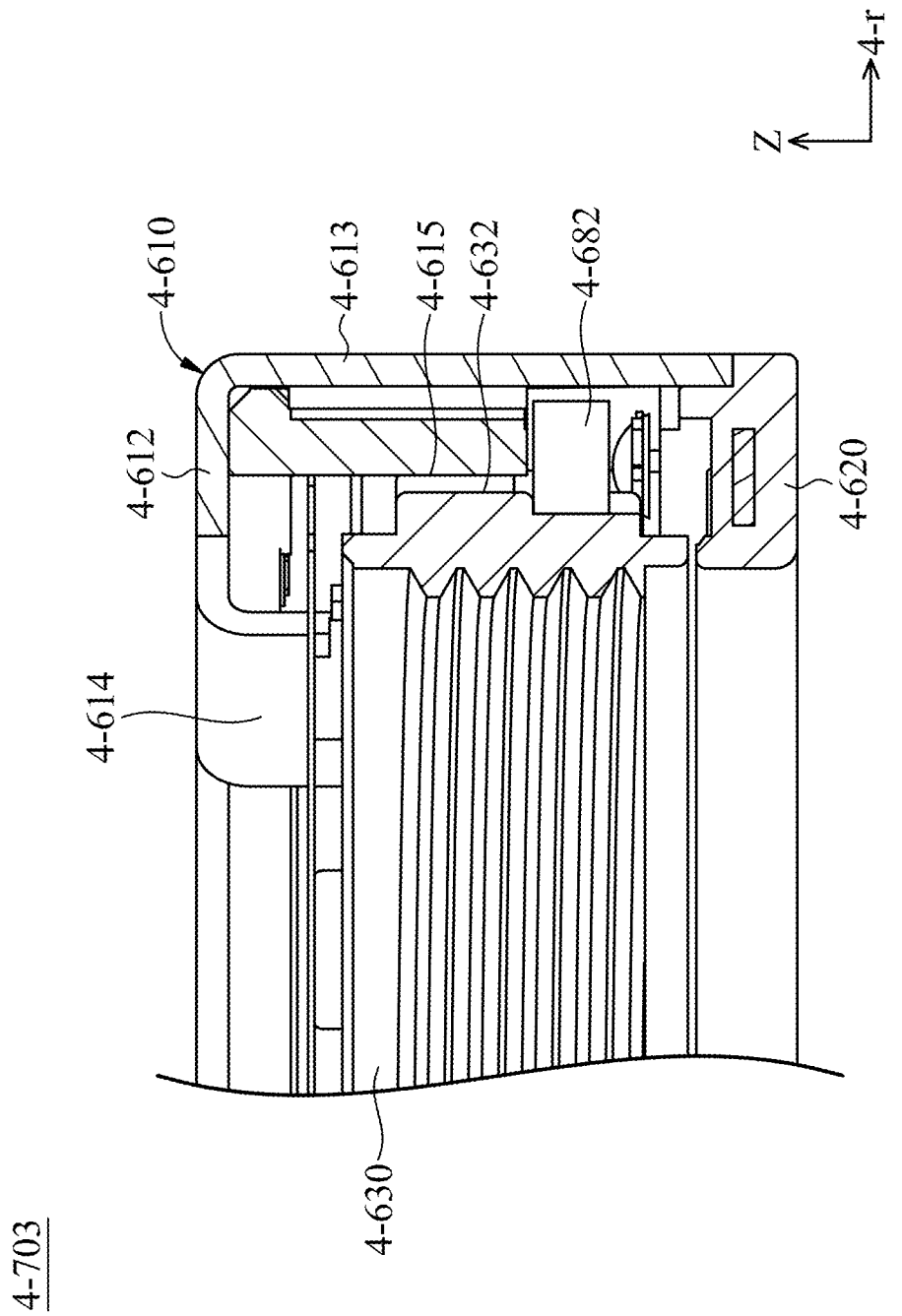
FIG. 38 is a cross-sectional view of a driving mechanism in an embodiment of the present disclosure.

FIG. 38 is a cross-sectional view of a driving mechanism 4-703 in another embodiment of the present disclosure. The different between the driving mechanisms 4-703 and 4-701 is that the buffering element 4-682 of the driving mechanism 4-703 is disposed between the outer sidewall 4-613 and the holder 4-630 (movable portion 4-M), and may be disposed on the holder 4-630. As a result, the movable portion 4-M and the fixed portion 4-F may be prevented from colliding with each other. Moreover, the buffering element 4-682 may be extended under the protrusion (arranged in Z direction) to further prevent the elements from colliding in this embodiment.

Figure 39:
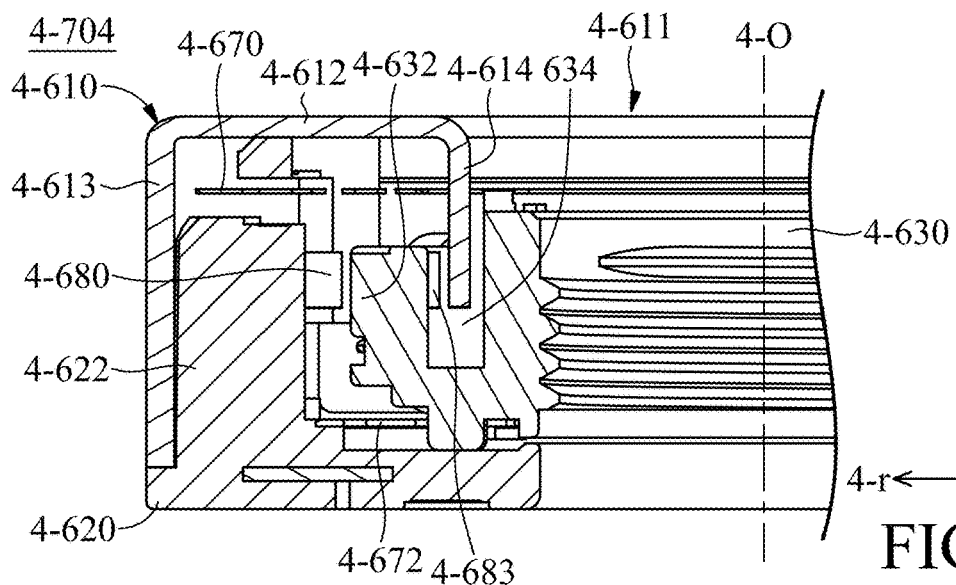
FIGS. 39 to 41 are cross-sectional views of driving mechanisms in some embodiments of the present disclosure.
Figure 40:
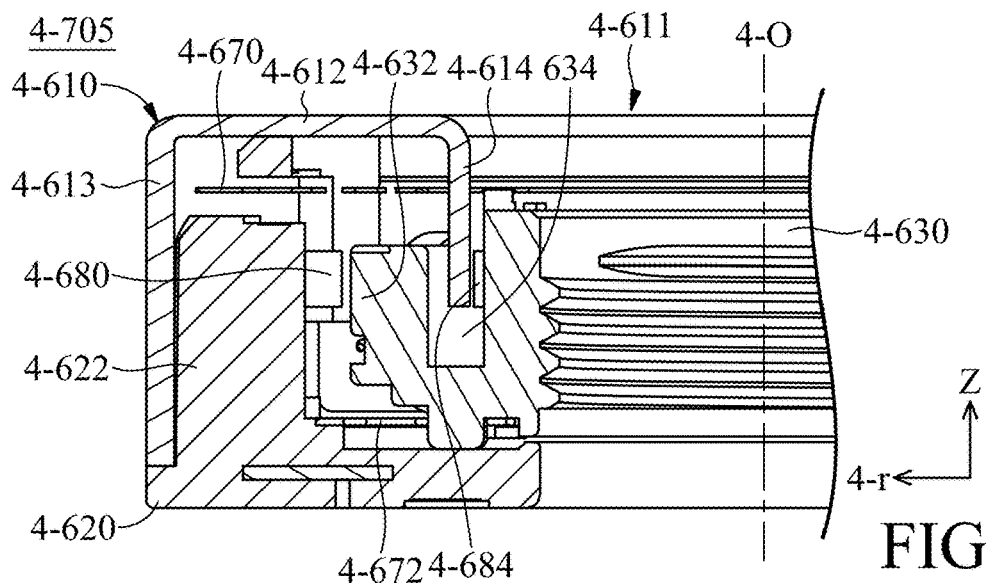
Figure 41:
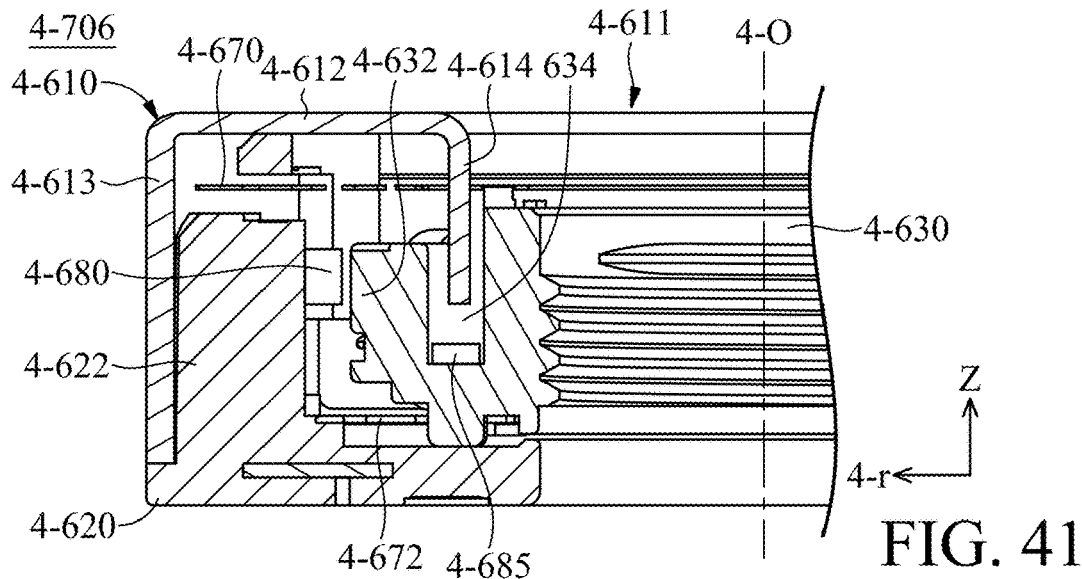

FIGS. 39 to 41 are cross-sectional views of driving mechanisms 4-704, 4-705 and 4-706, respectively. The difference between these embodiments to the previous embodiments is that a buffering element may be provided between the holder 4-630 and the inner sidewall 4-614 of the case 4-610. For example, the holder 4-630 may have a recess 4-634, and the inner sidewall 4-614 of the frame 4-610 may be disposed in the recess 4-634. The buffering element, such as the buffering element 4-683 in FIG. 39, the buffering element 4-684 in FIG. 40, or the buffering element 4-685 in FIG. 41, may be disposed in the recess 4-634. In particular, the buffering element 4-683 may be disposed on the outer side of the inner sidewall 4-614 (the side facing away the main axis 4-O), and the buffering element 4-684 may be disposed on the inner side of the inner sidewall 4-614 (the side adjacent to the main axis 4-O). Furthermore, the holder 4-630 may move relative to the fixed portion 4-F in Z direction, so the buffering element 4-685 may arrange with the inner sidewall 4-614 in Z direction in FIG. 41. As a result, the holder 4-630 may be prevented from colliding with the case 4-610 in various directions.

Figure 42:
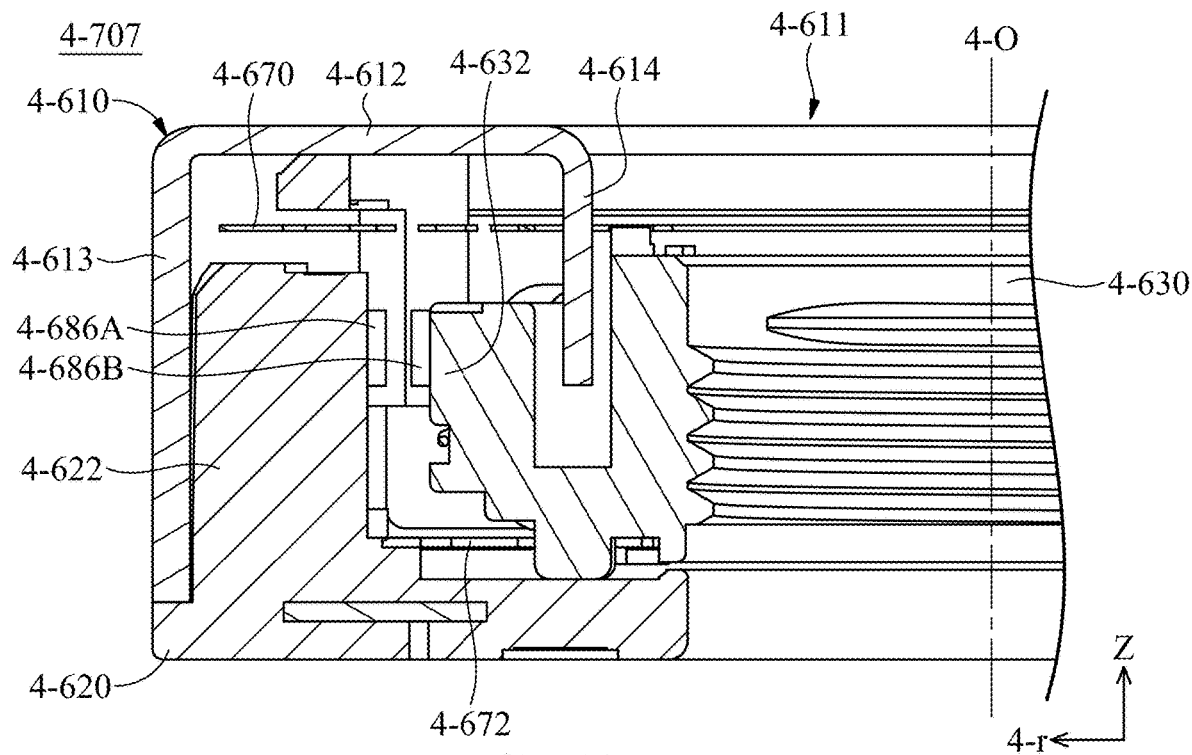
FIGS. 42 and 43 are cross-sectional views of driving mechanisms in some embodiments of the present disclosure.
Figure 43:
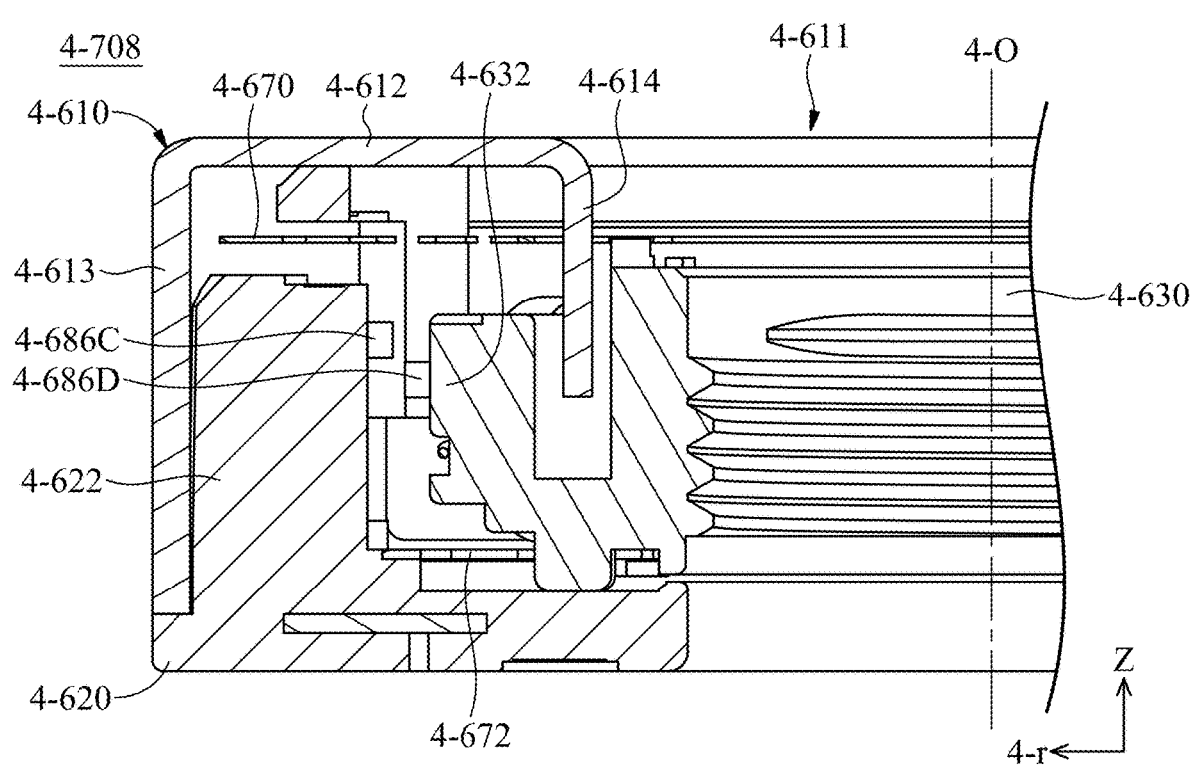

FIGS. 42 and 43 are cross-sectional views of the driving mechanisms 4-707 and 4-708 in some embodiments, wherein the driving mechanisms 4-707 and 4-708 include a plurality of buffering elements disposed between the column 4-622 and the protrusion 4-632. In FIG. 42, the driving mechanism 4-707 includes a buffering element 4-686A (first buffering element) disposed on the bottom 4-620 and a buffering element 4-686B (second buffering element) disposed on the holder 4-630, and a distance is formed between the buffering elements 4-686A and 4-686B. Furthermore, in FIG. 43, the driving mechanism 4-708 includes a buffering element 4-686C (first buffering element) disposed on the bottom 4-620 and a buffering element 4-686D (second buffering element) disposed on the holder 4-630, and a distance is formed between the buffering elements 4-686C and 4-686D.

In FIG. 42, the buffering element 4-686A at least partially overlaps the buffering element 4-686B of the driving mechanism 4-707 in a direction that is perpendicular to the main axis 4-O (a radius direction (direction 4-r) using the main axis 4-O as a center of circle). As a result, a plurality of buffering elements may be used for further buffering when the movable portion 4-M moving in the direction 4-r relative to the fixed portion 4-F, so the elements of the driving mechanism 4-707 may be further prevented from being damaged due to collision during the operation of the driving mechanism 4-707. On the other hand, in FIG. 43, the buffering element 4-686C does not overlap the buffering element 4-686D of the driving mechanism 4-708 in a direction that is perpendicular to the main axis 4-O (direction 4-r). As a result, collision that may occur at different positions (such as occur at different heights in Z direction) may be further prevented to protect other elements of the driving mechanism 4-708.

Figure 44:
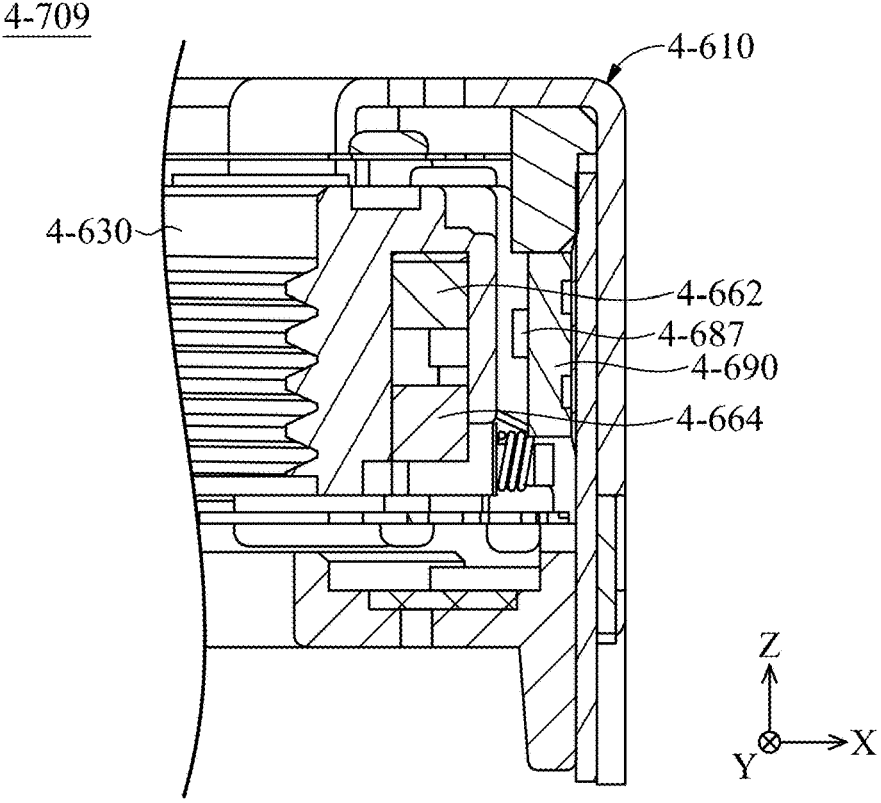
FIGS. 44 and 45 are cross-sectional views of driving mechanisms in some embodiments of the present disclosure.
Figure 45:
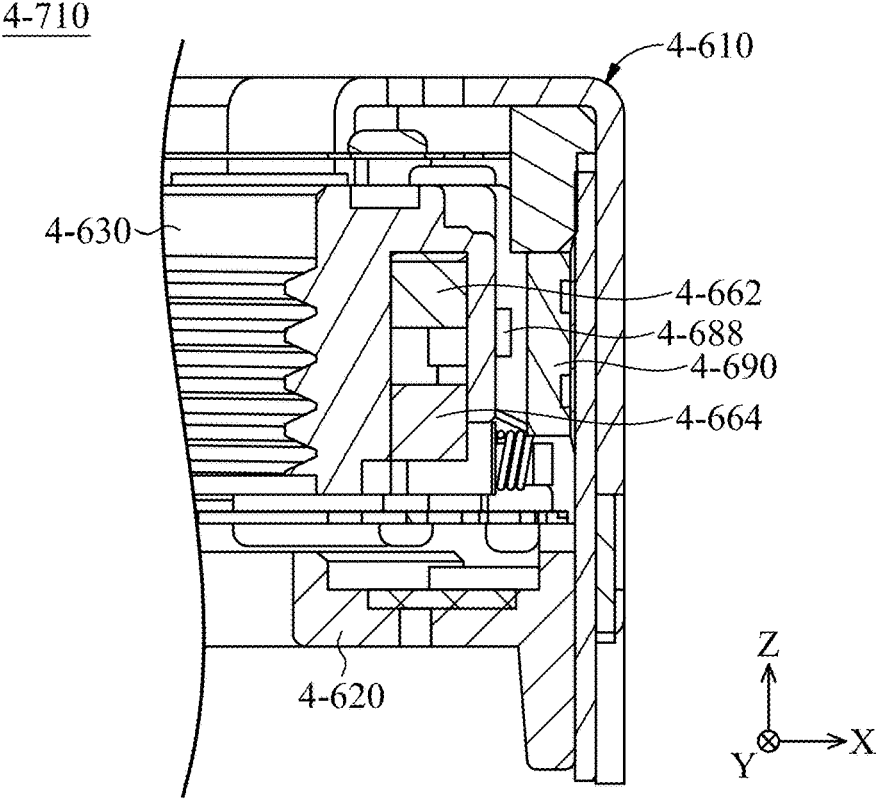

FIGS. 44 and 45 are cross-sectional views of driving mechanisms 4-709 and 4-710, respectively. The driving mechanisms 4-709 and 4-710 further includes a position sensor 4-690, which may be, for example, a Hall effect sensor, a MR sensor, or a fluxgate sensor to detect the magnetic element 4-660 on the frame 4-650 to get the offset value of the frame 4-650 and the holder 4-630 relative to the bottom 4-620.

The position sensor 4-690 may be disposed on the fixed portion 4-F (such as disposed on the case 4-610) to detect the movement of the movable portion 4-M. Furthermore, in this embodiment, a buffering element may be provided to protect the position sensor 4-690. For example, as shown in FIG. 44, the driving mechanism 4-709 includes a buffering element 4-687 disposed on a side of the position sensor 4-690 that corresponds to the holder 4-630. Moreover, as shown in FIG. 45, the driving mechanism 4-710 includes a buffering element 4-688 disposed on a side of the position sensor 4-690 corresponding to the holder 4-630.

It should be noted that when the holder 4-630 is static, the buffering element 4-687 is not in contact with the movable portion 4-M (holder 4-630), and the buffering element 4-688 is not in contact with the position sensor 4-690, as shown in FIGS. 44 and 45. As a result, the buffering elements 4-687 and 4-688 may be prevented from being in contact with the holder 4-630 and the position sensor 4-690 at the same time, so the durability of the buffering elements 4-687 and 4-688 may be enhanced. Furthermore, the buffering elements 4-687 or 4-688 may prevent the holder 4-630 from directly colliding with the position sensor 4-690, to protect the position sensor 4-690 during the operation. Moreover, as shown in FIG. 44, resonance of the position sensor 4-690 during the operation of the driving mechanism 4-709 may be prevented from occurring by providing the buffering element 4-687 on the position sensor 4-690, so accuracy of the position sensor 4-690 may not be affected.

Figure 46:
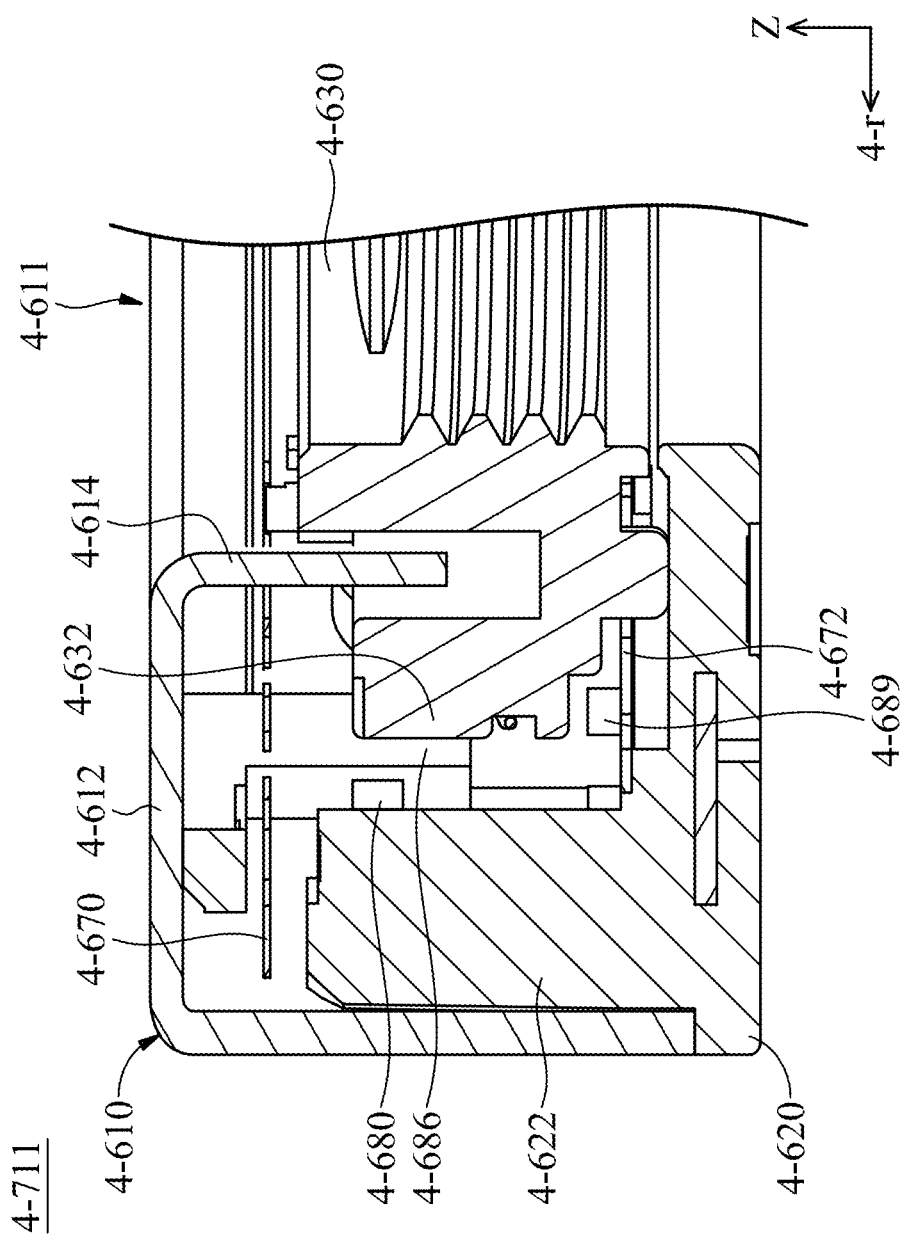
FIG. 46 is a cross-sectional view of a driving mechanism in some embodiments of the present disclosure.

FIG. 46 is a cross-sectional view of a driving mechanism 4-711 in some embodiments of the present disclosure. In FIG. 46, the driving mechanism 4-711 further includes a buffering element 4-689 disposed on the second resilience element 4-672, and the buffering element 4-689 may arrange with the movable portion 4-M (such as the holder 4-630) in Z direction. In some embodiments, the buffering element 4-689 is in direct contact with the second resilient element 4-672. As a result, the second resilient element 4-672 or the movable portion 4-M may be protected in Z direction, and resonance of the elements in the driving mechanism 4-711 may be prevented from occurring during the operation of the driving mechanism 4-711.

In summary, a driving mechanism for driving an optical element is provided in the present disclosure. Because the buffering element is only disposed on either the movable portion or the fixed portion, the lifetime of the buffering element may be increased, and collision or resonance of the elements in the driving mechanism may be prevented from occurring, thereby enhancing the durability and performance of the driving mechanism.

Although the buffering elements 4-680, 4-681, 4-682, 4-683, 4-684, 4-685, 4-686A, 4-686B, 4-686C, 4-686D, 4-687, 4-688, and 4-689 are illustrated in different embodiments, but any two (or more) of the buffering elements 4-680, 4-681, 4-682, 4-683, 4-684, 4-685, 4-686A, 4-68B, 4-686C, 4-686D, 4-687, 4-688, and 4-689 may be disposed in an identical driving mechanism without exceeding the scope of the present disclosure.

Fifth Group of Embodiments

Figure 47:
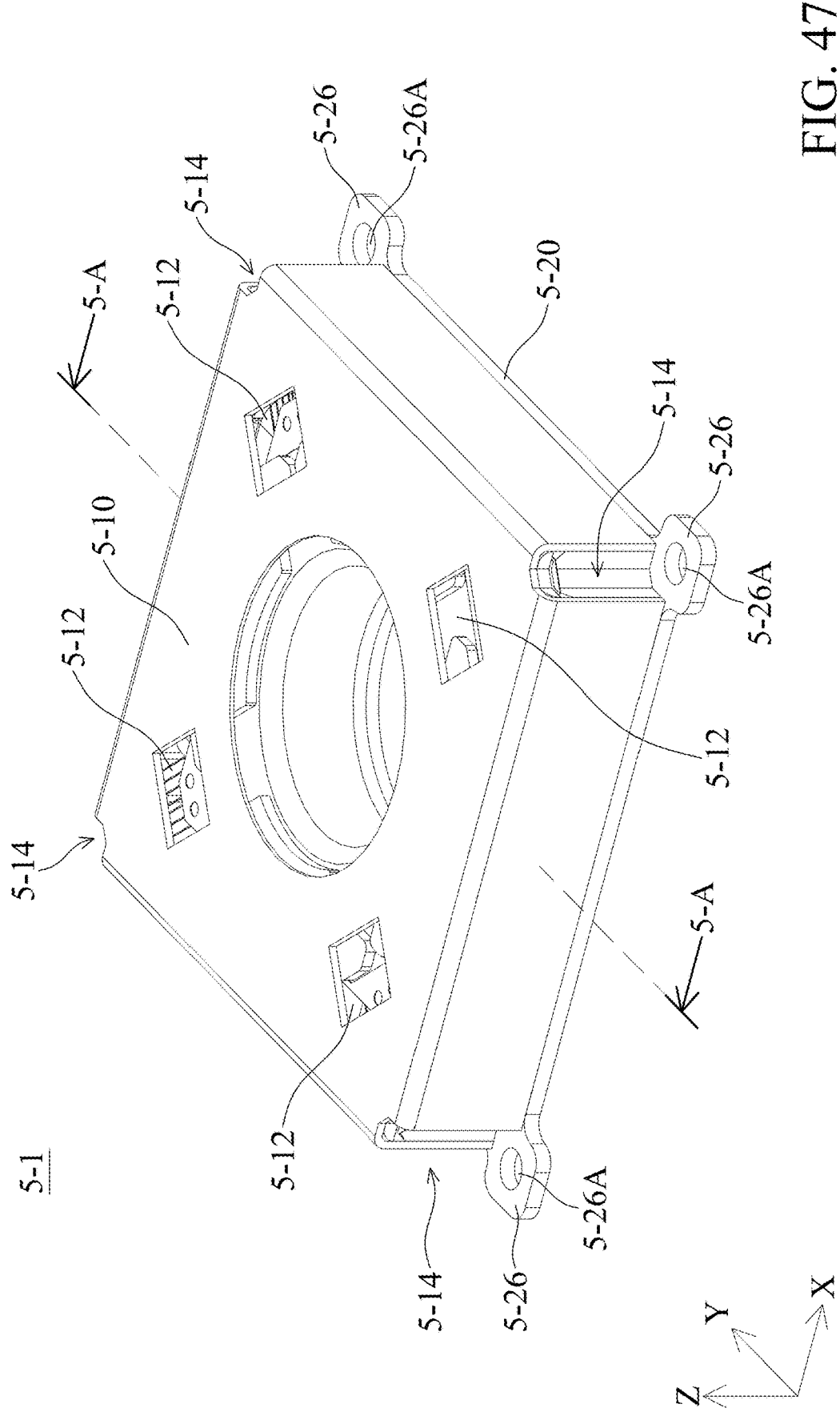
FIG. 47 is a schematic view of an optical element driving mechanism in some embodiments of the present disclosure.
Figure 48:
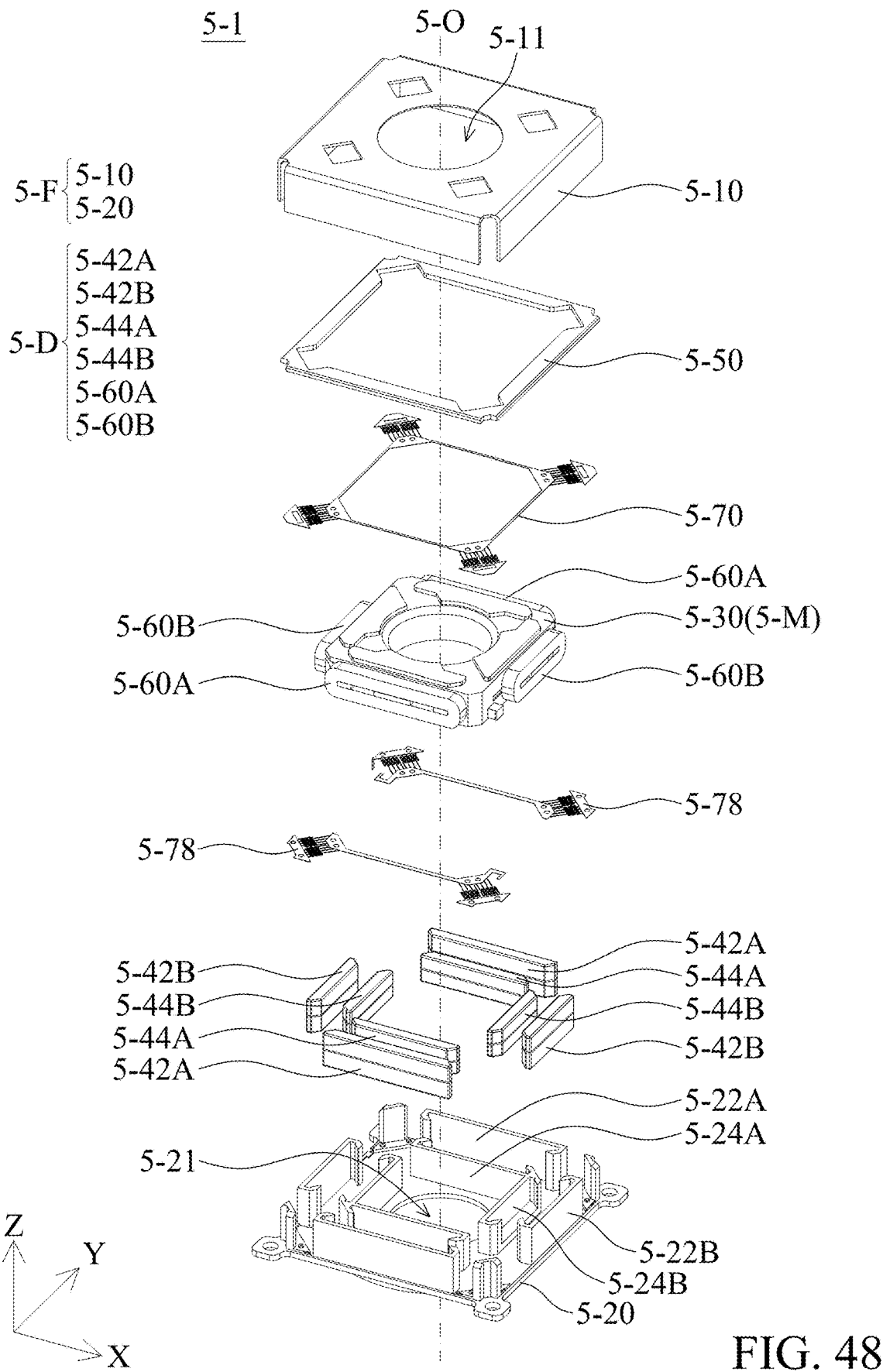
FIG. 48 is an exploded view of the optical element driving mechanism.
Figure 49:
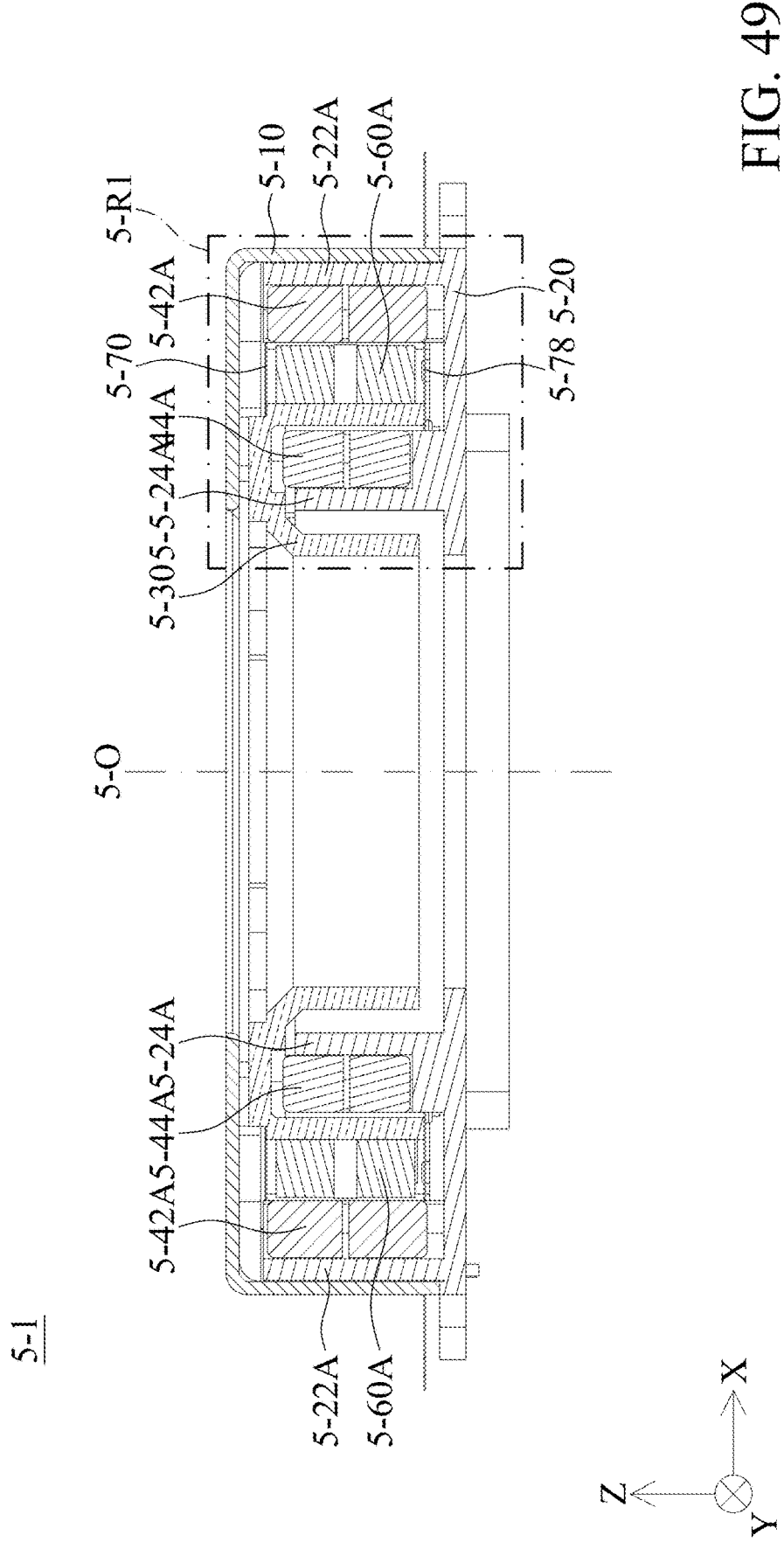
FIG. 49 is a cross-sectional view illustrated along line 5-A to 5-A in FIG. 47.
Figure 50:
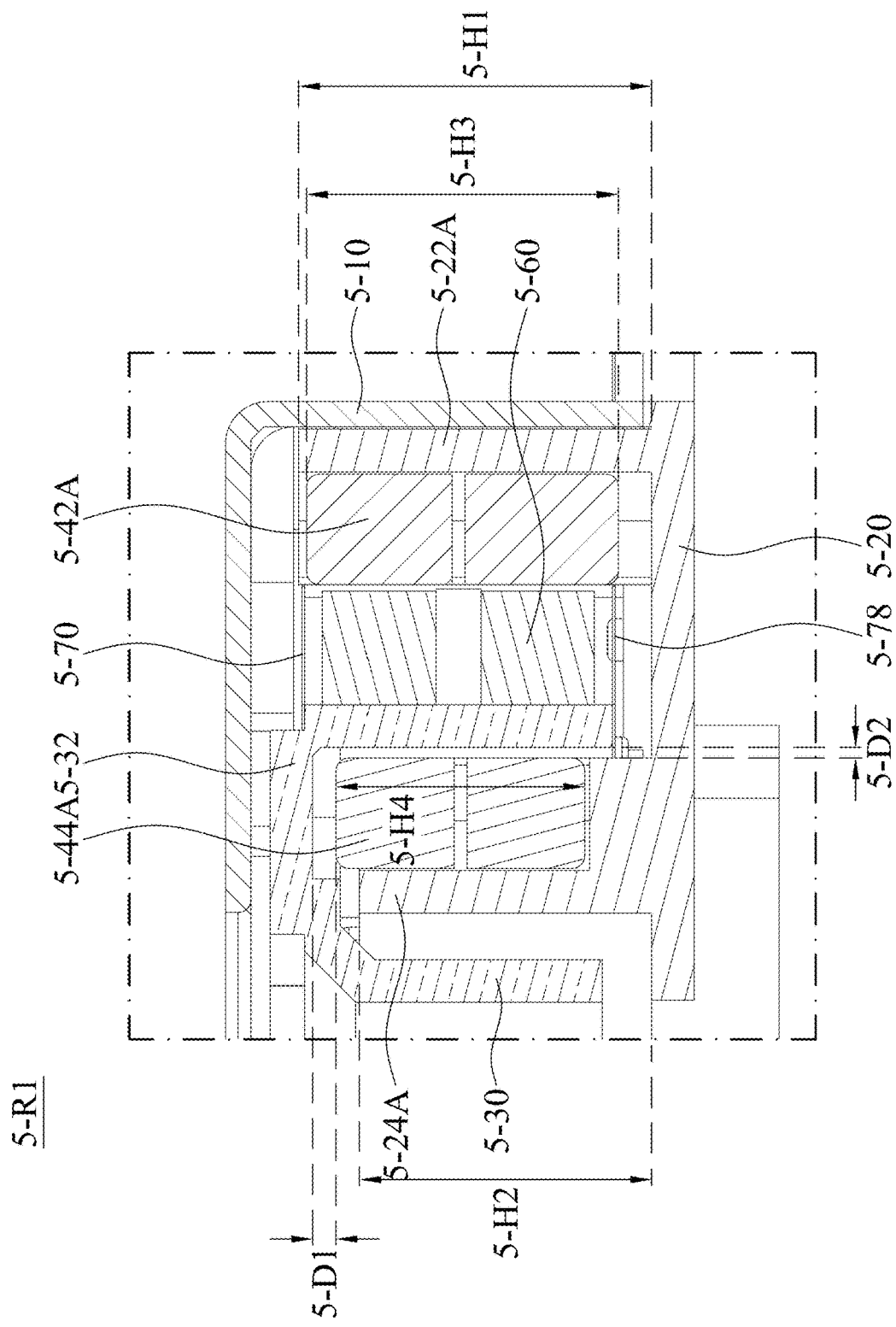
FIG. 50 is an enlarged view of the portion 5-R1 in FIG. 49.

Refer to FIG. 47 to FIG. 50, wherein FIG. 47 is a schematic view of an optical element driving mechanism 5-1 in some embodiments of the present disclosure, FIG. 48 is an exploded view of the optical element driving mechanism 5-1, FIG. 49 is a cross-sectional view illustrated along line 5-A to 5-A in FIG. 47, and FIG. 50 is an enlarged view of the portion 5-R1 in FIG. 49. As shown in FIG. 47 to FIG. 50, in this embodiment, the optical element driving mechanism 5-1 mainly includes a case 5-10, a base 5-20, a holder 5-30, a first magnetic element 5-42A, a second magnetic element 5-44A, a third magnetic element 5-60A, a fourth magnetic element 5-42B, a fifth magnetic element 5-44B, a sixth magnetic element 5-60B, a frame 5-50, a first resilient element 5-70, and a second resilient element 5-78. The optical element driving mechanism 5-1 may drive an optical element (not shown), so auto focus (AF) or optical image stabilization (OIS) may be achieved.

The case 5-10 and the base 5-20 may be referred to as a fixed portion 5-F, and the holder 5-30 may be referred to as a movable portion 5-M. The movable portion 5-M is movably connected to the fixed portion 5-F, which means the movable portion 5-M may be moved relative to the fixed portion. Moreover, the first magnetic element 5-42A, the second magnetic element 5-44A, the third magnetic element 5-60A, the fourth magnetic element 5-42B, the fifth magnetic element 5-44B, and the sixth magnetic element 5-60B may be referred to as a driving assembly 5-D for driving the movable portion 5-M moving relative to the fixed portion 5-F.

The case 5-10 and the base 5-20 may be combined as an outer case of the optical element driving mechanism 5-1. For example, the base 5-20 may be affixed on the case 5-10. It should be noted that a case opening 5-11 and a base opening 5-21 may be formed on the case 5-10 and the base 5-20, respectively. The center of the case opening 5-11 corresponds to a main axis 5-O of the optical element (not shown), and the base opening 5-21 corresponds to an image sensor (not shown) disposed outside the optical element driving mechanism 5-1. As a result, the optical element disposed in the optical element driving mechanism 5-1 may effect focusing with the image sensor along the main axis. Furthermore, as shown in FIG. 47, a plurality of top openings 5-12 may be formed on the case 5-10, adhesive may be provided through the top openings 5-12 to other elements of the optical element driving mechanism 5-1 to affix these elements. For example, the first resilient element 5-70 may be affixed on the holder 5-30.

Moreover, a plurality of corner openings 5-14 may be formed at the corners of the case 5-10, a plurality of connecting portions 5-26 may be formed on the corners of the base 5-20. Connecting portion openings 5-26A may be formed on the connecting portions 5-26. The base 5-20 may be affixed on other external elements by securing, such as using screws passing through the connecting portion openings 5-26A. The corner openings 5-14 may allow the screws passing through the case 5-10 rather than blocked by the case 5-10. In some embodiments, additional sealing material (not shown) may be provided at the corner openings 5-14 to prevent external dust from entering the optical element driving mechanism 5-1.

The holder 5-30 has a through hole, the optical element may be secured in the through hole, and the third magnetic element 5-60A and the sixth magnetic element 5-60B may be disposed on external surfaces of the holder 5-30. It should be noted that the interaction between the first magnetic element 5-42A, the second magnetic element 5-44A, the third magnetic element 5-60A, the fourth magnetic element 5-42B, the fifth magnetic element 5-44B, and the sixth magnetic element 5-60B may generate a magnetic force to move the holder 5-30 relative to the fixed portion 5-F, so auto focus (AF) or optical image stabilization (OIS) may be achieved.

In this embodiment, the holder 5-30 and the optical element disposed therein is movably disposed in the fixed portion 5-F. More specifically, the holder 5-30 may be connected to the fixed portion 5-F by the first resilient element 5-70 and the second resilient element 5-78 formed by metal (FIG. 49) When current passes through the third magnetic element 5-60A and the sixth magnetic element 5-60B, the third magnetic element 5-60A and the sixth magnetic element 5-60B may interact with the magnetic field of the first magnetic element 5-42A, the second magnetic element 5-44A, the fourth magnetic element 5-42B, and the fifth magnetic element 5-44B, to generate an electromagnetic force to move the holder 5-30 and the optical element relative to the fixed portion 5-F, so auto focus (AF) or optical image stabilization (OIS) may be achieved. Moreover, the holder 5-30 may include non-magnetic permeable metal to increase its durability and prevent magnetic interference with other elements from occurring.

In some embodiments, the first magnetic element 5-42A, the second magnetic element 5-44A, the third magnetic element 5-60A, the fourth magnetic element 5-42B, the fifth magnetic element 5-44B, and the sixth magnetic element 5-60B may include a combination of driving coils and driving magnets. For example, the first magnetic element 5-42A, the second magnetic element 5-44A, the fourth magnetic element 5-42B, and the fifth magnetic element 5-44B may be driving magnets, and the third magnetic element 5-60A and the sixth magnetic element 5-60B may be driving coils. In another example, the first magnetic element 5-42A, the second magnetic element 5-44A, the fourth magnetic element 5-42B, and the fifth magnetic element 5-44B may be driving coils, and the third magnetic element 5-60A and the sixth magnetic element 5-60B may be driving magnets, and is not limited thereto. The first the first magnetic element 5-42A, the second magnetic element 5-44A, the fourth magnetic element 5-42B, and the fifth magnetic element 5-44B may be positioned on the fixed portion 5-F, and the third magnetic element 5-60A and the sixth magnetic element 5-60B may be positioned on the movable portion 5-M, respectively. In some embodiments, the positions of the fixed portion 5-F and the movable portion 5-M are interchangeable.

It should be noted that the interaction between the first magnetic element 5-42A, the second magnetic element 5-44A, the third magnetic element 5-60A, the fourth magnetic element 5-42B, the fifth magnetic element 5-44B, and the sixth magnetic element 5-60B may create a magnetic force to move the holder 5-30 relative to the fixed portion 5-F, so auto focus (AF) or optical image stabilization (OIS) may be achieved. In some embodiments, the driving assembly 5-D may include other driving elements, such as piezoelectric elements, shape memory alloys, etc.

The frame 5-50 may be disposed between the case 5-10 and the holder 5-30, and may be affixed on the case by, for example, glue. Furthermore, the first resilient element 5-70 and the frame 5-50 do not overlap each other along the main axis 5-O. As a result, the holder 5-30 and the first resilient element 5-70 may be protected.

In some embodiments, additional circuit may be provided on the base for electrically connecting to other electronic elements disposed inside or outside the optical element driving mechanism 5-1 to achieve auto focus or optical image stabilization. The circuit on the base 5-20 may send electrical signal to the third magnetic element 5-60A or the sixth magnetic element 5-60B through the first resilient element 5-70 or the second resilient element 5-78 to control the movement of the holder 5-30 in X, Y, or Z axis. The circuit on the base 5-20 may be attached to the second resilient element 5-78 by soldering or laser welding, so the third magnetic element 5-60A and the sixth magnetic element 5-60B may be electrically connected to external circuit.

Furthermore, additional driving circuits may be embedded in the base 5-20 (not shown) to interact with the driving assembly 5-D for moving the holder 5-30. For example, driving forces with different directions may be generated to perform auto focus or optical image stabilization.

Figure 51:
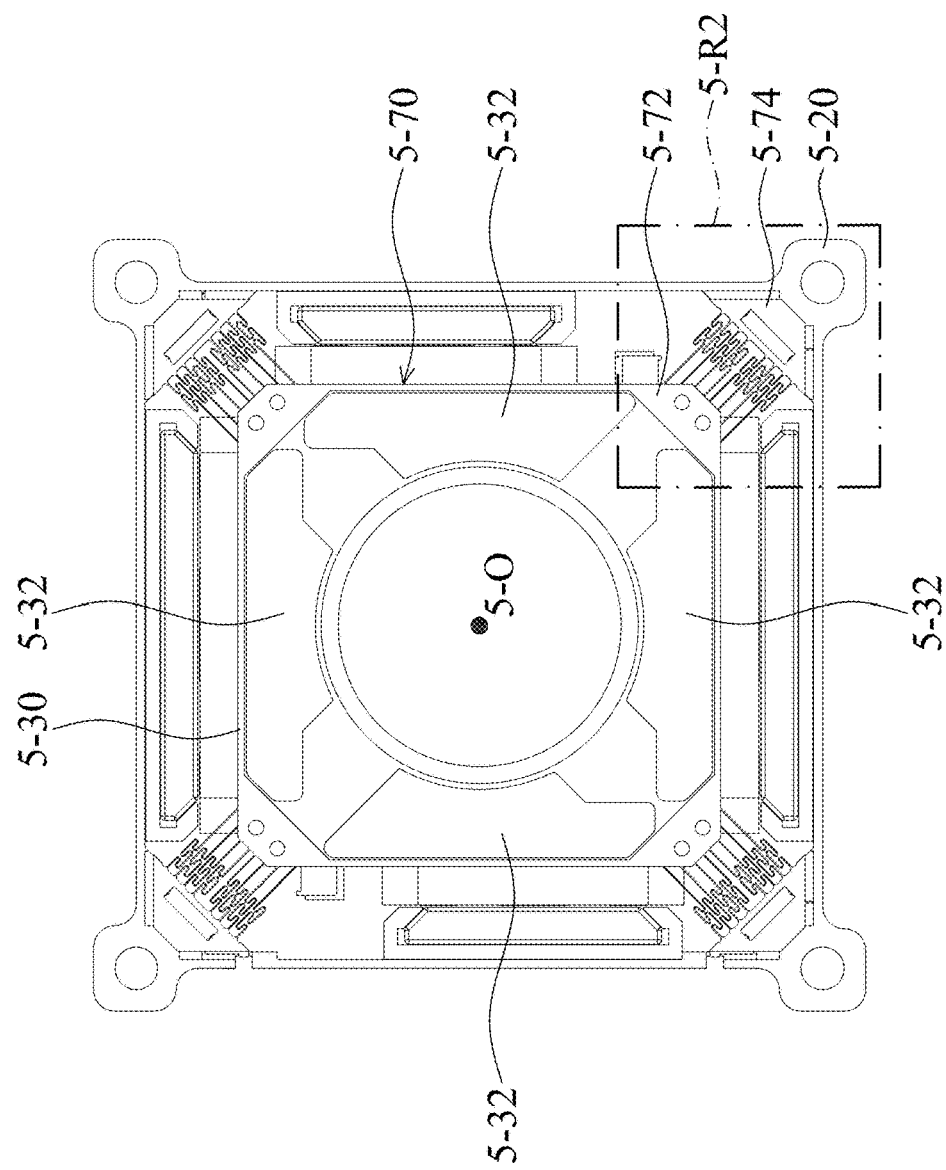
FIG. 51 is a top view of some elements of the optical element driving mechanism.
Figure 52:
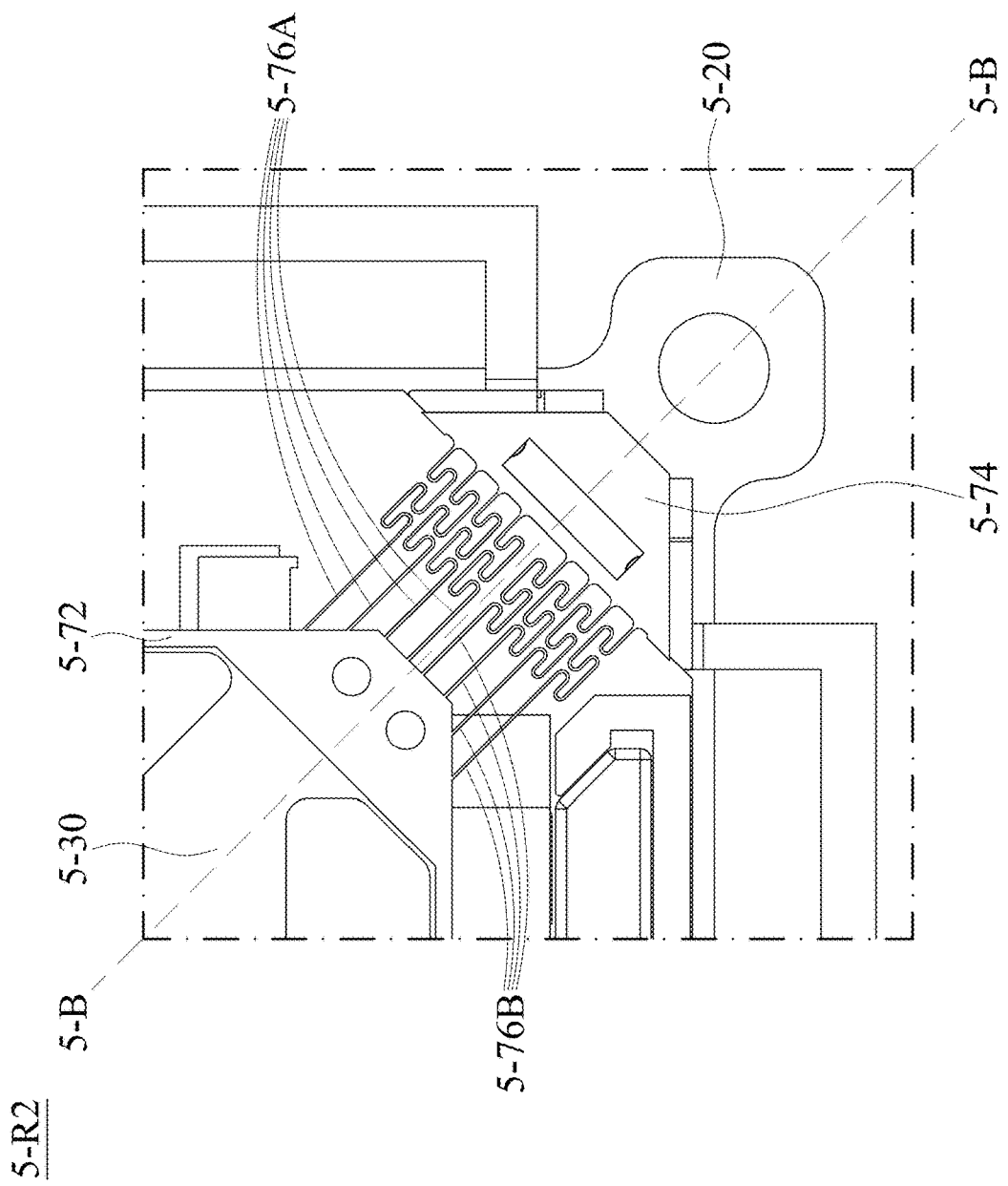
FIG. 52 is an enlarged view of the portion 5-R2 in FIG. 51.

FIG. 51 is a top view of some elements of the optical element driving mechanism 5-1, and FIG. 52 is an enlarged view of the portion 5-R2 in FIG. 51. As shown in FIG. 51 and FIG. 52, the first resilient element 5-70 may include an inner portion 5-72, an outer portion 5-74, and a plurality of first connecting portions 5-76A and a plurality of second connecting portions 5-76B. For example, the inner portion 5-72 may be disposed on the holder 5-30, and the outer portion 5-74 may be disposed on the base 5-20. In other words, the first resilient element 5-70 may connect the movable portion 5-M and the fixed portion 5-F to allow the movable portion 5-M moving relative to the fixed portion 5-F.

Multiple first connecting portions 5-76A and second connecting portions 5-76B in the first resilient element 5-70 allow the stress withstood by the first connecting portions 5-76A and second connecting portions 5-76B being dispensed, so the durability of the first connecting portions 5-76A and the second connecting portions 5-76B may be increased. Furthermore, the first connecting portions 5-76A and the second connecting portions 5-76B are symmetrical to line 5-B to 5-B in FIG. 52, so the stress in various directions may be balanced. The first connecting portions 5-76A and the second connecting portions 5-76B may be S-shaped to provide additional movable range of the holder 5-30.

Furthermore, as shown in FIG. 48, the optical element driving mechanism 5-1 further includes two second resilient element 5-78 (the resilient element) which may be used for connecting the movable portion 5-M and the fixed portion 5-F. The second resilient element 5-78 may have a similar structure to that of the first resilient element 5-70, such as multiple first connecting portions 5-76A and second connecting portions 5-76B. Moreover, the two second resilient elements 5-78 may be symmetrical to the main axis 5-O to balance stresses in different directions. In some embodiments, the two second resilient elements 5-78 may be electrical insulating with each other, so different electrical signal may be provided to the two second resilient elements 5-78 to control the elements of the driving assembly separately.

The connecting portions of the first resilient element 5-70 and the second resilient element 5-78 (such as the first connecting portions 5-76A and the second connecting portion 5-76B) are positioned adjacent to the corners of the holder, the required length of the connecting portions may be reduced, so the required modulus of elasticity may be reduced.

Figure 53:
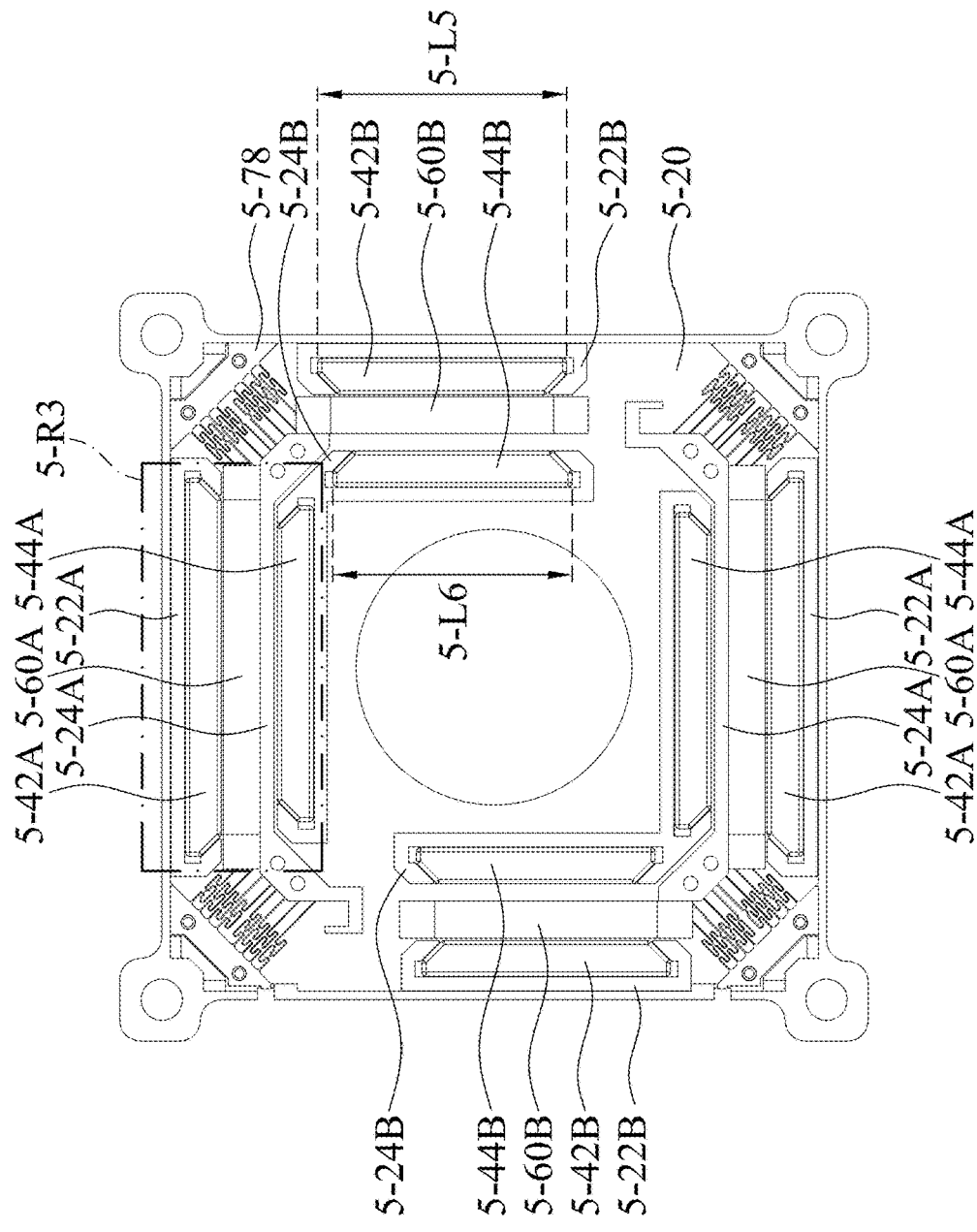
FIG. 53 is a top view of some elements of the optical element driving mechanism.
Figure 54:
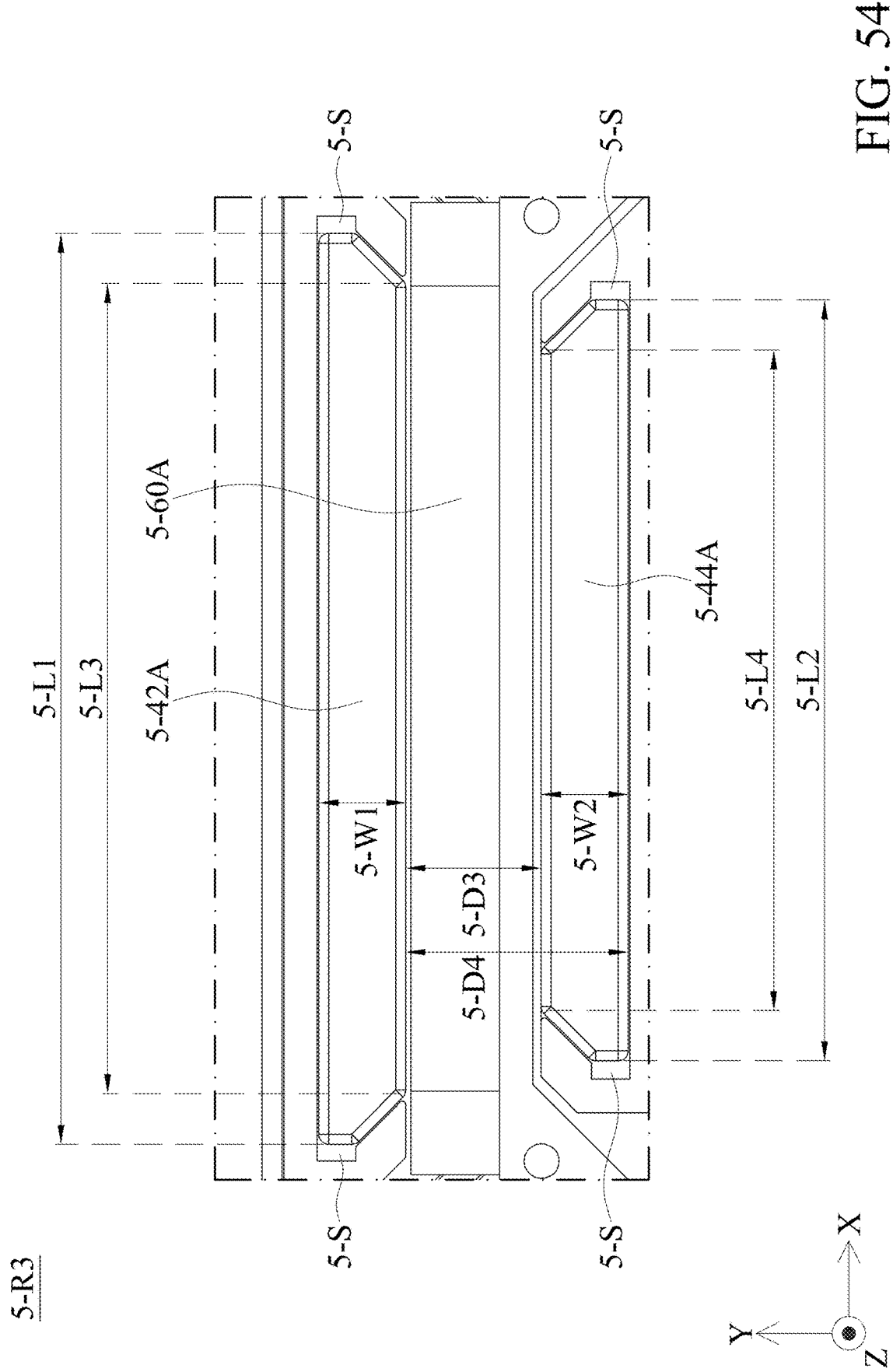
FIG. 54 is an enlarged view of the portion 5-R3 in FIG. 53.

FIG. 53 is a top view of some elements of the optical element driving mechanism 5-1, and FIG. 54 is an enlarged view of the portion 5-R3 in FIG. 53. As shown in FIG. 53, the third magnetic element 5-60A is disposed between the first magnetic element 5-42A and the second magnetic element 5-44A, and the sixth magnetic element 5-60B is disposed between the fourth magnetic element 5-42B and the fifth magnetic element 5-44B.

In some embodiments, the driving assembly 5-D may include two first magnetic elements 5-42A, two second magnetic elements 5-44A, and two third magnetic elements 60A. The first magnetic elements 5-42A are symmetrical to the main axis 5-O, the second magnetic elements 5-44A are symmetrical to the main axis 5-O, and the third magnetic elements 60A are symmetrical to the main axis 5-O.

As shown in FIG. 54, the first magnetic element 5-42A has a long side and a short side, the second magnetic element 5-44A has a long side and a short side, and the distance 5-D3 between the short side of the first magnetic element 5-42A and the short side of the second magnetic element 5-44A is less than the distance 5-D4 between the short side of the first magnetic element 5-42A and the long side of the second magnetic element 5-44A in a direction that is perpendicular to the main axis 5-O.

As shown in FIG. 53 and FIG. 54, the length 5-L1 of the first magnetic element 5-42A is different than the length 5-L2 of the second magnetic element 5-44A in a first direction (X direction) that is perpendicular to the main axis 5-O. Furthermore, the width 5-W1 of the first magnetic element 5-42A is different than the width 5-W2 of the second magnetic element 5-44A in a second direction (Y direction) that is perpendicular to the main axis, and the first is perpendicular to the second direction.

Moreover, the length 5-L1 of the first magnetic element 5-42A may be different than the length 5-L5 of the fourth magnetic element 5-42B, and the length 5-L2 of the second magnetic element 5-44A may be different than the length 5-L6 of the fifth magnetic element 5-44B to increase the flexibility of design. Furthermore, the lengths of the third magnetic element 5-60A and the sixth magnetic element 5-60B may also correspond to the first magnetic element 5-42A, the second magnetic element 5-44A, the fourth magnetic element 5-42B, and the fifth magnetic element 5-44B to be different. For example, if the length 5-L1 of the first magnetic element 5-42A is greater than the length 5-L5 of the fourth magnetic element 5-42B, the length of the third magnetic element 5-60A may also be greater than the length of the sixth magnetic element 5-60B, and vice versa.

In some embodiments, if the third magnetic element 5-60A and the sixth magnetic element 5-60B are driving coils, the third magnetic element 5-60A and the sixth magnetic element 5-60B may be electrically connected in series to reduce the design difficulty.

It should be noted that two driving magnets (e.g. the first magnetic element 5-42A and the second magnetic element 5-44A) are corresponding to one driving coil (e.g. the third magnetic element 5-60A) disposed between the two driving magnets, so the electromagnetic force generated by the driving assembly 5-D may be increase to move a heavier optical element. Moreover, the first magnetic element 5-42A and the second magnetic element 5-44A may be designed as driving coils, and the third magnetic element 5-60A may be designed as a driving magnet, which also increases the generated electromagnetic force.

Figure 55:
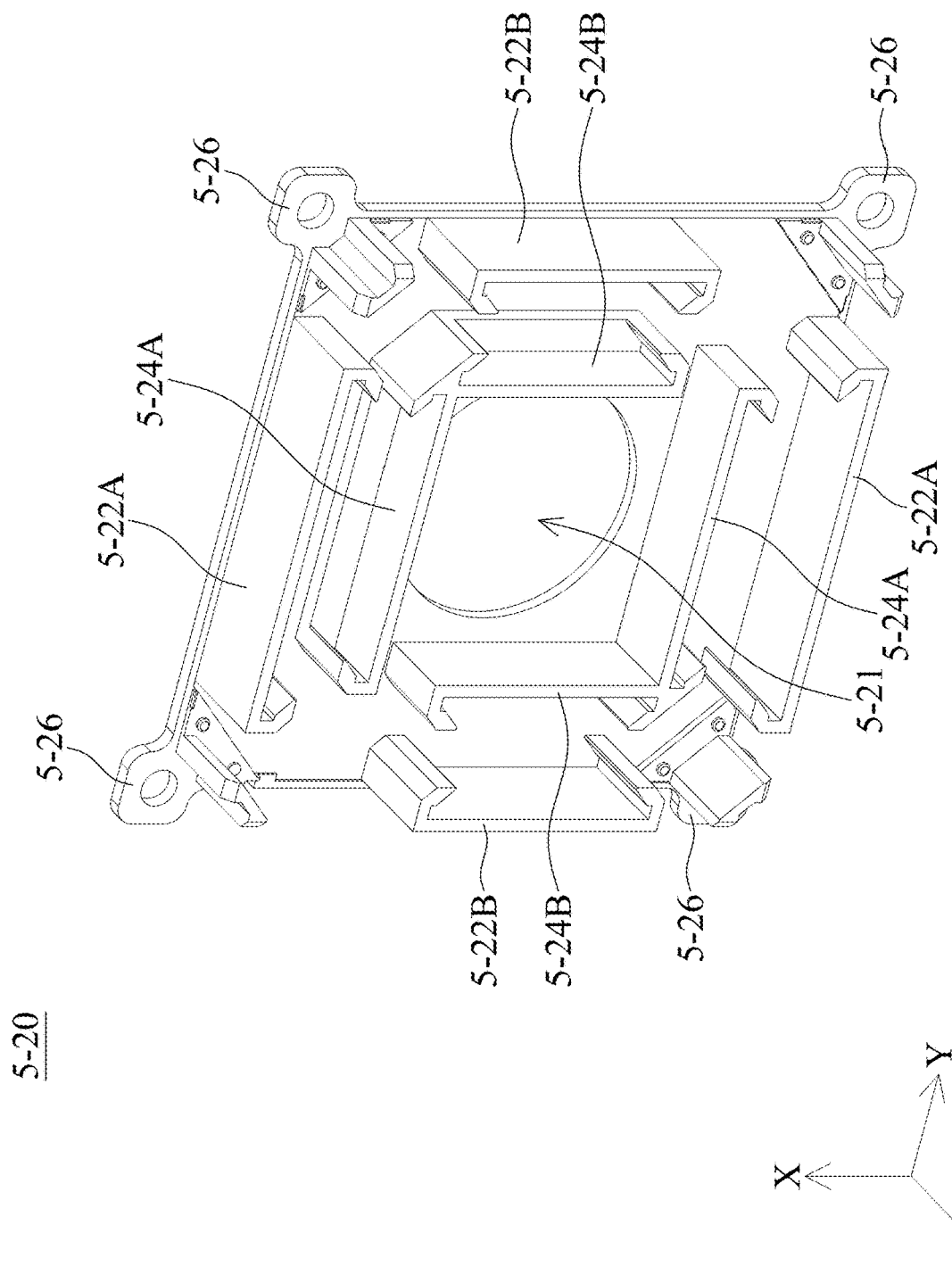
FIG. 55 is a schematic view of the base.

FIG. 55 is a schematic view of the base 5-20. The base 5-20 includes a first accommodating element 5-22A, a second accommodating element 5-24A, a third accommodating element 5-22B, and a fourth accommodating element 5-24B. The first magnetic element 5-42A, the second magnetic element 5-44A, the fourth magnetic element 5-42B, and the fifth magnetic element 5-44B may be disposed in the first accommodating element 5-22A, the second accommodating element 5-24A, the third accommodating element 5-22B, and the fourth accommodating element 5-24B, such as affixed therein by glue, respectively.

As shown in FIG. 53, FIG. 54, and FIG. 55, each of the first accommodating element 5-22A and the second accommodating element 5-24A has an opening, and the openings oriented to each other. Each of the third accommodating element 5-22B and the fourth accommodating element 5-24B also has an opening, and the openings also oriented to each other. As a result, the first magnetic element 5-42A, the second magnetic element 5-44A, the fourth magnetic element 5-42B, and the fifth magnetic element 5-44B disposed in the first accommodating element 5-22A, the second accommodating element 5-24A, the third accommodating element 5-22B, and the fourth accommodating element 5-24B may exposed from the openings to decrease the distances to the third magnetic element 5-60A and the sixth magnetic element 5-60B, so the electromagnetic force between these elements may be increased. In some embodiments, the second magnetic element 5-24A and the fourth magnetic element 5-24B may be connected to each other to reduce the amount of space required to achieve miniaturization.

Furthermore, the first magnetic element 5-42A, the second magnetic element 5-44A, the fourth magnetic element 5-42B, and the fifth magnetic element 5-44B may have trapezoid shape. For example, the long side of the first magnetic element 5-42A has a length 5-L1, the short side of the first magnetic element 5-42A has a length 5-L3, and the length 5-L1 is greater than the length 5-L3. The long side of the second magnetic element 5-44A has a length 5-L2, the short side of the second magnetic element 5-44A has a length 5-L4, and the length 5-L2 is greater than the length 5-L4. Furthermore, the short sides of the first magnetic element 5-42A and the second magnetic element 5-44A may be disposed at the openings of the first accommodating element 5-22A and the second accommodating element 5-24A, respectively. As a result, the first magnetic element 5-42A and the second magnetic element 5-44A may be prevented from being attracted out from the openings of the first accommodating element 5-22A and the second accommodating element 5-24A by the magnetic forces between the first magnetic element 5-42A and the second magnetic element 5-44A. Moreover, the first accommodating element 5-22A and the second accommodating element 5-24A may include magnetic permeable material, which also may prevent the first magnetic element 5-42A and the second magnetic element 5-44A from being attracted out from the openings of the first accommodating element 5-22A and the second accommodating element 5-24A by the magnetic forces between the first magnetic element 5-42A and the second magnetic element 5-44A.

In some embodiments, additional magnetic permeable elements (not shown) may be disposed at the side of the first magnetic element 5-42A that is away from the main axis 5-O, or may be disposed at the side of the second magnetic element 5-44A that is adjacent to the main axis 5-O, so the attracting force between the first magnetic element 5-42A and the second magnetic element 5-44A may be reduced to prevent the first magnetic element 5-42A and the second magnetic element 5-44A from being attracted out from the first accommodating element 5-22A and the second accommodating element 5-24A. Similar magnetic permeable elements may be provided on the fourth magnetic element 5-42B and the fifth magnetic element 5-44B, depending on design requirement.

In some embodiments, as shown in FIG. 54, in a direction of the length of the first magnetic element 5-42A and the second magnetic element 5-44A (X direction), a space 5-S is formed between the first magnetic element 5-42A and the first accommodating element 5-22A, and is formed between the second magnetic element 5-44A and the second accommodating element 5-24A, and adhesive may be disposed in the space 5-S to affix the first magnetic element 5-42A and the second magnetic element 5-44A.

Refer to FIG. 50, along the main axis 5-O, the height 5-H1 of the first accommodating element 5-22A and the height 5-H2 of the second accommodating element 5-24A are different, and the height 5-H3 of the first magnetic element 5-42A and the height 5-H4 of the second magnetic element 5-44A are different. For example, the height 5-H1 may be greater than the height 5-H3, and the height 5-H2 may be greater than the height 5-H4. Furthermore, a distance 5-D1 that is greater than zero may be formed between the top surface of the second magnetic element 5-44A and the holder 5-30 in Z direction, and a distance 5-D2 that is greater than zero may be formed between the side surface of the second magnetic element 5-44A and the holder 5-30 in X direction. In other words, the second magnetic element 5-44A does not in direct contact with the holder 5-30, so the second magnetic element 5-44A may be prevented from being damaged by direct collide with the holder 5-30 when the holder 5-30 is moving relative to the fixed portion 5-F.

Figure 56:
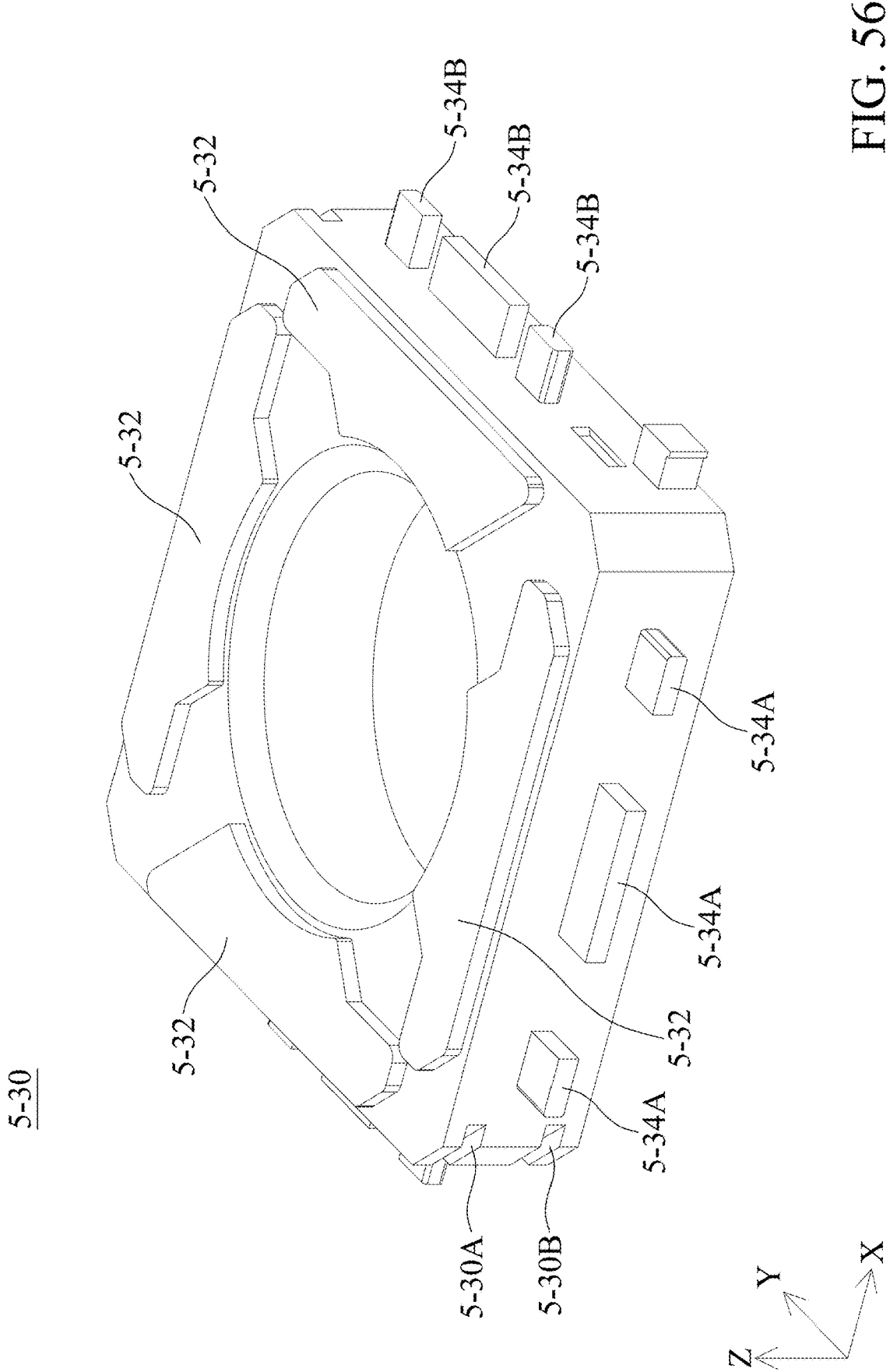
FIG. 56 is a schematic view of the holder.

FIG. 56 is a schematic view of the holder 5-30. The optical element driving mechanism may have a circuit (not shown) electrically connected to the driving assembly 5-D, wherein the holder 5-30 has two recesses 5-30A and 5-30B, and the circuit may be disposed in the recesses 5-30A and 5-30B. Furthermore, the holder 5-30 has protruding portions 5-32 that are extending along the main axis 5-O. As a result, when the holder 5-30 is moving relative to the fixed portion 5-F along the main axis 5-O, the protruding portions 5-32 may contact the case 5-10 to limit the movable range of the holder 5-30. In some embodiments, circuits that are electrically insulating with each other may be respectively disposed in the recess 5-30A and the recess 5-30B to prevent short circuit.

Moreover, a plurality of columns 5-34A and 5-34B may be formed on the holder 5-30. The third magnetic element 5-60A and the sixth magnetic element 5-60B may be disposed on the columns 5-34A and the columns 5-34B, respectively. As a result, the sizes of the third magnetic element 5-60A and the sixth magnetic element 5-60B may be increased to enhance the electromagnetic force of the driving assembly 5-D. Furthermore, the columns 5-34A and 5-34B may limit the movable range of the holder 5-30 relative to the fixed portion 5-F when the holder 5-30 moves on the XY plane.

Figure 57:
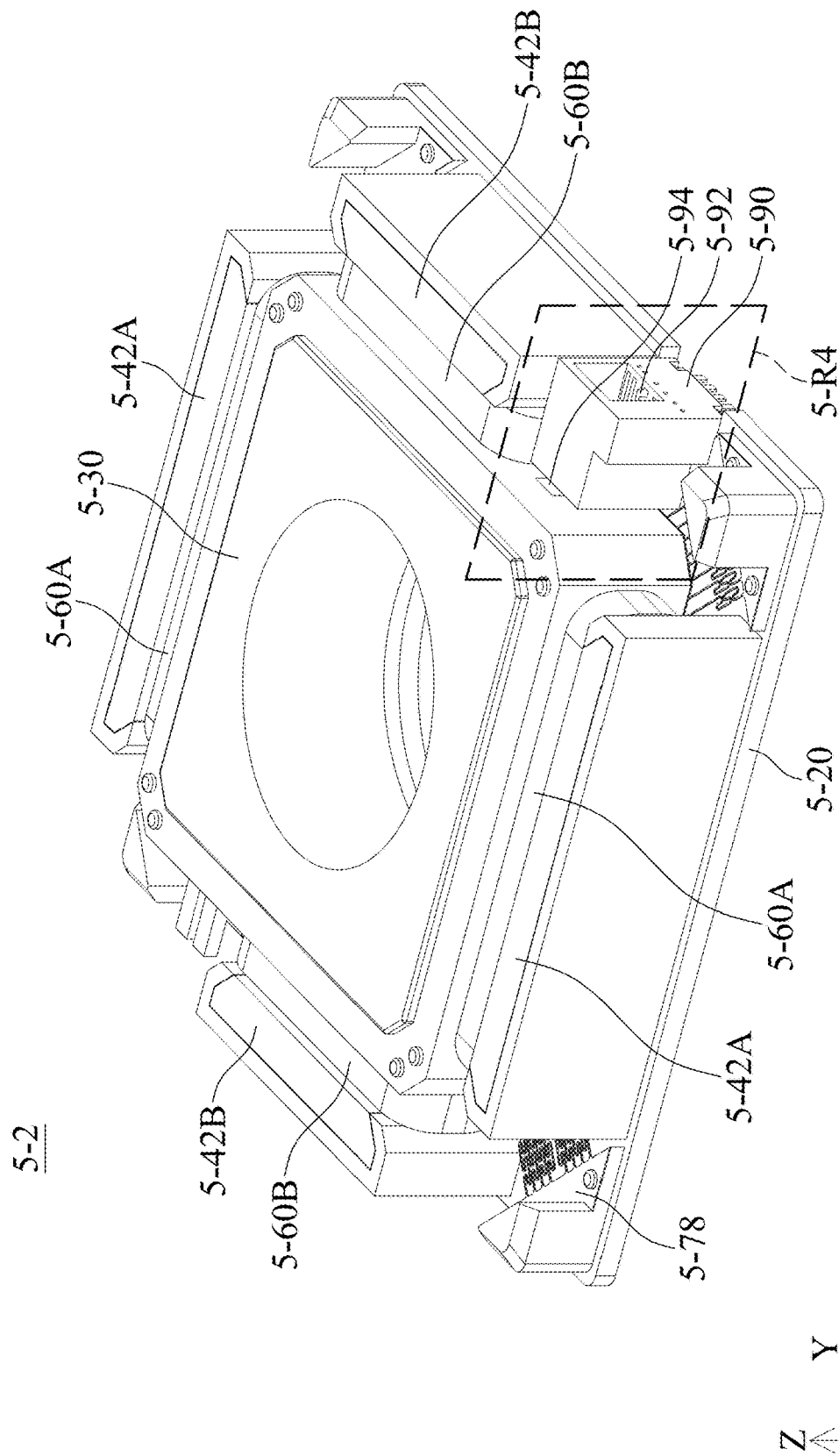
FIG. 57 is a schematic view of some elements of an optical element driving mechanism in some embodiments of the present disclosure.
Figure 58:
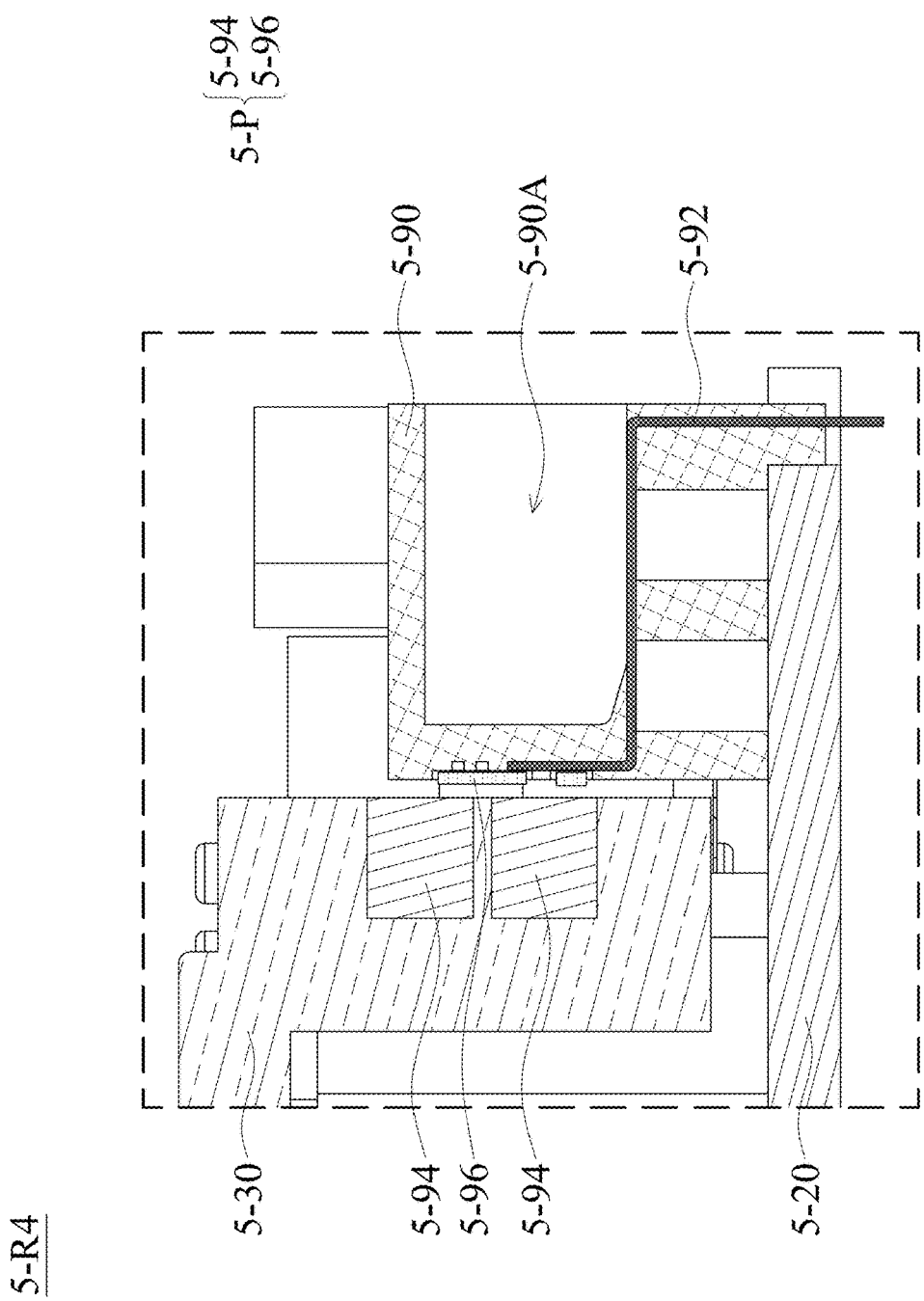
FIG. 58 is an enlarged cross-sectional view of the portion 5-R4 in FIG. 57.

FIG. 57 is a schematic view of some elements of an optical element driving mechanism 5-2 in some embodiments of the present disclosure, and FIG. 58 is an enlarged cross-sectional view of the portion 5-R4 in FIG. 57. It should be noted that some elements of the optical element driving mechanism 5-2 are not shown for clarity, such as the case, the first resilient element, etc.

The optical element driving mechanism 5-2 may further include a connecting element 5-90, a connecting circuit 5-92 and a position sensing assembly 5-P (which includes a first position sensing element 5-94 and a second position sensing element 5-96). The position sensing assembly 5-P may be disposed on the fixed portion 5-F (such as the base 5-20) or the movable portion 5-M (such as the holder 5-30). For example, in some embodiments, the first position sensing element 5-94 and the second position sensing element 5-96 may be disposed on the movable portion 5-M and the fixed portion 5-F, respectively. For example, the first position sensing element 5-94 may be embedded in the movable portion 5-M (such as the holder 5-30), and the second position sensing element 5-96 may be disposed on the connecting element 5-90. Furthermore, in some embodiments, the first position sensing element 5-94 and the second position sensing element 5-96 may be disposed on the fixed portion 5-F and the movable portion 5-M, respectively, and the first position sensing element 5-94 may be disposed on the connecting element 5-90. In some embodiments, the connecting element 5-90 may be separate from the base 5-20.

The first position sensing element 5-94 and the second position sensing element 5-96 of the position sensing assembly 5-P may be a position sensor and a magnet, respectively. When the holder 5-30 moves relative to the fixed portion 5-F, the position sensor may detect the magnetic field variation of the magnet to get the position of the holder 5-30 relative to the fixed portion 5-F.

The connecting element 5-90 may include a concave portion 5-90A, and the connecting circuit 5-92 is electrically connected to the position sensing assembly 5-P (such as the first position sensing element 5-94 or the second position sensing element 5-96) and other external elements through the concave portion 5-90A, so the signal of the position sensing assembly 5-P may be provided to other external elements. For example, as shown in FIG. 58, the connecting circuit 5-92 may be partially embedded in the connecting element 5-90. Furthermore, the position sensing assembly 5-P and the driving assembly 5-D (such as the fourth magnetic element 5-42B in FIG. 57) at least partially overlap each other in a direction that is perpendicular to the main axis 5-O, such as the Y direction in FIG. 57, to reduce the amount of space required for miniaturization. In some embodiments, the connecting element 5-90 comprises plastic to prevent short circuit occurs between the connecting circuit 5-92 and the connecting element.

In some embodiments, the second position sensing element 5-96 may include a Hall effect sensor, a magnetoresistance effect sensor (MR Sensor), a giant magnetoresistance effect sensor (GMR sensor), a tunneling magnetoresistance effect sensor (TMR sensor), or a fluxgate sensor.

In summary, an optical element driving mechanism is provided. The optical element driving mechanism includes a movable portion, a fixed portion, and a driving assembly. The movable portion is used for connecting to an optical element, wherein the optical element has a main axis. The movable portion is movably connected to the fixed portion. The driving assembly is disposed on the movable portion or the fixed portion 5—For driving the movable portion 5—Moving relative to the fixed portion. As a result, the driving force of the driving assembly may be increased to drive a heavier optical element.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present application. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
    a fixed part, having a base and a conductive element, wherein the conductive element is embedded in the base;
    a movable part, connected to the optical element and movable relative to the fixed part;
    a driving assembly, driving the movable part to move relative to the fixed part; and
    a flexible element, connected to the fixed part and the movable part, wherein the conductive element is electrically connected to the flexible element, and when the movable part moves relative to the fixed part, the flexible element deforms so that the position of the movable part relative to the fixed part is detected.

2. The driving mechanism as claimed in claim 1, further comprising a control circuit element electrically connected to the flexible element and the driving assembly, wherein the position of the movable part relative to the fixed part is detected by the control circuit element measuring an electrical parameter of the flexible element.

3. The driving mechanism as claimed in claim 2, further comprising a plurality of conductive pads disposed on the fixed part and the movable part, wherein the flexible element comprises resin material and electrically connects to the control circuit element via the conductive pads.

4. The driving mechanism as claimed in claim 2, wherein the movable part is movable relative to the fixed part within a specific interval, and the electrical parameter of the flexible element is set as an initial value when the movable part is at an end position of the specific interval.

5. The driving mechanism as claimed in claim 1, wherein the movable part is movable relative to the fixed part within a specific interval, and the electrical parameter of the flexible element changes when the movable part is in different positions of the specific interval.

6. The driving mechanism as claimed in claim 1, further comprising a plurality of flexible elements, wherein the flexible elements deform in different ways when the movable part moves relative to the fixed part.

7. The driving mechanism as claimed in claim 6, wherein the flexible elements deform in opposite ways when the movable part moves relative to the fixed part.

8. The driving mechanism as claimed in claim 1, wherein the driving mechanism is rectangular in shape and further comprises a plurality of flexible elements arranged on four sides or at four corners of the driving mechanism.

9. The driving mechanism as claimed in claim 1, wherein the driving assembly comprises a coil disposed on the movable part, and the fixed part has a base and a conductive element, wherein the conductive element is embedded in the base and electrically connected to the flexible element and the coil.

10. The driving mechanism as claimed in claim 1, wherein the flexible element is a metal sheet spring connected to the fixed part and the movable part, and the driving assembly comprises a coil disposed on the movable part and electrically connected to the metal sheet spring.

11. A driving mechanism for moving an optical element, comprising:
- a fixed part;
- a movable part, connected to the optical element and movable relative to the fixed part;
- a driving assembly, driving the movable part to move relative to the fixed part;
- a flexible element, connected to the fixed part and the movable part, wherein when the movable part moves relative to the fixed part, the flexible element deforms so that the position of the movable part relative to the fixed part is detected;
- a resilient member, connected to the movable part and the fixed part, wherein the flexible element is disposed on the resilient member, and the resilient member and the flexible element deform when the movable part moves relative to the fixed part; and
- a plurality of flexible elements disposed on opposite sides of the resilient member.

12. A driving mechanism for moving an optical element, comprising:
- a fixed part;
- a movable part, connected to the optical element and movable relative to the fixed part;
- a driving assembly, driving the movable part to move relative to the fixed part;
- a flexible element, connected to the fixed part and the movable part, wherein when the movable part moves relative to the fixed part, the flexible element deforms so that the position of the movable part relative to the fixed part is detected; and
- an insulating layer disposed between the resilient member and the flexible element.

13. The driving mechanism as claimed in claim 12, wherein the resilient member has a connection portion suspended between the fixed part and the movable part, and the flexible element forms a plurality of longitudinal extending portions disposed on the connection portion.

14. The driving mechanism as claimed in claim 13, wherein the extending portions are parallel to each other.

15. The driving mechanism as claimed in claim 12, wherein the flexible element comprises shape memory alloy.

16. The driving mechanism as claimed in claim 12, wherein the flexible element comprises conductive gel.

* * * * *